US012445611B2

(12) United States Patent
Tsukuba

(10) Patent No.: US 12,445,611 B2
(45) Date of Patent: Oct. 14, 2025

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 167 days.

(21) Appl. No.: 18/281,574

(22) PCT Filed: Mar. 2, 2022

(86) PCT No.: PCT/JP2022/008741
§ 371 (c)(1),
(2) Date: Sep. 12, 2023

(87) PCT Pub. No.: WO2022/202157
PCT Pub. Date: Sep. 29, 2022

(65) Prior Publication Data
US 2024/0163437 A1 May 16, 2024

Related U.S. Application Data

(60) Provisional application No. 63/164,004, filed on Mar. 22, 2021.

(51) Int. Cl.
*H04N 19/124* (2014.01)
*H04N 19/172* (2014.01)
*H04N 19/18* (2014.01)
*H04N 19/184* (2014.01)
*H04N 19/46* (2014.01)

(52) U.S. Cl.
CPC ......... *H04N 19/124* (2014.11); *H04N 19/172* (2014.11); *H04N 19/18* (2014.11); *H04N 19/184* (2014.11); *H04N 19/46* (2014.11)

(58) Field of Classification Search
CPC .... H04N 19/172; H04N 19/18; H04N 19/184; H04N 19/46; H04N 19/13; H04N 19/136; H04N 19/176; H04N 19/09
See application file for complete search history.

(56) References Cited

PUBLICATIONS

Bross et al., "Versatile Video Coding Editorial Refinements on Draft 10", JVET-T2001-v2, Joint Video Experts Team (JVET) of ITU-T SG 16 WP 3 and ISO/IEC JTC 1/SC 29, version 1, 20th Meeting, by teleconference, Oct. 7-16, 2020, pp. 1-511.

(Continued)

*Primary Examiner* — Fabio S Lima
(74) *Attorney, Agent, or Firm* — XSENSUS, LLP

(57) ABSTRACT

The present disclosure relates to an image processing device and method capable of suppressing an increase in the amount of coding/decoding processing. A value according to a bit depth of an image is set as the maximum number of context-coded bins obtained by performing variable-length coding on the image. The maximum number of context-coded bins obtained by performing variable-length coding on the image is set according to a control flag indicating a processing speed mode. The present disclosure can be applied to, for example, an image processing device, an image coding device, an image decoding device, a transmitting device, a receiving device, a transmitting/receiving device, an information processing device, an imaging device, a reproducing device, an electronic apparatus, an image processing method, an information processing method, and the like.

16 Claims, 30 Drawing Sheets

(56) References Cited

PUBLICATIONS

Bross et al., "Versatile Video Coding Editorial Refinements on Draft 10", JVET-T2001-v2, Joint Video Experts Team (JVET) of ITU-T SG 16 WP 3 and ISO/IEC JTC 1/SC 29, version 2, 20th Meeting, by teleconference, available online at:<URL:https://jvet-ex1>erts. org/doc_end_user/documents/20_Teleconference/wgll/JVET-T2001-v2.zip >, Oct. 7-16, 2020, pp. 96-98.

Chen et al., Algorithm description for Versatile Video Coding and Test Model 11 (VTM 11), JVET-T2002-v2, version 5, Joint Video Experts Team (JVET) of ITU-T SG 16 WP 3 and ISO/IEC JTC 1/SC 29, 20th Meeting, by teleconference, available online at:<URL:https://jvet-experts.org/doc_end_user/documents/20_Teleconference/wgll/JVET-T2002-v5.zip>, Oct. 7-16, 2020, pp. 89-90.

Chen et al., Algorithm description for Versatile Video Coding and Test Model 11 (VTM 11), JVET-T2002-v1, version 1, Joint Video Experts Team (JVET) of ITU-T SG 16 WP 3 and ISO/IEC JTC 1/SC 29, 20th Meeting, by teleconference, Oct. 7-16, 2020, pp. 1-102.

Sarwer et al., "AHG8: CABAC-bypass alignment for high bit-depth coding", JVET-U0069-v3, Joint Video Experts Team (JVET) of ITU-T SG 16 WP 3 and ISO/IEC JTC 1/SC 29, version 3, 21st Meeting, by teleconference, Jan. 6-15, 2021, pp. 1-25.

International Search Report and Written Opinion mailed on Apr. 26, 2022, received for PCT Application PCT/JP2022/008741, filed on Mar. 2, 2022, 12 pages including English Translation.

Fig. 1

| | QP | Reference(VTM-11.0) | |
| --- | --- | --- | --- |
| | | ctx bins/CoefGroup | ep bins/CoefGroup |
| Sequence Group A/LB | -13 | 30.8 | 180.1 |
| | -8 | 30.5 | 141.4 |
| | -3 | 30.3 | 113.1 |
| | 2 | 30.2 | 89.4 |
| | 7 | 30.1 | 69.5 |
| | 12 | 29.9 | 52.9 |
| Sequence Group B/LB | -13 | 20.6 | 20.9 |
| | -8 | 18.0 | 13.2 |
| | -3 | 15.8 | 8.8 |
| | 2 | 13.0 | 5.3 |
| | 7 | 7.8 | 2.7 |
| | 12 | 2.2 | 0.7 |

Fig. 2

| 1 | SET THE MAXIMUM NUMBER OF CONTEXT-CODED BINS ACCORDING TO THE BIT DEPTH. |
|---|---|
| 1-1 | SET THE MAXIMUM NUMBER OF CONTEXT-CODED BINS ACCORDING TO THE NUMBER OF CONTEXT-CODED BINS DEPENDING ON THE BIT DEPTH. |
| 1-1-1 | SET A VALUE OBTAINED BY DIVIDING THE REFERENCE VALUE FOR THE NUMBER OF CONTEXT-CODED BINS BY A VALUE ACCORDING TO THE BIT DEPTH OF THE IMAGE AS THE NUMBER OF CONTEXT-CODED BINS DEPENDING ON THE BIT DEPTH. |
| 1-1-2 | SET A VALUE OBTAINED BY SUBTRACTING A VALUE ACCORDING TO THE BIT DEPTH OF THE IMAGE FROM THE REFERENCE VALUE FOR THE NUMBER OF CONTEXT-CODED BINS AS THE NUMBER OF CONTEXT-CODED BINS DEPENDING ON THE BIT DEPTH. |
| 1-1-3 | SET A VALUE ACCORDING TO THE BIT DEPTH AS THE NUMBER OF CONTEXT-CODED BINS DEPENDING ON THE BIT DEPTH. |
| 1-1-4 | TRANSMIT AN EXECUTION CONTROL FLAG. IF THE FLAG IS TRUE, SET THE MAXIMUM NUMBER OF CONTEXT-CODED BINS ACCORDING TO THE NUMBER OF CONTEXT-CODED BINS DEPENDING ON THE BIT DEPTH. IF THE FLAG IS FALSE, SET THE MAXIMUM NUMBER OF CONTEXT-CODED BINS ACCORDING TO THE REFERENCE VALUE FOR THE NUMBER OF CONTEXT-CODED BINS. |
| 2 | SET THE MAXIMUM NUMBER OF CONTEXT-CODED BINS ACCORDING TO PROCESSING SPEED CONTROL. |
| 2-1 | TRANSMIT A REFERENCE VALUE CONTROL FLAG. SET THE REFERENCE VALUE FOR THE NUMBER OF CONTEXT-CODED BINS ACCORDING TO THE REFERENCE VALUE CONTROL FLAG. SET ACCORDING TO THE REFERENCE VALUE FOR THE NUMBER OF CONTEXT-CODED BINS ACCORDING TO THE REFERENCE VALUE CONTROL FLAG THE MAXIMUM NUMBER OF CONTEXT-CODED BINS. |

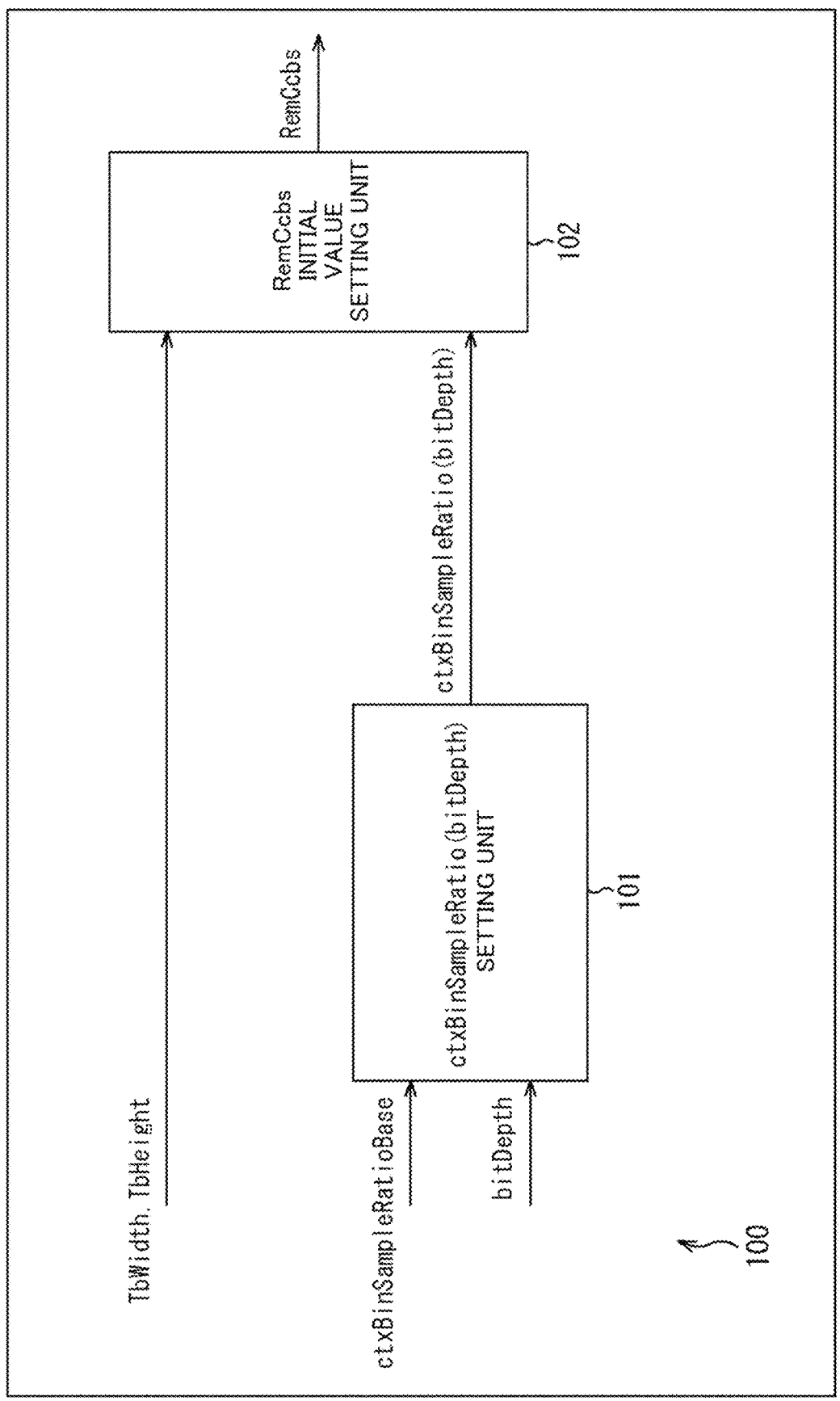

Fig. 12

```
In case of transform-skip residual coding:
RemCcbs = ctxBinSampleRatio (bitDepth) * (TbWidth * TbHeight>>4)
For each coefficient group
  context_coding of sb_coded_flag
  if (sb_coded_flag ==1)
    Pass 1:
      if (RemCcbs >= 4)
        context coding of sig_coeff_flag; RemCcbs--;
        context coding of coeff_sign_flag; RemCcbs--;
        context coding of abs_level_gtx_flag[ ][ 0 ]; RemCcbs--;
        context coding of par_level_flag; RemCcbs--;
    Pass 2:
      if (RemCcbs >= 4)
        context coding of abs_level_gtx_flag [ ][ 1 ]; RemCcbs--;
        abs_level_gtx_flag [ ][ 2 ]; RemCcbs--;
        abs_level_gtx_flag [ ][ 3 ]; RemCcbs--;
        abs_level_gtx_flag [ ][ 4 ]; RemCcbs--;
    pass 3:
      bypass coding of abs_remainder
      bypass coding of coeff_sign_flag
```

Fig. 13

```
In case of regular residual coding:
RemCcbs = ctxBinSampleRatio (bitDepth) * (TbWidth * TbHeight>>4)
For each coefficient group context_coding of sb_coded_flag
if (sb_coded_flag ==1)
    if (RemCcbs >= 4 )
        Pass 1:
            context coding of sig_coeff_flag; RemCcbs1--;
            context coding of abs_level_gtx_flag[ ][ 0 ]; RemCcbs--;
            context coding of par_level_flag; RemCcbs--;
            context coding of abs_level_gtx_flag[ ][ 1 ]; RemCcbs--;
    Pass 2:
        bypass coding of abs_remainder  or  bypass coding of dec_abs_level
    Pass 3: bypass coding of coeff_sign_flag
```

IMAGE PROCESSING DEVICE AND METHOD

CROSS-REFERENCE TO RELATED APPLICATIONS

The present application is based on PCT filing PCT/JP2022/008741, filed Mar. 2, 2022, which claims priority from U.S. Provisional Patent Application No. 63/164,004, filed Mar. 22, 2021, the entire contents of each are incorporated herein by reference.

TECHNICAL FIELD

The present disclosure relates to an image processing device and method, and particularly, to an image processing device and method capable of suppressing an increase in the amount of coding/decoding processing.

BACKGROUND ART

A coding method has been proposed heretofore in which prediction residual derivation, coefficient transform, and quantization are performed on a moving image to be coded (for example, see NPL 1 and NPL 2). In such image coding processing, for images with high bit depth and high bit rate, more context-coded bins and bypass-coded bins are generated, which may result in an increased amount of Context-based Adaptive Binary Arithmetic Code (CABAC) processing. Therefore, in order to improve the throughput of CABAC, a method has been proposed that simplifies encoding/decoding processing for bypass-coded bins (see, for example, NPL 3).

CITATION LIST

Non Patent Literature

[NPL 1]
Benjamin Bross, Jianle Chen, Shan Liu, "Versatile Video Coding (Draft 10)," JVET-T2001-v2, Joint Video Experts Team (JVET) of ITU-T SG 16 WP 3 and ISO/IEC JTC 1/SC 29, version 1—date 2020 Oct. 27

[NPL 2]
Jianle Chen, Yan Ye, Seung Hwan Kim, "Algorithm description for Versatile Video Coding and Test Model 11 (VTM 11)", JVET-T2002-v1, Joint Video Experts Team (JVET) of ITU-T SG 16 WP 3 and ISO/IEC JTC 1/SC 29, version 1—date 2020 Oct. 27

[NPL 3]
M. G. Sarwer, J. Chen, Y. Ye, R.-L. Liao, "AHG8: CABAC-bypass alignment for high bit-depth coding", JVET-U0069-v3, Joint Video Experts Team (JVET) of ITU-T SG 16 WP 3 and ISO/IEC JTC 1/SC 29, version 3—date 2021 Jan. 8

SUMMARY

Technical Problem

However, with this method, it is difficult to suppress an increase in the amount of processing for context-coded bins, for which coding/decoding processing is more complicated than for bypass-coded bins. Therefore, there is a concern that the amount of coding/decoding may increase.

The present disclosure has been devised in view of such circumstances and an object of the present disclosure is to curb an increase in the amount of coding/decoding processing.

Solution to Problem

An image processing device according to one aspect of the present technology includes a maximum context-coded bin number setting unit that sets a value according to a bit depth of an image as a maximum number of context-coded bins to be generated in coding or decoding of the image.

An image processing method according to one aspect of the present technology includes setting a value according to a bit depth of an image as a maximum number of context-coded bins to be generated in coding or decoding of the image. An image processing device according to another aspect of the present technology includes a maximum context-coded bin number setting unit that sets, according to a control flag indicating a processing speed mode, a maximum number of context-coded bins to be generated in coding or decoding of an image. An image processing method according to another aspect of the present technology includes setting, according to a control flag indicating a processing speed mode, a maximum number of context-coded bins to be generated in coding or decoding of an image.

In the image processing device and method according to one aspect of the present technology, a value according to a bit depth of an image is set as a maximum number of context-coded bins to be generated in coding or decoding of the image.

In the image processing device and method according to another aspect of the present technology, a maximum number of context-coded bins to be generated in coding or decoding of an image is set according to a control flag indicating a processing speed mode.

BRIEF DESCRIPTION OF DRAWING

FIG. 1 illustrates the amount of coded bins to be generated.

FIG. 2 illustrates a method of controlling the number of context-coded bins.

FIG. 3 is a block diagram illustrating a main configuration example of a RemCcbs setting device.

FIG. 12 illustrates an example syntax for a TS residual coding mode.

FIG. 13 illustrates an example syntax for a Non-TS residual coding mode.

DESCRIPTION OF EMBODIMENTS

Figure 4:
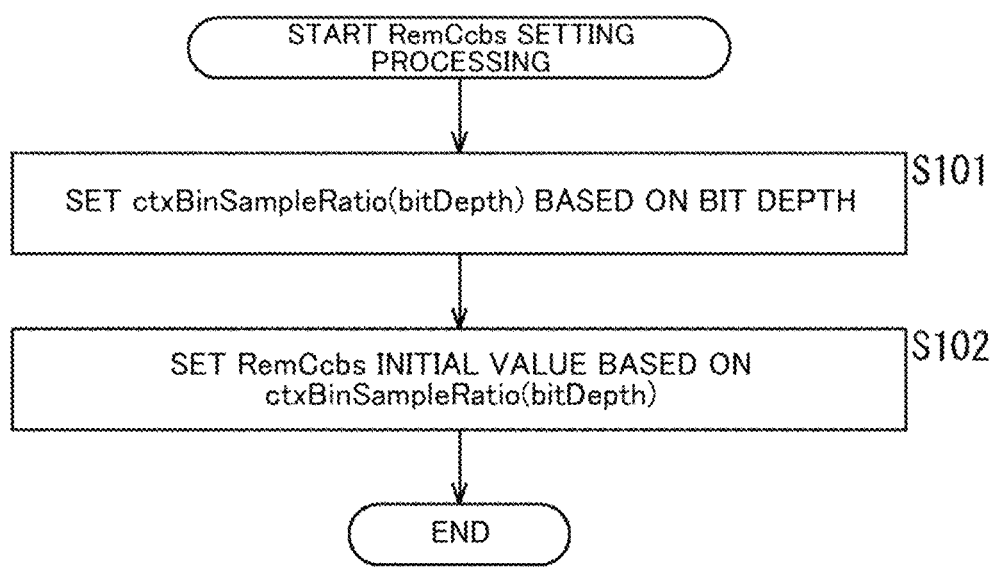
FIG. 4 is a flowchart illustrating an example of a flow of RemCcbs setting processing.

Hereinafter, modes for carrying out the present disclosure (hereinafter referred to as embodiments) will be described. The descriptions will be given in the following order.
1. CABAC
2. Suppression of increase in context-coded bins
3. Embodiments
4. Supplements

1. CABAC

<Literature and the Like that Support Technical Content and Technical Terms>

The scope disclosed in the present technology is not limited to the content described in embodiments and also includes the content described in NPL below and the like that were known at the time of filing and the content of other literature referred to in NPL below.
[NPL 1]
(Described above)
[NPL 2]
(Described above)
[NPL 3]
(Described above)
[NPL 4]
Recommendation ITU-T H.264 (April 2017) "Advanced video coding for generic audiovisual services", April 2017
[NPL 5]
Recommendation ITU-T H.265 (February 2018) "High efficiency video coding", February 2018

Thus, the content described in the above-described NPL is also the basis for determining the support requirements. For example, even though the Quad-Tree Block Structure and the Quad Tree Plus Binary Tree (QTBT) Block Structure described in the above-described NPL are not explicitly described in embodiments, they are assumed to be included in the scope of disclosure of the present technology and to satisfy support requirements of the claims. For example, similarly, technical terms such as Parsing, Syntax, and Semantics are also within the scope of disclosure of the present technology and satisfy the support requirements even though they are not directly described in the embodiments.

The term "block" (not a block indicating a processing unit) as used herein to refer to a partial region of an image (picture) or a unit of processing indicates any partial region in a picture, and has a non-limited size, shape, characteristics, etc. unless otherwise specified. For example, "block" includes any partial region (processing unit) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a subblock, a macroblock, a tile, a slice, etc. described in the above-described NPL.

When specified, such a block size may be specified not only directly but also indirectly. For example, the block size may be specified using identification information for identifying the size. For example, the block size may be specified by a ratio to or a difference from the size of a reference block (for example, a LCU or an SCU). For example, when information is transmitted for specifying a block size as a syntax element or the like, that information may include information for indirectly specifying the size as mentioned above. These ways may make it possible to reduce the amount of information and to improve the coding efficiency. This block size specification also includes block size range specification (for example, specifying the allowable range of block size, etc.). The term "coding" as used herein includes not only the entire processing of converting an image into (a bit stream of) coded data, but also part of that processing. For example, "coding" includes not only general processing including prediction processing, orthogonal transform, quantization, arithmetic coding, and the like, but also combined processing of quantization and arithmetic coding, and general processing including prediction processing, quantization, arithmetic coding, and the like. Similarly, the term "decoding" includes not only the entire processing of converting (a bit stream of) coded data into an image, but also part of that processing. For example, "decoding" includes not only general processing including inverse arithmetic decoding, inverse quantization, inverse orthogonal transform, prediction processing, and the like, but also general processing including inverse arithmetic decoding and inverse quantization, general processing including inverse arithmetic decoding, inverse quantization, and prediction processing, and the like.

The term "decoding of an image" as used herein means decoding (a bit stream of) coded data obtained by coding an image, by means of a decoding method corresponding to the coding method.

<Amount of Context-Coded Bins to be Generated>

For example, Context-based Adaptive Binary Arithmetic Code (CABAC) is used in the image coding method described in NPL 1 and NPL 2 (hereinafter also referred to as Versatile Video Coding (VVC)). CABAC is an entropy coding technique that uses binary arithmetic coding and context-based adaptive processing that estimates the probability of occurrence of a binary symbol based on the state of neighboring parameters (context).

In VVC, the following parameters are set for the number of context-coded bins to be generated per transform block.

$$RemCcbs = ((1 \ll (\log_2(Tb\ \text{Width}) + \log_2(Tb\ \text{Height})))*7) \gg 2 \quad (1)$$
$$= ctx\ \text{Bin Sample Ratio Base} * (Tb\ \text{Width} * Tb\ \text{Height} \gg 4)$$

RemCcbs is a parameter for controlling (restricting) the number of context-coded bins to be generated, and indicates an allowable number of residual context-coded bins per transform block. The allowable number of residual context-coded bins indicates an allowable number of residual context-coded bins to be generated. For example, each time context-coded bins are generated in image coding or decoding, that number of bins is subtracted from RemCcbs. Then, when this RemCcbs becomes less than a threshold value (for example, less than 4), the context coding or the corresponding decoding ends. In other words, the initial value of RemCcbs indicates the maximum allowable number of context-coded bins, and the current value of RemCcbs indicates the allowable number of residual coded bins at that time. When RemCcbs becomes less than the threshold value, the coding (decoding) of the image in the transform block is switched from context coding to a simpler coding method (for example, bypass coding) and then executed.

log 2(x) represents a function that returns the logarithm of an input value x to a base of 2. Tb Width is a parameter that indicates the horizontal width of the transform block. TbHeight is a parameter that indicates the vertical width of the transform block. ctxBinSampleRatioBase is a parameter that indicates a reference value for the maximum number of context-coded bins at the coefficient group (also referred to as CG (Coef. Group)) level in the transform block. This ctxBinSampleRatioBase has any value. For example, in VVC Ver.1, the value of ctxBinSampleRatioBase is 28.

A table illustrated in FIG. 1 shows in such CABAC the average number of context-coded bins (ctx bins/CoefGroup) generated on a per-CG basis and the number of bypass-coded bins (ep bins/CoefGroup) generated on the per-CG basis, for each QP (quantization parameter). In the table illustrated in FIG. 1, the numbers of context-coded bins and the numbers of bypass-coded bins are shown for each of Sequence group A and Sequence group B. Sequence group A is a sequence group that is difficult to code and has many coded bins, and sequence group B is a sequence group that is easier to code and has fewer coded bins than Sequence group A.

In both Sequence group A and Sequence group B, the context-coded and bypass-coded bins to be generated for QP=−13 (higher bit rate) are more than those for QP=12. For QP=−13 in Sequence group A, the number of context-coded bins is about 15 times and the number of bypass-coded bins is about 257 times as compared to the number of bins for QP=12 in Sequence group B. Thus, coding with high bit depth and high bit rate may result in increased numbers of context-coded bins and bypass-coded bins to be generated and accordingly increase the amount of processing per unit of CABAC.

Therefore, in order to improve the throughput of CABAC, a method has been proposed that simplifies coding processing of bypass-coded bins and the corresponding decoding processing (see, for example, NPL 3). However, with this method, it is difficult to suppress an increase in the amount of processing for context-coded bins. In general, coding processing and decoding processing are more complicated for context-coded bins than for bypass-coded bins. Therefore, from the viewpoint of reducing the amount of processing, it is also important to suppress an increase in the amount of processing for context-coded bins.

2. Suppression of Increase in Context-Coded Bins

<Control of the Number of Context-Coded Bins to be Generated>

Therefore, the number of context-coded bins to be generated at the transform block level is controlled. For example, the maximum number of context-coded bins is set according to the bit depth (Method 1), as shown at the top of the table illustrated in FIG. 2. This setting makes it possible to control according to the bit depth the number of context-coded bins to be generated. Accordingly, it is possible to suppress an increase in the amount of coding/decoding processing. For example, it is possible to reduce the amount of CABAC processing for coding with high bit depth and high bit rate.

For example, an image processing device may include a maximum context-coded bin number setting unit that sets a value according to a bit depth of an image as a maximum number of context-coded bins to be generated in coding or decoding of the image. For example, in an image processing method, a value according to a bit depth of an image may be set as a maximum number of context-coded bins to be generated in coding or decoding of the image. In other words, a parameter indicating the maximum number of context-coded bins to be applied in coding or decoding of an image may be set based on the bit depth of the image.

For example, in the case where the above-described Method 1 is applied, the maximum number of context-coded bins may be set according to the number of context-coded bins depending on the bit depth (Method 1-1), as shown in the second row from the top of the table illustrated in FIG. 2.

For example, in the image processing device, the maximum context-coded bin number setting unit may set, based on the bit depth of the image, the number of context-coded bins depending on the bit depth, and set, based on the number of context-coded bins depending on the bit depth, the maximum number of context-coded bins.

For example, in the image processing device, the maximum context-coded bin number setting unit may set, based on a block size of a block to be processed and the number of context-coded bins depending on the bit depth, the maximum number of context-coded bins corresponding to the block to be processed. In other words, the number of context-coded bins depending on the bit depth and the maximum number of context-coded bins may be set for each block that is a unit of coding and decoding processing. This block may be a data unit corresponding to a partial region of the image to be coded or decoded. For example, this block may be a transform block that is a unit of processing for coefficient transform applied in coding of the image (or inverse coefficient transform applied in decoding of the image).

<RemCcbs Setting Device>

FIG. 3 is a block diagram illustrating an example of a configuration of a RemCcbs setting device that is one aspect of an image processing device to which the present technology is applied. The RemCcbs setting device 100 illustrated in FIG. 3 is a device for setting RemCcbs, which is a parameter for controlling (restricting) the number of context-coded bins to be generated in coding of the image using CABAC.

As described above, RemCcbs indicates an allowable number of residual context-coded bins per transform block, and the initial value of RemCcbs indicates the maximum allowable number of context-coded bins (also referred to as the maximum number of context-coded bins). Accordingly, the RemCcbs setting device 100 can also be said to be a maximum context-coded bin number setting unit.

The RemCcbs setting device 100 can set RemCcbs for each unit of CABAC processing. CABAC may use any unit of data as a unit of processing. In the following description, it is assumed that the unit of CABAC processing is a transform block, and a RemCcbs initial value setting unit 102 sets RemCcbs for each transform block.

FIG. 3 illustrates principal components such as processing units and data flows, and FIG. 3 does not illustrate all components. In other words, the RemCcbs setting device 100 may include a processing unit(s) not illustrated as a block(s) in FIG. 3. The RemCcbs setting device 100 may have processing and data flow(s) not indicated by arrows or the like in FIG. 3.

As illustrated in FIG. 3, the RemCcbs setting device 100 includes a ctxBinSampleRatio(bitDepth) setting unit 101 and the RemCcbs initial value setting unit 102.

The ctxBinSampleRatio(bitDepth) setting unit 101 performs processing related to setting of ctxBinSampleRatio(bitDepth), which is a parameter indicating the number of context-coded bins depending on the bit depth. For example, the ctxBinSampleRatio(bitDepth) setting unit 101 acquires bitDepth, which is a parameter indicating the bit depth of the image to be coded (or decoded), supplied from the outside of the RemCcbs setting device 100.

The ctxBinSampleRatio(bitDepth) setting unit 101 uses the acquired bitDepth to set ctxBinSampleRatio(bitDepth). Thus, the ctxBinSampleRatio(bitDepth) setting unit 101 sets, based on the bit depth of the image to be coded (or decoded), the number of context-coded bins depending on the bit depth.

In that setting, the ctxBinSampleRatio(bitDepth) setting unit 101 may set ctxBinSampleRatio(bitDepth) based on this bit depth and any other parameters. For example, the ctxBinSampleRatio(bitDepth) setting unit 101 may set ctxBinSampleRatio(bitDepth) based on the bit depth of the image to be coded (or decoded) and ctxBinSampleRatioBase, which is a parameter indicating a reference value for the number of context-coded bins. In that case, the ctxBinSampleRatio(bitDepth) setting unit 101 may acquire bitDepth and ctxBinSampleRatioBase, which are supplied from the outside of the RemCcbs setting device 100. The ctxBinSampleRatio(bitDepth) setting unit 101 may then use the acquired bitDepth and ctxBinSampleRatioBase to set ctxBinSampleRatio(bitDepth).

The ctxBinSampleRatio(bitDepth) setting unit 101 supplies the set ctxBinSampleRatio(bitDepth) to the RemCcbs initial value setting unit 102.

The RemCcbs initial value setting unit 102 performs processing related to setting of the initial value of RemCcbs. For example, the RemCcbs initial value setting unit 102 acquires ctxBinSampleRatio(bitDepth) supplied from the ctxBinSampleRatio(bitDepth) setting unit 101.

The RemCcbs initial value setting unit 102 uses the acquired ctxBinSampleRatio(bitDepth) to set the initial value of RemCcbs (the maximum number of context-coded bins to be generated in coding or decoding of image) corresponding to the block to be CABAC processed. Thus, the RemCcbs initial value setting unit 102 sets the initial value of RemCcbs based on the bit depth of the image. In other words, the RemCcbs initial value setting unit 102 sets a value according to the bit depth of the image as the initial value of RemCcbs. For example, the RemCcbs initial value setting unit 102 may set the initial value of RemCcbs based on the number of context-coded bins depending on the bit depth.

In that setting, the RemCcbs initial value setting unit 102 may set the initial value of RemCcbs based on this ctxBinSampleRatio(bitDepth) and any other parameters. For example, the RemCcbs initial value setting unit 102 may set, based on the block size of the block to be processed and the number of context-coded bins depending on the bit depth, the initial value of RemCcbs corresponding to the block to be processed. For example, the RemCcbs setting device 100 may acquire ctxBinSampleRatio(bitDepth) supplied from the ctxBinSampleRatio(bitDepth) setting unit 101, and further acquire Tb Width and TbHeight of the block to be processed, which are supplied from the outside of the RemCcbs setting device 100. As described above, Tb Width is a parameter that indicates the horizontal width of the transform block. TbHeight is a parameter that indicates the vertical width of the transform block. In other words, Tb Width and TbHeight define the block size of the block to be processed (transform block). The RemCcbs initial value setting unit 102 may then use the acquired ctxBinSampleRatio(bitDepth), Tb Width, and TbHeight to set the initial value of RemCcbs corresponding to the block to be processed.

The RemCcbs initial value setting unit 102 outputs the set initial value of RemCcbs to the outside of the RemCcbs setting device 100 (for example, a subsequent processing unit).

The RemCcbs setting device 100, which has the above-described configuration in which each processing unit performs the processing as described above, can control the number of context-coded bins to be generated. Accordingly, the RemCcbs setting device 100 can suppress an increase in the amount of coding/decoding processing. For example, the RemCcbs setting device 100 can suppress an increase in the amount of CABAC processing for coding/decoding of an image with high bit depth and high bit rate.

In other words, the RemCcbs setting device 100, which suppresses an increase in the number of context-coded bins to be generated, can suppress an increase in the total of the numbers of context-coded bins and bypass-coded bins. Thus, the RemCcbs setting device 100 can suppress an increase in the total amount of CABAC processing.

<Flow of RemCcbs Setting Processing>

An example of a flow of RemCcbs setting processing executed by this RemCcbs setting device 100 will be described with reference to a flowchart of FIG. 4.

When the RemCcbs setting processing is started, the ctxBinSampleRatio(bitDepth) setting unit 101 of the RemCcbs setting device 100 sets, based on the bit depth (bitDepth) of the image to be coded (or decoded), ctxBinSampleRatio(bitDepth), which is a parameter indicating the number of context-coded bins depending on the bit depth, in step S101. In that setting, the ctxBinSampleRatio(bitDepth) setting unit 101 may set ctxBinSampleRatio(bitDepth) based on this bit depth and any other parameters. For example, the ctxBinSampleRatio(bitDepth) setting unit 101 may set ctxBinSampleRatio(bitDepth) based on the bit depth (bitDepth) of the image to be coded (or decoded) and ctxBinSampleRatioBase, which is a parameter indicating a reference value for the number of context-coded bins.

In step S102, the RemCcbs initial value setting unit 102 of the RemCcbs setting device 100 sets the initial value of RemCcbs based on ctxBinSampleRatio(bitDepth) set in step S101. Thus, the RemCcbs initial value setting unit 102 sets the initial value of the allowable number of residual context-coded bins based on the bit depth of the image. In other words, the RemCcbs initial value setting unit 102 sets a value according to the bit depth of the image as the maximum number of context-coded bins to be generated in coding or decoding of the image.

In that setting, the RemCcbs initial value setting unit 102 may set the initial value of RemCcbs based on this ctxBinSampleRatio(bitDepth) and any other parameters. For example, the RemCcbs initial value setting unit 102 may set, based on the block size (Tb Width and TbHeight) of the block to be processed and the number of context-coded bins depending on the bit depth (ctxBinSampleRatio(bitDepth)), the initial value of RemCcbs corresponding to the block to be processed.

When the processing of step S102 ends, the RemCcbs setting processing ends. The RemCcbs setting device 100, which executes the RemCcbs setting processing in this way, can control the number of context-coded bins to be generated. Accordingly, the RemCcbs setting device 100 can suppress an increase in the amount of coding/decoding processing. For example, the RemCcbs setting device 100 can suppress an increase in the amount of CABAC processing for coding/decoding of an image with high bit depth and high bit rate.

In other words, the RemCcbs setting device 100, which suppresses an increase in the number of context-coded bins to be generated, can suppress an increase in the total of the numbers of context-coded bins and bypass-coded bins. Thus, the RemCcbs setting device 100 can suppress an increase in the total amount of CABAC processing.

<ctxBinSampleRatio(bitDepth)>

Any method may be used to derive the initial value of RemCcbs (that is, the maximum number of context-coded bins) described above. For example, the RemCcbs initial value setting unit 102 may derive the initial value of RemCcbs using Equation (2) below.

$$\text{RemCcbs}=\text{ctxBinSampleRation(bitDepth)}*(\text{TbWidth}*\text{TbHeight}>>4) \quad (2)$$

Any method may be used to derive this ctxBinSampleRatio(bitDepth) (that is, the number of context-coded bins depending on the bit depth).

For example, in the case where the above-described Method 1-1 is applied, a value obtained by dividing the reference value for the number of context-coded bins by a value according to the bit depth of the image may be set as the number of context-coded bins depending on the bit depth (Method 1-1-1), as shown in the third row from the top of the table in FIG. 2. For example, in the image processing device, the maximum context-coded bin number setting unit may set, as the number of context-coded bins depending on the bit depth, a value obtained by dividing the reference value for the number of context-coded bins by a value according to the bit depth of the image. For example, the ctxBinSampleRatio(bitDepth) setting unit 101 may derive ctxBinSampleRatio(bitDepth) by using Equation (3) below.

$$\text{ctxBinSampleRatio(bitDepth)}=\text{ctxBinSampleRatioBase}>>\max(0,\text{bitDepth}-10) \quad (3)$$

In this case, the ctxBinSampleRatio(bitDepth) setting unit 101 performs a right bit shift on ctxBinSampleRatioBase by the larger one of a value obtained by subtracting 10 from the bit depth (bitDepth) and "0", and sets the resulting value as ctxBinSampleRatio(bitDepth). Thus, when the bit depth is greater than 10 bits, the ctxBinSampleRatio(bitDepth) setting unit 101 sets ctxBinSampleRatio(bitDepth) to a smaller value as that bit depth increases.

In the case where the above-described Method 1-1 is applied, a value obtained by subtracting a value according to the bit depth of the image from the reference value for the number of context-coded bins may be set as the number of context-coded bins depending on the bit depth (Method 1-1-2), as shown in the fourth row from the top of the table in FIG. 2. For example, in the image processing device, the maximum context-coded bin number setting unit may set, as the number of context-coded bins depending on the bit depth, a value obtained by subtracting a value according to the bit depth of the image from the reference value for the number of context-coded bins. For example, the ctxBinSampleRatio(bitDepth) setting unit 101 may derive ctxBinSampleRatio(bitDepth) by using Equation (4) below.

$$\text{ctxBinSampleRatio(bitDepth)}=\text{ctxBinSampleRatioBase}-a*\max(0,\text{bitDepth}-10) \quad (4)$$

In Equation (4), a is an arbitrary constant. For example, a=4 may be given. In this case, the ctxBinSampleRatio(bitDepth) setting unit 101 subtracts from ctxBinSampleRatioBase a times the larger one of a value obtained by subtracting 10 from the bit depth (bitDepth) and "0", and sets the resulting value as ctxBinSampleRatio(bitDepth). Thus, when the bit depth is greater than 10 bits, the ctxBinSampleRatio(bitDepth) setting unit 101 sets ctxBinSampleRatio(bitDepth) to a smaller value as that bit depth increases. Thus, when the bit depth is greater than 10 bits, the ctxBinSampleRatio(bitDepth) setting unit 101 sets ctxBinSampleRatio(bitDepth) to a smaller value as that bit depth increases.

In the case where the above-described Method 1-1 is applied, a value according to the bit depth may be set as the number of context-coded bins depending on the bit depth (Method 1-1-3), as shown in the fifth row from the top of the table in FIG. 2. For example, in the image processing device, the maximum context-coded bin number setting unit may set, as the number of context-coded bins depending on the bit depth, a value according to the bit depth of the image. For example, the ctxBinSampleRatio(bitDepth) setting unit 101 may derive ctxBinSampleRatio(bitDepth) by using Equation (5) below.

$$\text{ctxBinSampleRatio(bitDepth)}=\text{bitDepth}\leq 10?\text{ctxBinSampleRationBase}:\text{ctxBinSampleRatioBase2} \quad (5)$$

In Equation (5), ctxBinSampleRatioBase2 is a parameter that indicates a reference value (second reference value) for the number of context-coded bins at the CG level, which is smaller than ctxBinSampleRatioBase (first reference value). In this case, when the bit depth of the image is 10 bits or less, the ctxBinSampleRatio(bitDepth) setting unit 101 sets ctxBinSampleRatioBase (first reference value) as ctxBinSampleRatio(bitDepth), and when the bit depth of the image is greater than 10 bits, the ctxBinSampleRatio(bitDepth) setting unit 101 sets ctxBinSampleRatioBase2 (second reference value) as ctxBinSampleRatio(bitDepth). Thus, when the bit depth is greater than 10 bits, the ctxBinSampleRatio(bitDepth) setting unit 101 sets ctxBinSampleRatio(bitDepth) to a smaller value than when the bit depth is 10 bits or less.

ctxBinSampleRatioBase2 may be any value as long as it is smaller than ctxBinSampleRatioBase. For example, ctxBinSampleRatioBase=28 and ctxBinSampleRatioBase2=21 may be given.

Figure 5:
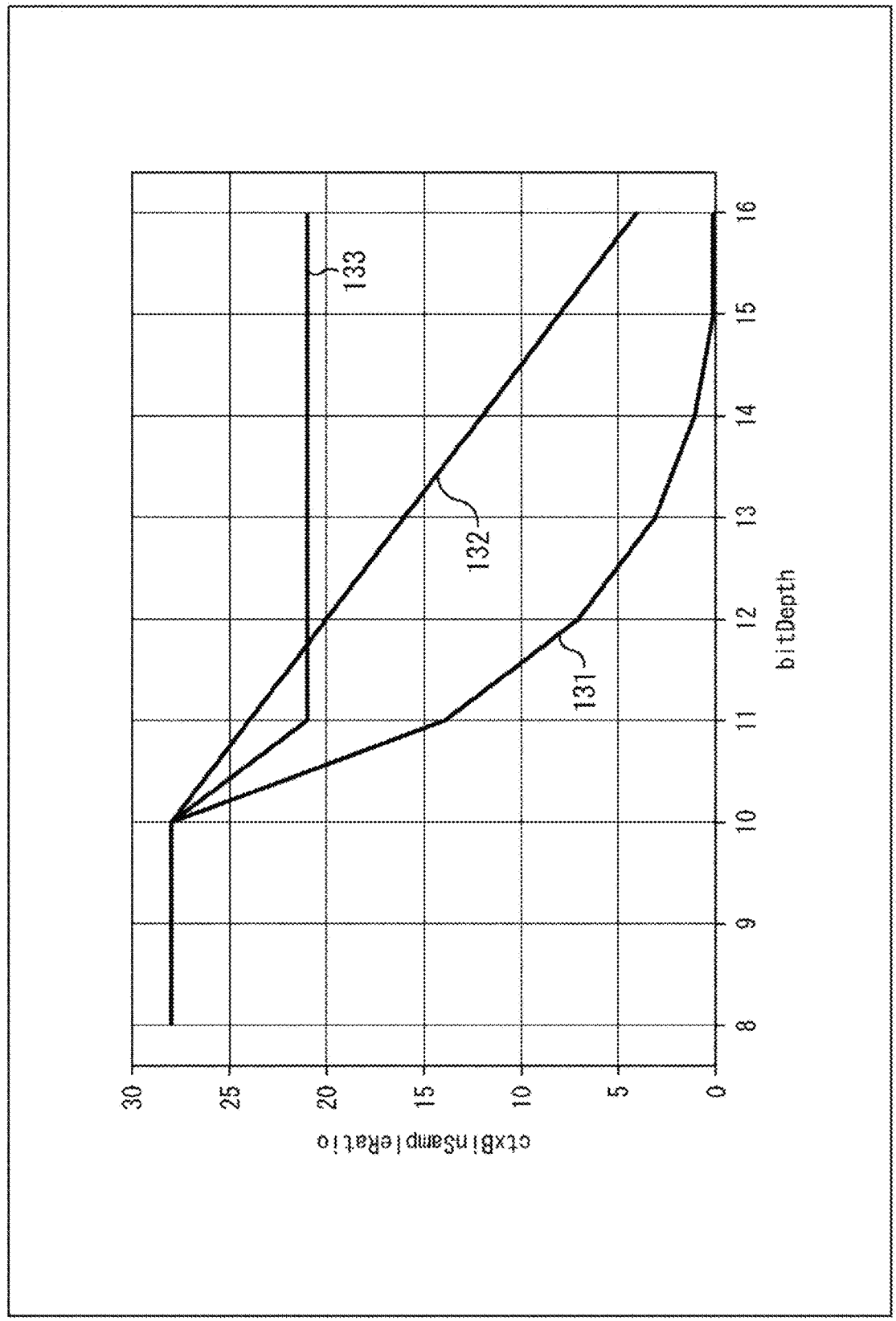
FIG. 5 is a diagram illustrating bit depths and the numbers of context-coded bins.

A graph illustrated in FIG. 5 indicates example values of ctxBinSampleRatio(bitDepth) according to the above-described methods of deriving the values. In the graph illustrated in FIG. 5, a line 131 indicates example values of ctxBinSampleRatio(bitDepth) derived using Equation (3) above. A line 132 shows example values of ctxBinSampleRatio(bitDepth) derived using Equation (4) above. A line 133 indicates example values of ctxBinSampleRatio(bitDepth) derived using Equation (5) above.

As indicated by lines 131 to 133, when the bit depth is greater than 10 bits, the value of ctxBinSampleRatio(bitDepth) for each bit depth differs depending on the methods of deriving the values. However, in any of the methods, when the bit depth is greater than 10 bits, ctxBinSampleRatio(bitDepth) is a smaller value than when the bit depth is 10 bits or less. Therefore, it is possible to control the number of context-coded bins to be generated and thus to suppress an increase in the amount of CABAC processing for coding/decoding of an image with high bit depth and high bit rate.

Which of the above-described methods of deriving is the most suitable depends on the required image quality, contents, and the like. Any one of these methods of deriving may be selectively applied. For example, the method of deriving may be selected based on any condition (for example, required image quality, contents, and the like). In response to receiving an instruction to select a method of deriving from a user, an application, or the like, the method of deriving may be applied in accordance with the instruction. Methods of deriving other than the above-described examples may be used as choices (candidates). Any number of choices (candidates) may be used.

<Execution Control Flag>

In the case where the above-described Method 1-1 is applied, an execution control flag that is a flag indicating whether or not to apply the above-described Method 1-1 may be transmitted from the coding side to the decoding side, as shown in the sixth row from the top of the table in FIG. 2. Then, if this execution control flag is true, the maximum number of context-coded bins may be set according to the number of context-coded bins depending on the bit depth. Thus, in this case, the above-described Method 1 is applied. If this execution control flag is false, the maximum number of context-coded bins may be set according to the reference value for the number of context-coded bins. Thus, in this case, the above-described Method 1 is not applied (Method 1-1-4).

This way makes it possible to control whether or not to apply Method 1-1. Therefore, in this case as well, it is possible to control the number of context-coded bins to be generated and thus to suppress an increase in the amount of coding/decoding processing. For example, it is possible to suppress an increase in the amount of CABAC processing for coding/decoding of an image with high bit depth and high bit rate.

For example, in the image processing device, if the control flag (execution control flag) is true, the maximum context-coded bin number setting unit may set, based on the bit depth of the image, the number of context-coded bins depending on the bit depth, and set, based on the number of context-coded bins depending on the bit depth, the maximum number of context-coded bins; if the control flag is false, the maximum context-coded bin number setting unit may set, based on the reference value for the number of context-coded bins, the maximum number of context-coded bins.

As described above, when Method 1-1 is applied, any one of Methods 1-1-1 to 1-1-3 may be applied.

<RemCcbs Setting Device>

Figure 6:
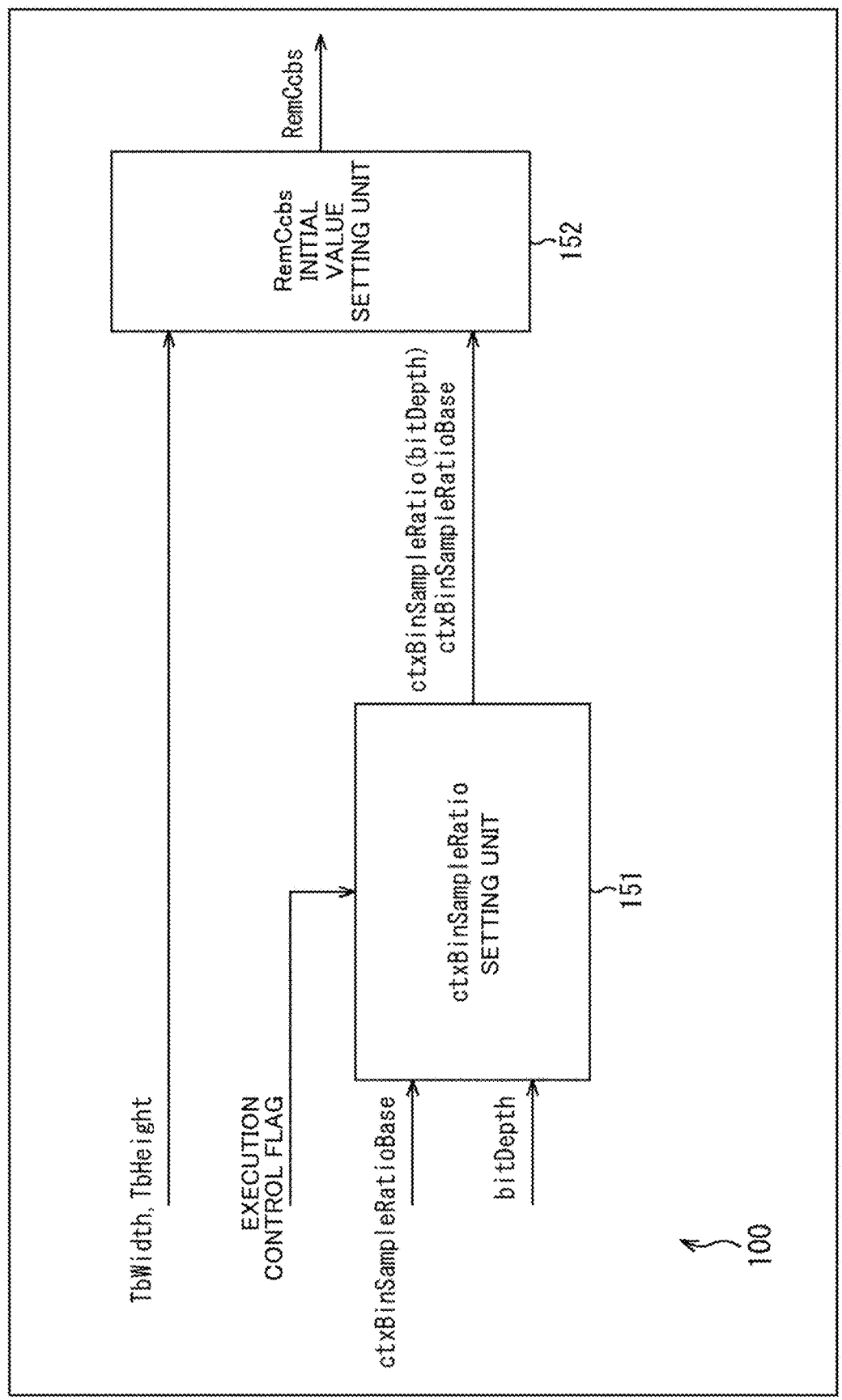
FIG. 6 is a block diagram illustrating a main configuration example of a RemCcbs setting device.

FIG. 6 is a block diagram illustrating a main configuration example of a RemCcbs setting device 100 in that case. FIG. 6 illustrates major parts such as processing units and data flows, but processing units and data flows are not limited to those illustrated in FIG. 6. In other words, the RemCcbs setting device 100 may include a processing unit(s) not illustrated as a block(s) in FIG. 6. The RemCcbs setting device 100 may have processing and data flow(s) not indicated as arrows or the like in FIG. 6.

In the case of FIG. 6, the RemCcbs setting device 100 includes a ctxBinSampleRatio setting unit 151 and a RemCcbs initial value setting unit 152.

The ctxBinSampleRatio setting unit 151 performs processing related to setting of ctxBinSampleRatio, which is a parameter indicating the number of context-coded bins. For example, the ctxBinSampleRatio setting unit 151 acquires ctxBinSampleRatioBase and bitDepth supplied from the outside of the RemCcbs setting device 100. The ctxBinSampleRatio setting unit 151 also acquires an execution control flag supplied from the outside of the RemCcbs setting device 100. This execution control flag is a control flag that indicates whether or not to set the maximum number of context-coded bins according to the bit depth. In other words, the execution control flag is a flag indicating whether or not to apply the present technology.

The ctxBinSampleRatio setting unit 151 determines a method of setting ctxBinSampleRatio based on the execution control flag. For example, if the execution control flag is true (for example, 1), the ctxBinSampleRatio setting unit 151 may set ctxBinSampleRatio based on the acquired bitDepth. In other words, the ctxBinSampleRatio setting unit 151 may set, based on the bit depth (bitDepth) of the image, the number of context-coded bins depending on the bit depth (ctxBinSampleRatio(bitDepth)), and set it as ctxBinSampleRatio. In that setting, the ctxBinSampleRatio setting unit 151 may set ctxBinSampleRatio(bitDepth) further by using any other parameters (for example, ctxBinSampleRatioBase). Any method of deriving ctxBinSampleRatio(bitDepth) may be used. For example, the ctxBinSampleRatio setting unit 151 may derive ctxBinSampleRatio(bitDepth) by using any one of Equations (3) to (5) above.

On the other hand, if the execution control flag is false (for example, 0), the ctxBinSampleRatio setting unit 151 may set ctxBinSampleRatio based on the acquired ctxBinSampleRatioBase without depending on bitDepth. For example, the ctxBinSampleRatio setting unit 151 may set the acquired ctxBinSampleRatioBase as ctxBinSampleRatio. In the following description, it is assumed that this ctxBinSampleRatioBase is set as ctxBinSampleRatio if the execution control flag is false.

The ctxBinSampleRatio setting unit 151 supplies ctxBinSampleRatio (ctxBinSampleRatio(bitDepth) or ctxBinSampleRatioBase) set as described above to the RemCcbs initial value setting unit 152.

The RemCcbs initial value setting unit 152 performs processing related to setting of the initial value of RemCcbs. For example, the RemCcbs initial value setting unit 152 acquires ctxBinSampleRatio (ctxBinSampleRatio(bitDepth) or ctxBinSampleRatioBase) supplied from the ctxBinSampleRatio setting unit 151.

The RemCcbs initial value setting unit 152 uses the acquired ctxBinSampleRatio to set the initial value of RemCcbs (the maximum number of context-coded bins to be generated in coding or decoding of the image). For example, if the execution control flag is true, the RemCcbs initial value setting unit 152 may use ctxBinSampleRatio (bitDepth) to set the initial value of RemCcbs. Any method of deriving the initial value of RemCcbs may be used. For example, the RemCcbs initial value setting unit 152 may derive the initial value of RemCcbs by using Equation (2) above.

On the other hand, if the execution control flag is false, the RemCcbs initial value setting unit 152 may use ctxBinSampleRatioBase to set the initial value of RemCcbs. Any method of deriving the initial value of RemCcbs may be used. For example, the RemCcbs initial value setting unit 152 may derive the initial value of RemCcbs by using Equation (1) above.

In setting of the initial value of RemCcbs in this way, the RemCcbs initial value setting unit 152 may set the initial value of RemCcbs based on ctxBinSampleRatio and any other parameters. For example, the RemCcbs initial value setting unit 152 may be set, based on the block size of the block to be processed and the execution control flag, the initial value of RemCcbs corresponding to the block to be processed. For example, if the execution control flag is true, the RemCcbs initial value setting unit 152 may acquire ctxBinSampleRatio(bitDepth) supplied from the ctxBinSampleRatio setting unit 151, and further acquire Tb Width and TbHeight of the block to be processed, which are supplied from the outside of the RemCcbs setting device 100. The RemCcbs initial value setting unit 152 may then use the acquired ctxBinSampleRatio(bitDepth), Tb Width, and TbHeight to set the initial value of RemCcbs corresponding to the block to be processed. If the execution control flag is false, the RemCcbs initial value setting unit 152 may acquire ctxBinSampleRatioBase supplied from the ctxBinSampleRatio setting unit 151, and further acquire Tb Width and TbHeight of the block to be processed, which are supplied from the outside of the RemCcbs setting device 100. The RemCcbs initial value setting unit 152 may then use the acquired ctxBinSampleRatioBase, Tb Width, and TbHeight to set the initial value of RemCcbs corresponding to the block to be processed.

The RemCcbs initial value setting unit 152 outputs the set initial value of RemCcbs to the outside of the RemCcbs setting device 100 (for example, a subsequent processing unit).

The RemCcbs setting device 100, which has the above-described configuration in which each processing unit performs the processing as described above, can use the execution control flag to control the number of context-coded bins to be generated. Accordingly, in this case as well, the RemCcbs setting device 100 can suppress an increase in the amount of coding/decoding processing. For example, the RemCcbs setting device 100 can suppress an increase in the amount of CABAC processing for coding/decoding of an image with high bit depth and high bit rate.

<Flow of RemCcbs Setting Processing>

Figure 7:
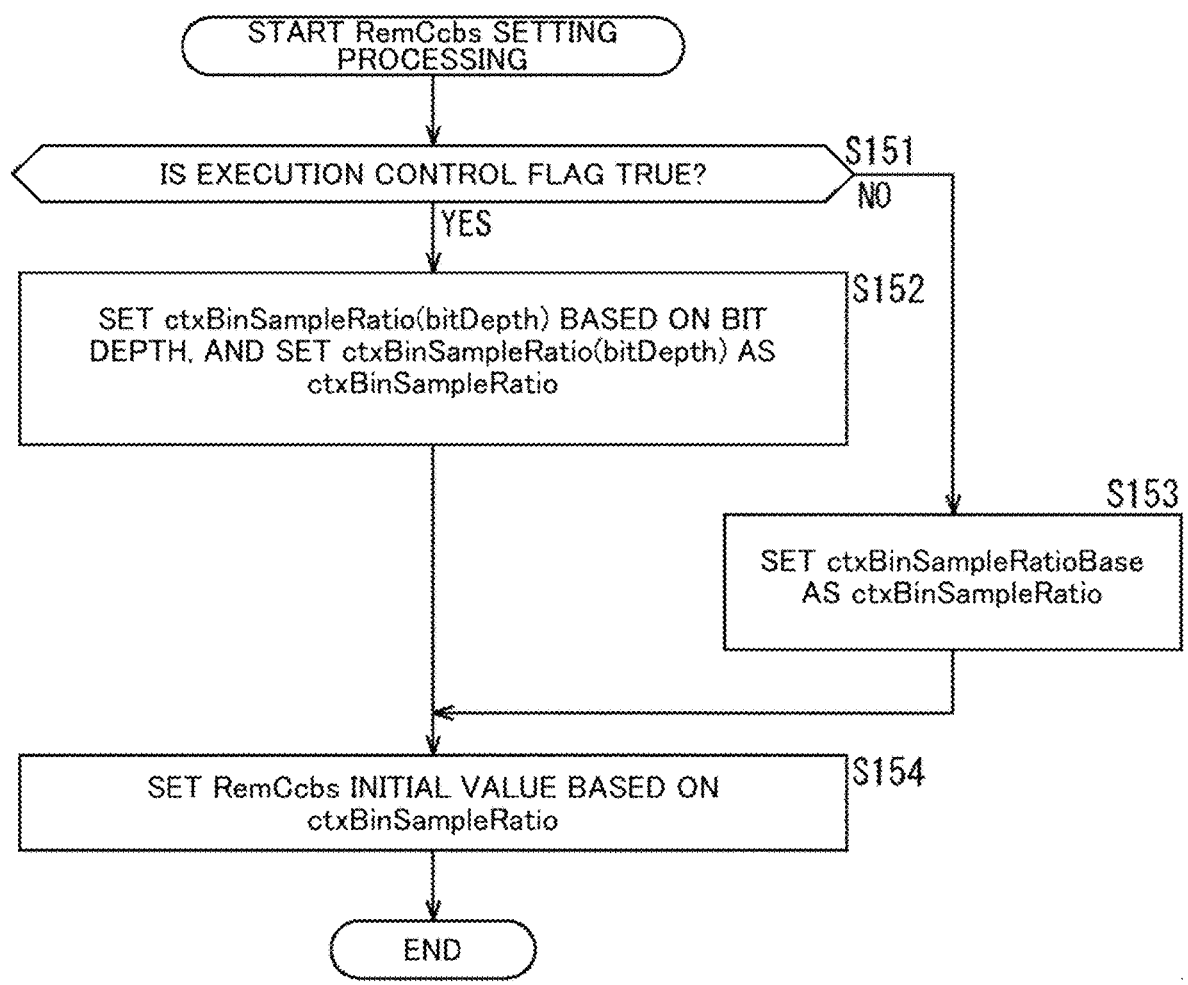
FIG. 7 is a flowchart illustrating an example of a flow of RemCcbs setting processing.

An example of the flow of RemCcbs setting processing in this case will be described with reference to the flowchart of FIG. 7.

When the RemCcbs setting processing is started, the ctxBinSampleRatio setting unit 151 of the RemCcbs setting device 100 determines whether or not the execution control flag is true in step S151. If it is determined that the execution control flag is true, the processing proceeds to step S152.

In step S152, the ctxBinSampleRatio setting unit 151 applies the above-described Method 1-1, sets ctxBinSampleRatio(bitDepth) based on the bit depth, and sets ctxBinSampleRatio(bitDepth) as ctxBinSampleRatio. In that setting, the ctxBinSampleRatio setting unit 151 may set ctxBinSampleRatio(bitDepth) based on the bit depth and any other parameters. For example, the ctxBinSampleRatio setting unit 151 may set ctxBinSampleRatio(bitDepth) based on bitDepth and ctxBinSampleRatioBase. In that setting, the ctxBinSampleRatio setting unit 151 may derive ctxBinSampleRatio(bitDepth) by using, for example, any one of Equations (3) to (5) above. When the processing of step S152 ends, the processing proceeds to step S154.

If it is determined in step S151 that the execution control flag is false, the processing proceeds to step S153.

In step S153, the ctxBinSampleRatio setting unit 151 sets ctxBinSampleRatioBase as ctxBinSampleRatio. When the processing of step S153 ends, the processing proceeds to step S154.

In step S154, the RemCcbs initial value setting unit 152 sets, based on ctxBinSampleRatio (ctxBinSampleRatio(bitDepth) or ctxBinSampleRatioBase) set in step S152 or S153, the RemCcbs initial value of the block to be processed.

Thus, if the execution control flag is true, the RemCcbs initial value setting unit 152 sets the initial value of the allowable number of residual context-coded bins based on the bit depth of the image. In other words, in this case, the RemCcbs initial value setting unit 152 sets a value according to the bit depth of the image as the maximum number of context-coded bins to be generated in coding or decoding of the image.

On the other hand, if the execution control flag is false, the RemCcbs initial value setting unit 152 sets the initial value of the allowable number of residual context-coded bins based on the reference value for the number of context-coded bins. In other words, in this case, the RemCcbs initial value setting unit 152 sets a value according to the reference value for the number of context-coded bins as the maximum number of context-coded bins to be generated in the coding or decoding of the image.

In setting of the initial value of RemCcbs in this way, the RemCcbs initial value setting unit 152 may set the initial value of RemCcbs based on ctxBinSampleRatio and any other parameters. For example, the RemCcbs initial value setting unit 152 may set, based on the block size of the block to be processed and the execution control flag, the initial value of RemCcbs corresponding to the block to be processed. For example, if the execution control flag is true, the RemCcbs initial value setting unit 152 may set, based on the block size (Tb Width and TbHeight) of the block to be processed and the number of context-coded bins depending on the bit depth (ctxBinSampleRatio(bitDepth)), the initial value of RemCcbs corresponding to the block to be processed. In that setting, the RemCcbs initial value setting unit 152 may derive the RemCcbs initial value by using, for example, Equation (2) above. If the execution control flag is false, the RemCcbs initial value setting unit 152 may set, based on the block size (Tb Width and TbHeight) of the block to be processed and the reference value (ctxBinSampleRatioBase) for the number of context-coded bins, the initial value of RemCcbs corresponding to the block to be processed. In that setting, the RemCcbs initial value setting unit 152 may derive the RemCcbs initial value by using, for example, Equation (1) above. When the processing of step S154 ends, the RemCcbs setting processing ends.

The RemCcbs setting device 100, which executes the RemCcbs setting processing in this way, can use the execution control flag to control the number of context-coded bins to be generated. Accordingly, in this case as well, the RemCcbs setting device 100 can suppress an increase in the amount of coding/decoding processing. For example, the RemCcbs setting device 100 can suppress an increase in the amount of CABAC processing for coding/decoding of an image with high bit depth and high bit rate.

<Reference Value Control Flag>

As indicated in the seventh row from the top of the table in FIG. 2, the maximum number of context-coded bins may be set according to processing speed control (Method 2). For example, a control flag indicating a CABAC processing speed mode may be transmitted from the coding side to the decoding side, and the maximum number of context-coded bins may be set according to the control flag. As a result, it is possible to control the number of context-coded bins to be generated in accordance with the processing speed control, and thus to suppress an increase in the amount of coding/decoding processing. For example, it is possible to suppress an increase in the amount of CABAC processing for coding/decoding of an image with high bit depth and high bit rate.

This control flag may be flag information that has any value. For example, the control flag of false (for example, 0) may indicate that CABAC is to be performed in a normal-speed mode and the control flag of true (for example, 1) may indicate that CABAC is to be performed in a high-speed mode. The high-speed mode is an operating mode that requires less processing time than the normal-speed mode.

For example, an image processing device may include a maximum context-coded bin number setting unit that sets, according to such a control flag, a maximum number of context-coded bins to be generated in coding or decoding of an image.

For example, in an image processing method, a maximum number of context-coded bins to be generated in coding or decoding of an image may be set according to such a control flag. In other words, a parameter indicating the maximum number of context-coded bins to be applied in coding or decoding of an image may be set based on a control flag indicating a processing speed mode.

For example, if the control flag indicates the normal-speed mode (that is, the control flag of false), the maximum context-coded bin number setting unit may set the maximum number of context-coded bins based on a first reference value. In other words, in the case where coding/decoding of the image is performed in normal processing time, the maximum context-coded bin number setting unit may set the first reference value for the normal-speed mode as a reference value for the number of context-coded bins at the CG level, and use the first reference value to set the maximum number of context-coded bins.

On the other hand, if the control flag indicates the high-speed mode (that is, the control flag of true), the maximum context-coded bin number setting unit may set the maximum number of context-coded bins based on a second reference value that is smaller than the first reference value. In other words, in the case where coding/decoding of the image is performed in a shorter time than normal, the maximum context-coded bin number setting unit may set the second reference value for the high-speed mode, that is, a value smaller than the first reference value, as a reference value for the number of context-coded bins at the CG level, and use the second reference value to set the maximum number of context-coded bins.

This makes it possible to reduce the number of context-coded bins to be generated if the control flag indicates the high-speed mode as compared to in the case of the normal-speed mode, and thus to perform coding/decoding at a higher speed. In other words, if the control flag indicates the high-speed mode, it is possible to suppress an increase in the amount of coding/decoding processing as compared to in the case of the normal-speed mode. Therefore, for example, the control flag indicating the high-speed mode in coding/decoding of an image with high bit depth and high bit rate makes it possible to suppress an increase in the amount of CABAC processing.

In other words, this control flag can also be said to be a flag (also referred to as a reference value control flag) to control the value of the reference value for the number of context-coded bins at the CG level. Thus, in the case where Method 2 is applied, this reference value control flag may be transmitted from the coding side to the decoding side, as shown in the bottom row of the table in FIG. 2. Then, the reference value for the number of context-coded bins may be set according to the reference value control flag. Then, the maximum number of context-coded bins may be set according to the reference value for the number of context-coded bins according to the reference value control flag (Method 2-1).

The maximum context-coded bin number setting unit may set, based on the block size of the block to be processed and this control flag (reference value control flag), the maximum number of context-coded bins corresponding to the block to be processed.

<RemCcbs Setting Device>

Figure 8:
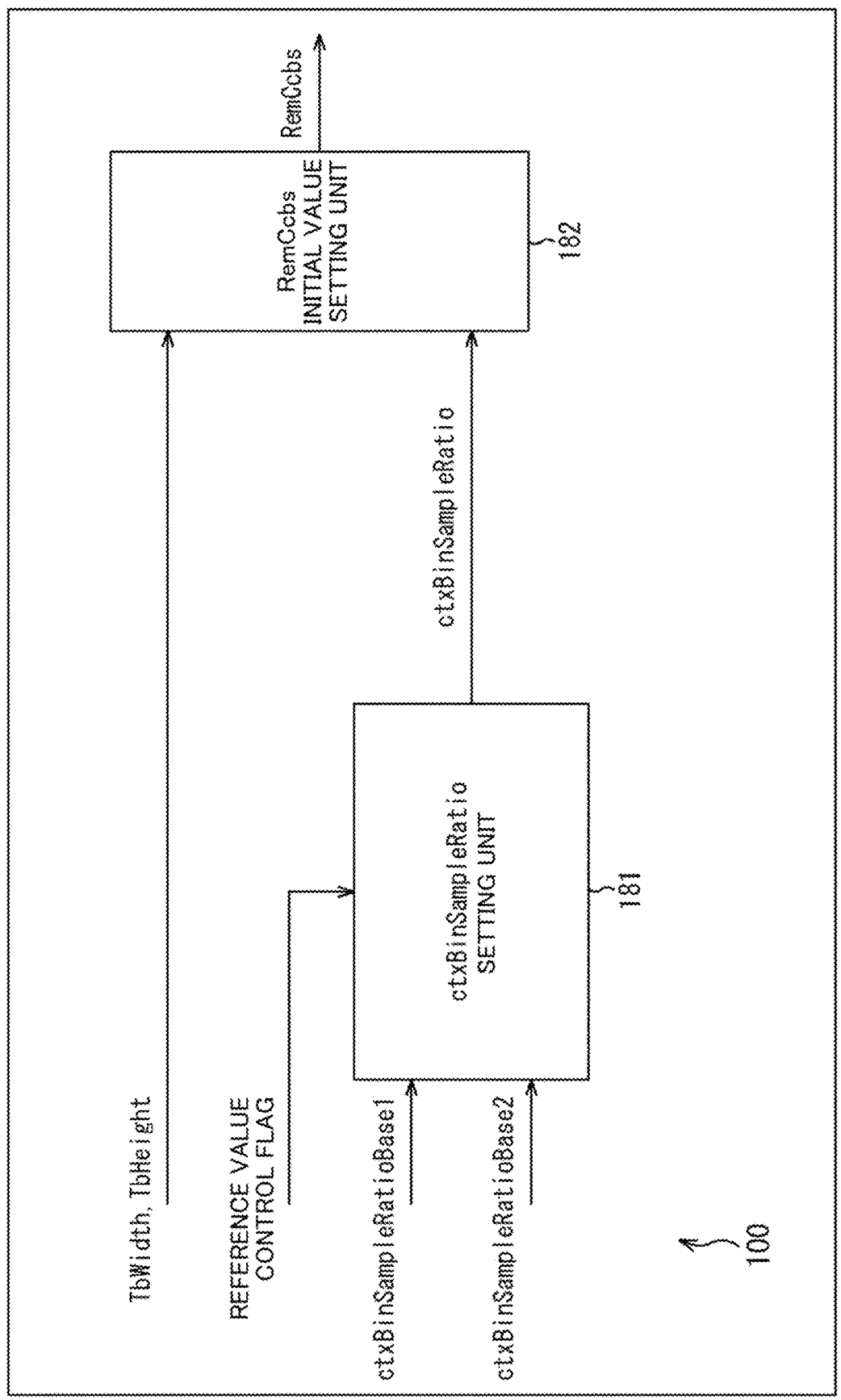
FIG. 8 is a block diagram illustrating a main configuration example of a RemCcbs setting device.

FIG. 8 is a block diagram illustrating a main configuration example of a RemCcbs setting device 100 in that case. FIG. 8 illustrates principal components such as processing units and data flows, and FIG. 8 does not illustrate all components. In other words, the RemCcbs setting device 100 may include a processing unit(s) not illustrated as a block(s) in FIG. 8. The RemCcbs setting device 100 may have processing and data flow(s) not indicated as arrows or the like in FIG. 8.

In the case of FIG. 8, the RemCcbs setting device 100 includes a ctxBinSampleRatio setting unit 181 and a RemCcbs initial value setting unit 182.

The ctxBinSampleRatio setting unit 181 performs processing related to setting of ctxBinSampleRatio, which is a parameter indicating the number of context-coded bins. For example, the ctxBinSampleRatio setting unit 181 acquires ctxBinSampleRatioBase1 (the first reference value for the number of context-coded bins at the CG level) and ctxBinSampleRatioBase2 (the second reference value for the number of context-coded bins at the CG level), which are supplied from the outside of the RemCcbs setting device 100. ctxBinSampleRatioBase2 is a smaller value than ctxBinSampleRatioBase1. ctxBinSampleRatioBase1 has any value. For example, ctxBinSampleRatioBase1=28 may be given. ctxBinSampleRatioBase2 has any value within a range smaller than that of ctxBinSampleRatioBase1. For example, ctxBinSampleRatioBase2=0 may be given.

The ctxBinSampleRatio setting unit 181 also acquires a reference value control flag supplied from the outside of the RemCcbs setting device 100. This reference value control flag is a control flag to control the reference value for the number of context-coded bins at the CG level.

The ctxBinSampleRatio setting unit 181 sets the value of ctxBinSampleRatio based on the reference value control flag. For example, if the reference value control flag is false (for example, 0), the ctxBinSampleRatio setting unit 181 may use the acquired ctxBinSampleRatioBase1 to set ctxBinSampleRatio. Any method of setting this ctxBinSampleRatio may be used as long as ctxBinSampleRatioBase1 is used. For example, the ctxBinSampleRatio setting unit 181 may set the acquired ctxBinSampleRatioBase1 as ctxBinSampleRatio. In the following description, it is assumed that ctxBinSampleRatioBase1 is set as ctxBinSampleRatio if the reference value control flag is false.

On the other hand, if the reference value control flag is true (for example, 1), the ctxBinSampleRatio setting unit 181 may use the acquired ctxBinSampleRatioBase2 to set ctxBinSampleRatio. Any method of setting this ctxBinSampleRatio may be used as long as ctxBinSampleRatioBase2 is used. For example, the ctxBinSampleRatio setting unit 181 may set the acquired ctxBinSampleRatioBase2 as ctxBinSampleRatio. In the following description, it is assumed that ctxBinSampleRatioBase2 is set as ctxBinSampleRatio if the reference value control flag is false.

The ctxBinSampleRatio setting unit 181 supplies ctxBinSampleRatio (ctxBinSampleRatioBase1 or ctxBinSampleRatioBase2) set as described above to the RemCcbs initial value setting unit 182.

The RemCcbs initial value setting unit 182 performs processing related to setting of the initial value of RemCcbs. For example, the RemCcbs initial value setting unit 182 acquires ctxBinSampleRatio (ctxBinSampleRatioBase1 or ctxBinSampleRatioBase2) supplied from the ctxBinSampleRatio setting unit 181. The RemCcbs initial value setting unit 182 uses the acquired ctxBinSampleRatio to set the initial value of RemCcbs (the maximum number of context-coded bins to be generated in coding or decoding of the image). Thus, the RemCcbs initial value setting unit 182 sets the initial value of RemCcbs according to the control flag (the reference value control flag) indicating a processing speed mode. In other words, the RemCcbs initial value setting unit 182 sets a value according to the control flag indicating a processing speed mode as the initial value of RemCcbs.

For example, if the reference value control flag is false, the RemCcbs initial value setting unit 182 may use the acquired ctxBinSampleRatioBase1 (the first reference value) to set the initial value of RemCcbs. If the reference value control flag is true, the RemCcbs initial value setting unit 182 may use the obtained ctxBinSampleRatioBase2 (the second reference value) to set the initial value of RemCcbs. Any method may be used to derive this initial value of RemCcbs. For example, the RemCcbs initial value setting unit 182 may derive the initial value of RemCcbs by using Equation (1) above.

In setting of the initial value of RemCcbs in this way, the RemCcbs initial value setting unit 182 may set the initial value of RemCcbs based on ctxBinSampleRatio and any other parameters. For example, the RemCcbs initial value setting unit 182 may set, based on the block size of the block to be processed and the reference value control flag, the initial value of RemCcbs corresponding to the block to be processed. For example, if the reference value control flag is false, the RemCcbs initial value setting unit 182 may acquire ctxBinSampleRatioBase1 (the first reference value) supplied from the ctxBinSampleRatio setting unit 181, and further acquire Tb Width and TbHeight of the block to be processed, which are supplied from the outside of the RemCcbs setting device 100. The RemCcbs initial value setting unit 182 may then use the acquired ctxBinSampleRatioBase1, Tb Width, and TbHeight to set the initial value of RemCcbs corresponding to the block to be processed. If the reference value control flag is true, the RemCcbs initial value setting unit 182 may acquire ctxBinSampleRatioBase2 (the second reference value) supplied from the ctxBinSampleRatio setting unit 181, and further acquire Tb Width and TbHeight of the block to be processed, which are supplied from the outside of the RemCcbs setting device 100. The RemCcbs initial value setting unit 182 may then use the acquired ctxBinSampleRatioBase2, Tb Width, and TbHeight to set the initial value of RemCcbs corresponding to the block to be processed.

The RemCcbs initial value setting unit 182 outputs the set initial value of RemCcbs to the outside of the RemCcbs setting device 100 (for example, a subsequent processing unit).

The RemCcbs setting device 100, which has the above-described configuration in which each processing unit performs the processing as described above, can use the reference value control flag to control the number of context-coded bins to be generated. Thus, the RemCcbs setting device 100 can control according to CABAC processing speed control the number of context-coded bins to be generated. Accordingly, in this case as well, the RemCcbs setting device 100 can suppress an increase in the amount of coding/decoding processing. For example, the RemCcbs setting device 100 can suppress an increase in the amount of CABAC processing for coding/decoding of the image with high bit depth and high bit rate.

<Flow of RemCcbs Setting Processing>

Figure 9:
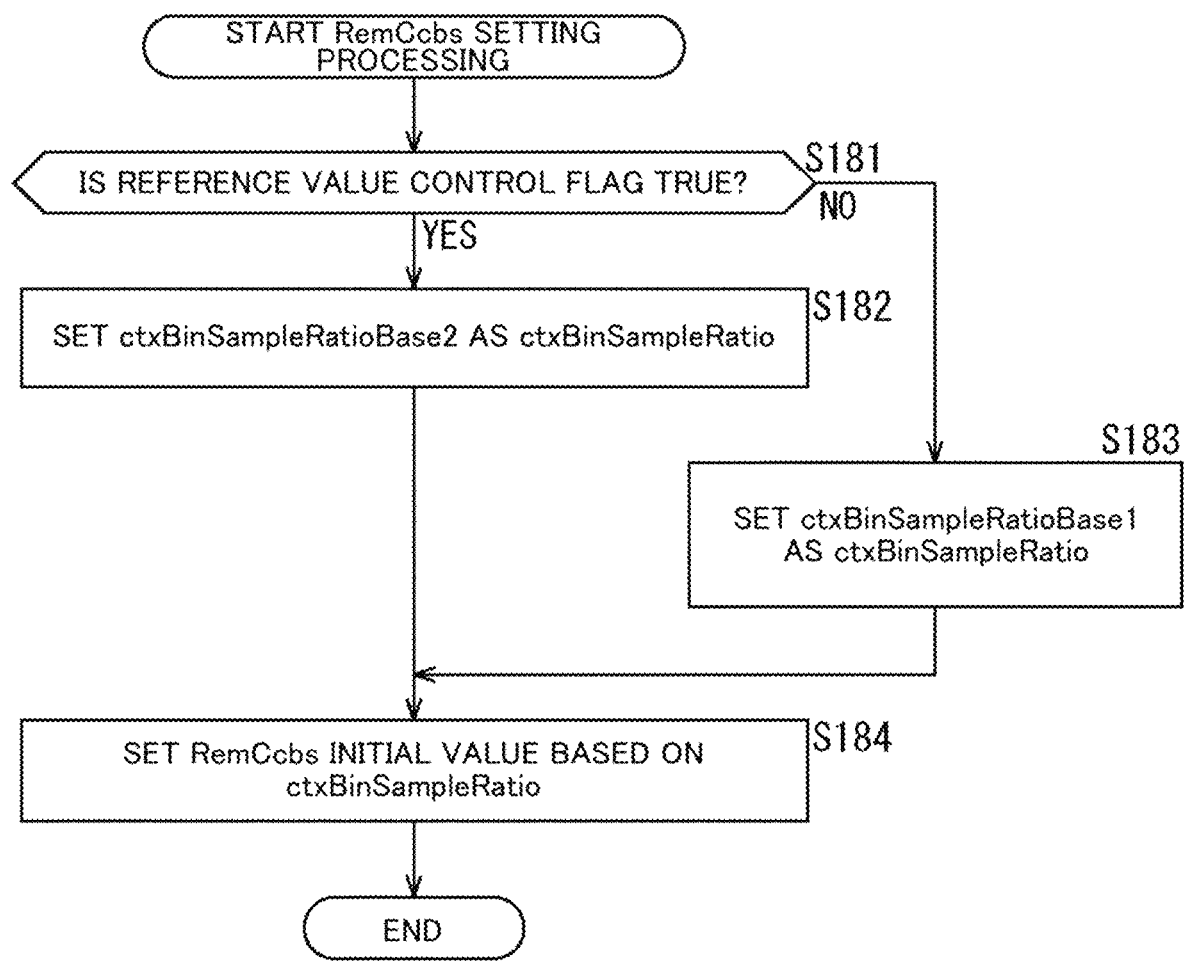
FIG. 9 is a flowchart illustrating an example of a flow of RemCcbs setting processing.

An example of the flow of RemCcbs setting processing in this case will be described with reference to the flowchart of FIG. 9.

When the RemCcbs setting processing is started, the ctxBinSampleRatio setting unit 181 of the RemCcbs setting device 100 determines whether or not the reference value control flag is true in step S181. If it is determined that the reference value control flag is true, the processing proceeds to step S182. In step S182, the ctxBinSampleRatio setting unit 181 sets ctxBinSampleRatioBase2 as ctxBinSampleRatio. When the processing of step S182 ends, the processing proceeds to step S184.

If it is determined in step S181 that the reference value control flag is false, the processing proceeds to step S183.

In step S183, the ctxBinSampleRatio setting unit 181 sets ctxBinSampleRatioBase1 as ctxBinSampleRatio. When the processing of step S183 ends, the processing proceeds to step S184.

In step S184, the RemCcbs initial value setting unit 182 sets, based on the ctxBinSampleRatio (ctxBinSampleRatioBase1 or ctxBinSampleRatioBase2) set in step S182 or S183, the RemCcbs initial value corresponding to the block to be processed.

Thus, the RemCcbs initial value setting unit 182 sets the initial value of the allowable number of residual context-coded bins based on the reference value control flag. In other words, the RemCcbs initial value setting unit 182 sets a value according to the reference value control flag as the maximum number of context-coded bins to be generated in coding or decoding of the image.

In setting of the initial value of RemCcbs in this way, the RemCcbs initial value setting unit 182 may set the initial value of RemCcbs based on ctxBinSampleRatio and any other parameters. For example, the RemCcbs initial value setting unit 182 may set, based on the block size of the block to be processed and the reference value control flag, the initial value of RemCcbs corresponding to the block to be processed. For example, the RemCcbs initial value setting unit 182 may set, based on the block size (Tb Width and TbHeight) of the block to be processed and the reference value (ctxBinSampleRatioBase1 or ctxBinSampleRatioBase2) for the number of context-coded bins according to the reference value control flag, the initial value of RemCcbs corresponding to the block to be processed. In that setting, the RemCcbs initial value setting unit 182 may derive the RemCcbs initial value by using, for example, Equation (1) above.

When the processing of step S184 ends, the RemCcbs setting processing ends. The RemCcbs setting device 100, which executes the RemCcbs setting processing in this way, can use the reference value control flag to control the number of context-coded bins to be generated. Thus, the RemCcbs setting device 100 can control according to CABAC processing speed control the number of context-coded bins to be generated. Accordingly, in this case as well, the RemCcbs setting device 100 can suppress an increase in the amount of coding/decoding processing. For example, the RemCcbs setting device 100 can suppress an increase in the amount of CABAC processing for coding/decoding of the image with high bit depth and high bit rate.

<Coding Method>

Any method may be used to code the image using RemCcbs as long as it uses context, and is not limited to CABAC described above as an example.

3. Embodiments

<Image Coding Device>

Figure 10:
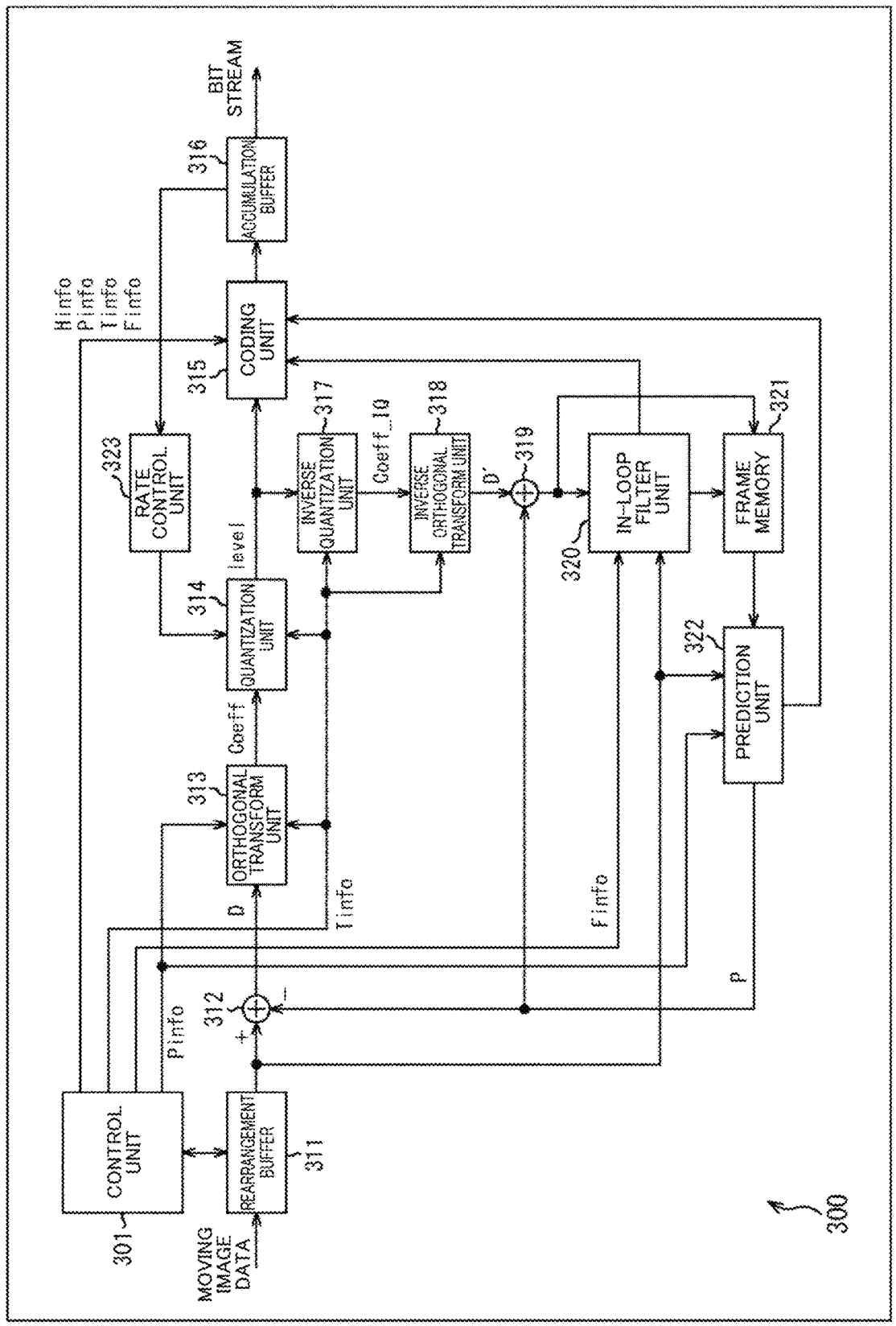
FIG. 10 is a block diagram illustrating a main configuration example of an image coding device.

The present technology described above can be applied to any configuration. For example, the present technology may be applied to an image coding device. FIG. 10 is a block diagram illustrating an example of a configuration of an image coding device, which is an aspect of an image processing device to which the present technology is applied. The image coding device 300 illustrated in FIG. 10 is a device that codes image data of a moving image. For example, the image coding device 300 can code image data of a moving image by the coding method described in any one of NPL described above.

FIG. 10 illustrates major parts such as processing units (blocks) and data flows, but processing units and data flows are not limited to those illustrated in FIG. 10. In other words, the image coding device 300 may include a processing unit(s) not illustrated as a block(s) in FIG. 10. The image coding device 300 may have processing and data flow(s) not indicated by arrows or the like in FIG. 10. As illustrated in FIG. 10, the image coding device 300 includes a control unit 301, a rearrangement buffer 311, an calculation unit 312, an orthogonal transform unit 313, a quantization unit 314, a coding unit 315, an accumulation buffer 316, an inverse quantization unit 317, an inverse orthogonal transform unit 318, a calculation unit 319, an in-loop filter unit 320, a frame memory 321, a prediction unit 322, and a rate control unit 323.

<Control Unit>

The control unit 301 divides the moving image data held by the rearrangement buffer 311 into blocks (CU, PU, transform block, etc.), which are units of processing, based on an external or pre-specified processing unit block size. In addition, the control unit 301 determines, based on, for example, rate-distortion optimization (RDO), coding parameters (header information Hinfo, prediction mode information Pinfo, transform information Tinfo, filter information Finfo, etc.) to be supplied to each block.

Details of such coding parameters will be described later. When the control unit 301 determines the coding parameters as described above, the control unit 301 supplies them to each block. A specific description is as follows.

The header information Hinfo is supplied to each block. The prediction mode information Pinfo is supplied to the coding unit 315 and the prediction unit 322. The transform information Tinfo is supplied to the coding unit 315, the orthogonal transform unit 313, the quantization unit 314, the inverse quantization unit 317, and the inverse orthogonal transform unit 318. The filter information Finfo is supplied to the in-loop filter unit 320.

<Rearrangement Buffer>

Each field (input image) of moving image data is input to the image coding device 300 in the order of reproduction (order of display) of the input images. The rearrangement buffer 311 acquires and holds (stores) each input image in the order of reproduction (order of display) of the input images. The rearrangement buffer 311 rearranges the input images in the order of coding (decoding) and/or divides the input image into blocks, which are units of processing, under the control of the control unit 301. The rearrangement buffer 311 supplies each processed input image to the calculation unit 312. The rearrangement buffer 311 also supplies each input image (original image) to the prediction unit 322 and the in-loop filter unit 320.

<Calculation Unit>

The calculation unit 312 receives as inputs an image I corresponding to a block, which is a unit of processing, and a predicted image P supplied from the prediction unit 322, subtracts the predicted image P from the image I according to the following equation to derive a prediction residual D, and supplies the prediction residual D to the orthogonal transform unit 313.

$$D = I - P$$

<Orthogonal Transform Unit>

The orthogonal transform unit 313 receives as inputs the prediction residual D supplied from the calculation unit 312 and transform information Tinfo supplied from the control unit 301, and performs orthogonal transform on the prediction residual D based on the transform information Tinfo to derive a transform coefficient Coeff. For example, the orthogonal transform unit 313 performs primary transform on the prediction residual D to generate a primary transform coefficient, and performs secondary transform on the primary transform coefficient based on an ST identifier to generate a secondary transform coefficient. The orthogonal transform unit 313 supplies the obtained secondary transform coefficient to the quantization unit 314 as a transform coefficient Coeff. The orthogonal transform unit 313 is not limited to orthogonal transform, and can perform any coefficient transform. Thus, the transform coefficient Coeff may be derived by performing any coefficient transform on the prediction residual D. Therefore, the orthogonal transform unit 313 can also be said to be a coefficient transform unit.

<Quantization Unit>

The quantization unit 314 receives as inputs the transform coefficient Coeff supplied from the orthogonal transform unit 313 and the transform information Tinfo supplied from the control unit 301, and scales (quantizes) the transform coefficient Coeff based on the transform information Tinfo. The rate of this quantization is controlled by the rate control unit 323. The quantization unit 314 supplies the quantization coefficient level (also referred to as quantization coefficient qcoeff), which is the level value of the transform coefficient quantized in this way, to the coding unit 315 and the inverse quantization unit 317.

<Coding Unit>

The coding unit 315 receives as inputs the quantization coefficient level supplied from the quantization unit 314, various coding parameters (header information Hinfo, prediction mode information Pinfo, transform information Tinfo, filter information Finfo, etc.) supplied from the control unit 301, information about a filter, such as a filter coefficient supplied from the in-loop filter unit 320, and information about an optimum prediction mode supplied from the prediction unit 322. The coding unit 315 performs variable-length coding (for example, arithmetic coding) on the quantization coefficient level to generate a bit string (coded data).

Further, the coding unit 315 includes in the filter information Finfo the information about the filter supplied from the in-loop filter unit 320 and includes in the prediction mode information Pinfo the information about the optimum prediction mode supplied from the prediction unit 322. The coding unit 315 then codes the above-described various coding parameters (header information Hinfo, prediction mode information Pinfo, transform information Tinfo, filter information Finfo, etc.) to generate a bit string.

Further, the coding unit 315 multiplexes the bit strings (coded data) of the various types of information generated as described above to generate a bit stream of the coded data. The coding unit 315 supplies the bit stream to the accumulation buffer 316.

<Accumulation Buffer>

The accumulation buffer 316 temporarily holds the bit stream of the coded data obtained by the coding unit 315. The accumulation buffer 316 outputs the held bit stream of the coded data to the outside of the image coding device 300 at a predetermined timing. For example, this bit stream is transmitted to the decoding side via any recording medium, any transmission medium, any information processing device, and the like. In other words, the accumulation buffer 316 is also a transmission unit that transmits a bit stream (coded data).

<Inverse Quantization Unit>

The inverse quantization unit 317 performs processing related to inverse quantization. For example, the inverse quantization unit 317 receives as inputs the quantization coefficient level supplied from the quantization unit 314 and the transform information Tinfo supplied from the control unit 301, and scales (inversely quantizes) the value of the quantization coefficient level based on the transform information Tinfo. This inverse quantization is the inverse processing of the quantization performed in the quantization unit 314. The inverse quantization unit 317 supplies a transform coefficient Coeff_IQ obtained by such inverse quantization to the inverse orthogonal transform unit 318.

<Inverse Orthogonal Transform Unit>

The inverse orthogonal transform unit 318 performs processing with respect to inverse orthogonal transform. For example, the inverse orthogonal transform unit 318 receives as inputs the transform coefficient Coeff_IQ supplied from the inverse quantization unit 317 and the transform information Tinfo supplied from the control unit 301, and performs inverse orthogonal transform on the transform coefficient Coeff_IQ based on the transform information Tinfo to derive a prediction residual D'. This inverse orthogonal transform is the inverse processing of the orthogonal transform performed by the orthogonal transform unit 313. The inverse orthogonal transform unit 318 supplies the prediction residual D' obtained by such inverse orthogonal transform to the calculation unit 319.

In other words, the inverse orthogonal transform unit 318 performs the inverse processing of the processing performed by the orthogonal transform unit 313. Thus, as in the case of the orthogonal transform unit 313, the inverse orthogonal transform unit 318 is not limited to inverse orthogonal transform, and can perform any inverse coefficient transform. This inverse coefficient transform is the inverse processing of the coefficient transform performed by the orthogonal transform unit 313. Thus, the prediction residual D' may be derived by performing any inverse coefficient transform on the transform coefficient Coeff_IQ. Therefore, the inverse orthogonal transform unit 318 can also be said to be an inverse coefficient transform unit.

<Calculation Unit>

The calculation unit 319 receives as inputs the prediction residual D' supplied from the inverse orthogonal transform unit 318 and the predicted image P supplied from the prediction unit 322. The calculation unit 319 adds the prediction residual D' to the predicted image P corresponding to the prediction residual D' to derive a locally decoded image Rlocal. The calculation unit 319 supplies the derived locally decoded image Rlocal to the in-loop filter unit 320 and the frame memory 321.

<In-Loop Filter Unit>

The in-loop filter unit 320 performs processing related to in-loop filtering. For example, the in-loop filter unit 320 receives as inputs the locally decoded image Rlocal supplied from the calculation unit 319, the filter information Finfo supplied from the control unit 301, and the input image (original image) supplied from the rearrangement buffer 311. Any information may be input to the in-loop filter unit 320, and information other than the above-listed information may be input. For example, prediction mode, motion information, code amount target value, quantization parameter QP, picture type, block (CU, CTU, etc.) information and the like may be input to the in-loop filter unit 320, as necessary.

The in-loop filter unit 320 appropriately filters the locally decoded image Rlocal based on the filter information Finfo. The in-loop filter unit 320 also uses the input image (original image) and other input information for the filtering, as necessary.

For example, as described in NPL 11, the in-loop filter unit 320 applies four in-loop filters: a bilateral filter, a deblocking filter (DBF), an adaptive offset filter (Sample Adaptive Offset (SAO)), and an adaptive loop filter (ALF) in this order. Any of the filters may be applied and any order of the filters may be applied, that is, they can be selected as appropriate.

Of course, any filtering may be performed by the in-loop filter unit 320 and the filtering is not limited to the above example. For example, the in-loop filter unit 320 may apply a Wiener filter or the like.

The in-loop filter unit 320 supplies the filtered locally decoded image Rlocal to the frame memory 321. When information about a filter, such as a filter coefficient, is transmitted to the decoding side, the in-loop filter unit 320 supplies the information about the filter to the coding unit 315.

<Frame Memory>

The frame memory 321 performs processing related to storage of image-related data. For example, the frame memory 321 receives as inputs the locally decoded image Rlocal supplied from the calculation unit 319 and the filtered locally decoded image Rlocal supplied from the in-loop filter unit 320, and holds (stores) them. The frame memory 321 also uses the locally decoded image Rlocal to reconstruct and hold a decoded image R for each picture (store it in a buffer within the frame memory 321). The frame memory 321 supplies the decoded image R (or part thereof) to the prediction unit 322 in response to a request from the prediction unit 322.

<Prediction Unit>

The prediction unit 322 performs processing related to generation of a predicted image. For example, the prediction unit 322 receives as inputs the prediction mode information Pinfo supplied from the control unit 301, the input image (original image) supplied from the rearrangement buffer 311, and the decoded image R (or part thereof) read from the frame memory 321. The prediction unit 322 uses the prediction mode information Pinfo and the input image (original image) to perform prediction processing such as inter-prediction and intra-prediction, refers to the decoded image R as a reference image to perform prediction, and performs motion compensation processing based on the result of the prediction to generate a predicted image P. The prediction unit 322 supplies the generated predicted image P to the calculation unit 312 and the calculation unit 319. The prediction unit 322 also supplies information about the prediction mode selected by the above processing, that is, the optimum prediction mode, to the coding unit 315 as necessary.

<Rate Control Unit>

The rate control unit 323 performs processing related to rate control. For example, the rate control unit 323 controls the rate of the quantization operation of the quantization unit 314 based on the code amount of coded data accumulated in the accumulation buffer 316 such that overflow or underflow does not occur.

The processing units (the control unit 301, and the rearrangement buffer 311 to the rate control unit 323) each have any configuration. For example, each processing unit may be configured as a logic circuit that implements the aforementioned processing. Further, each processing unit may include, for example, a CPU, a ROM, and a RAM, which are used to execute a program to implement the above-described processing. Of course, each processing unit may have both the configurations such that part of the above processing is implemented by a logic circuit and the others are implemented by a program being executed. The processing units may have independent configurations, for example, some processing units may implement parts of the aforementioned processing according to a logic circuit, some other processing units may implement the aforementioned processing by executing a program, and some other processing units may implement the aforementioned processing according to both a logic circuit and execution of a program.

In the image coding device 300 having the above configuration, the present technology described in <2. Suppression of increase in context-coded bins> may be applied to the coding unit 315. For example, Method 1-1 according to the present technology may be applied to the image coding device 300.

<Coding Unit>

Figure 11:
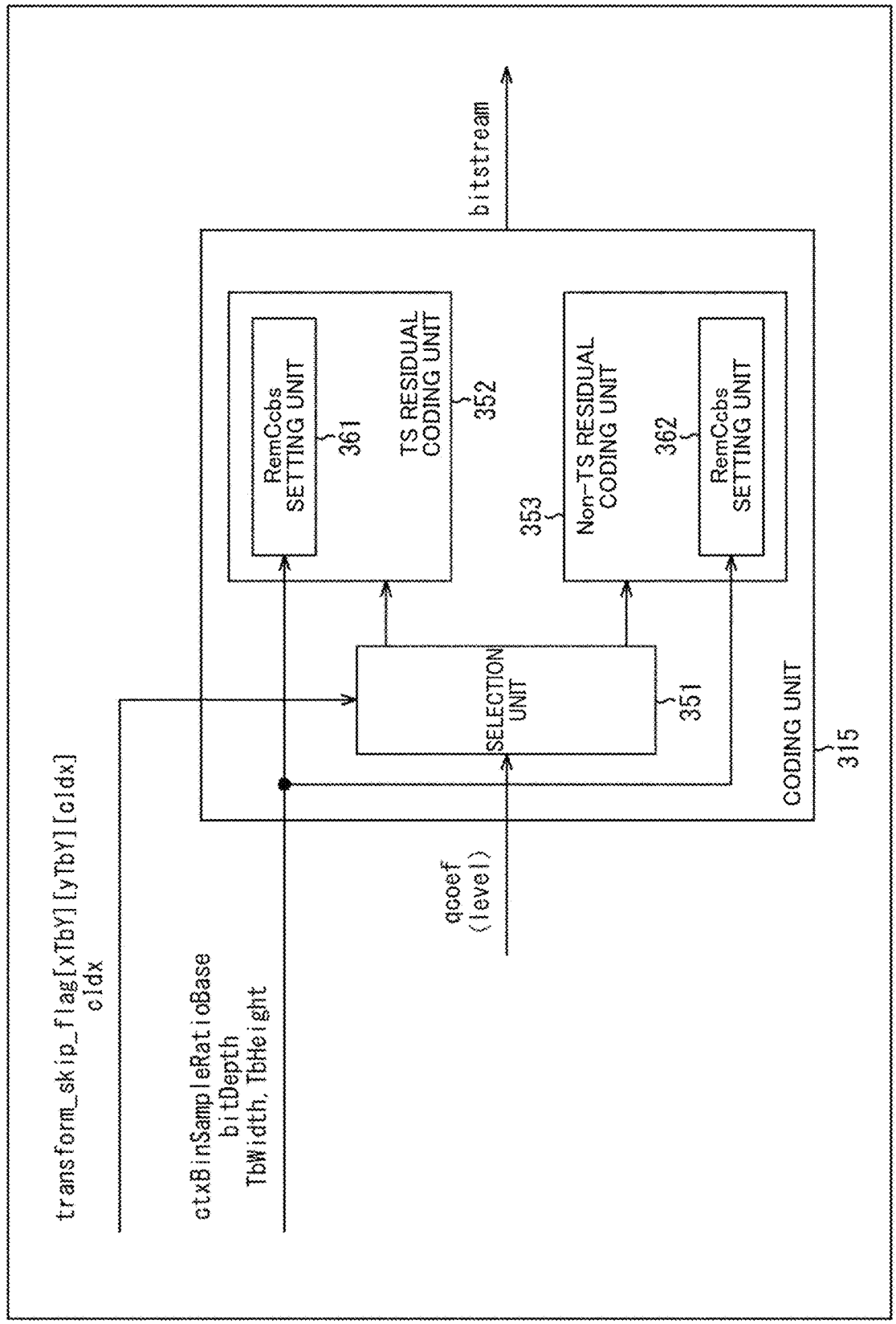
FIG. 11 is a block diagram illustrating a main configuration example of a coding unit.

FIG. 11 is a block diagram illustrating a main configuration example of a coding unit 315 in that case. As illustrated in FIG. 11, the coding unit 315 in this case includes a selection unit 351, a TS residual coding unit 352, and a Non-TS residual coding unit 353.

The selection unit 351 performs processing related to control of the operation mode of the coding unit 315. For example, the selection unit 351 acquires the quantization coefficient level (quantization coefficient qcoeff) supplied from the quantization unit 314. The selection unit 351 also acquires transform_skip_flag[xTbY][yTbY][cIdx] and cIdx, which are supplied from the control unit 301. transform_skip_flag[xTbY][yTbY][cIdx] is a transform skip flag that indicates whether or not to skip (omit) the coefficient transform to be performed by the orthogonal transform unit 313 (the inverse coefficient transform to be performed by the inverse orthogonal transform unit 318). For example, if transform_skip_flag is true (for example, 1), the orthogonal transform unit 313 skips the coefficient transform for the prediction residual D. The inverse orthogonal transform unit 318 also skips the inverse coefficient transform for the transform coefficient Coeff_IQ. On the other hand, if transform_skip_flag is false (for example, 0), the orthogonal transform unit 313 performs coefficient transform on the prediction residual D to generate a transform coefficient Coeff. Further, the inverse orthogonal transform unit 318 performs inverse coefficient transform on the transform coefficient Coeff_IQ to generate a prediction residual D'. cIdx is a component identifier for identifying a component such as a luminance component or a color component.

The selection unit 351 determines whether or not transform skip has been performed based on transform_skip_flag [xTbY][yTbY][cIdx] and cIdx, and selects based on the result of the determination to code the quantization coefficient level in a TS residual coding mode or a Non-TS residual coding mode. The TS residual coding mode is a mode for coding the quantization coefficient level when coefficient transform has been skipped in the orthogonal transform unit 313. The Non-TS residual coding mode is a mode for coding the quantization coefficient level when coefficient transform has been performed in the orthogonal transform unit 313.

When it is determined that coefficient transform has been skipped, the selection unit 351 supplies the quantization coefficient level to the TS residual coding unit 352. When it is determined that coefficient transform has been performed, the selection unit 351 supplies the quantization coefficient level to the Non-TS residual coding unit 353.

The selection unit 351 may use a multiple transform selection (MTS) identifier (mts_idx[xTbY][yTbY][cIdx]) that is an identifier related to the primary transform, instead of transform_skip_flag, to determine whether or not transform skip has been performed. In addition, the selection unit 351 may determine whether or not transform skip has been performed, based on transform mode information, which is information about the mode of coefficient transform processing performed by the orthogonal transform unit 313, and based on cIdx. This transform mode information includes transform_skip_flag and mts_idx.

The TS residual coding unit 352 performs processing related to coding in the TS residual coding mode. For example, the TS residual coding unit 352 acquires the quantization coefficient level supplied from the selection unit 351. The TS residual coding unit 352 codes the acquired quantization coefficient level in the TS residual coding mode. The TS residual coding unit 352 includes a RemCcbs setting unit 361. The RemCcbs setting unit 361 sets the initial value of RemCcbs. The TS residual coding unit 352 codes the acquired quantization coefficient level by using RemCcbs.

FIG. 12 is a diagram illustrating an example of syntax for the TS residual coding mode. As illustrated in FIG. 12, if RemCcbs is equal to or greater than a threshold value (>=4), the TS residual coding unit 352 context-codes syntax (sig_coeff_flag, coeff_sign_flag, abs_level_gtx_flag[j], par_level_flag, etc.) for the level value of transform coefficient (that is, the quantization coefficient level) (Pass1 and Pass2 in FIG. 12). If RemCcbs is less than the threshold value (<4), the TS residual coding unit 352 bypass-codes syntax (abs_remainder, coeff_sign_flag) for the level value of transform coefficient (that is, the quantization coefficient level) (Pass3 in FIG. 12).

sig_coeff_flag is a flag that indicates whether or not the level of transform coefficient corresponding to that flag (that is, the quantization coefficient level) is 0. For example, if sig_coeff_flag is true (for example, 1), it indicates that the corresponding quantization coefficient level is not 0. If sig_coeff_flag is false (for example, 0), it indicates that the corresponding quantization coefficient level is 0. coeff_sign_ flag is a flag that specifies the sign of the level of the corresponding transform coefficient (that is, the quantization coefficient level). For example, if coeff_sign_flag is false (for example, 0), it indicates that the corresponding quantization coefficient level is positive. If coeff_sign_flag is true (for example, 1), it indicates that the corresponding quantization coefficient level is negative. abs_level_gtx_flag[j] is a flag that specifies whether or not the absolute value of the level of the corresponding transform coefficient (that is, the quantization coefficient level) is greater than (j<<1)+1. par_level_flag is a flag that specifies the parity of the level of the corresponding transform coefficient (that is, the quantization coefficient level). abs_remainder is a parameter that indicates the remainder of absolute value of the level of the corresponding transform coefficient coded with a Golomb-Rice code (that is, the quantization coefficient level coded with a Golomb-Rice code).

The TS residual coding unit 352 subtracts the number of context-coded bins to be generated by context-coding the quantization coefficient level from RemCcbs (the allowable number of residual context-coded bins). Then, when RemCcbs becomes less than the threshold (<4), the TS residual coding unit 352 performs bypass coding on subsequent quantization coefficient levels as described above.

The Non-TS residual coding unit 353 performs processing related to coding in the Non-TS residual coding mode. For example, the Non-TS residual coding unit 353 acquires the quantization coefficient level supplied from the selection unit 351. The Non-TS residual coding unit 353 codes the acquired quantization coefficient level in the Non-TS residual coding mode. The Non-TS residual coding unit 353 includes a RemCcbs setting unit 362. The RemCcbs setting unit 362 sets the initial value of RemCcbs. The Non-TS residual coding unit 353 codes the acquired quantization coefficient level by using RemCcbs.

FIG. 13 is a diagram illustrating an example of syntax for the Non-TS residual coding mode. As illustrated in FIG. 13, if RemCcbs is equal to or greater than a threshold value (>=4), the Non-TS residual coding unit 353 context-codes syntax (sig_coeff_flag, abs_level_gtx_flag[j], par_level_flag, etc.) for the level value of transform coefficient (that is, the quantization coefficient level) (Pass1 in FIG. 13). If RemCcbs is less than the threshold value (<4), the Non-TS residual coding unit 353 bypass-codes syntax (abs_remainder, dec_abs_level, coeff_sign_flag) for the level value of transform coefficient (that is, the quantization coefficient level) (Pass2 and Pass3 in FIG. 13).

dec_abs_level is a parameter that indicates an intermediate value coded with a Golomb-Rice code.

The Non-TS residual coding unit 353 subtracts the number of context-coded bins to be generated by context-coding the quantization coefficient level from RemCcbs (the allowable number of residual context-coded bins). Then, when RemCcbs becomes less than the threshold (<4), the Non-TS residual coding unit 353 performs bypass coding on subsequent quantization coefficient levels as described above.

The coding unit 315 further codes information other than the quantization coefficient level. For example, the coding unit 315 codes transform mode information (for example, the transform skip flag, the MTS identifier, etc.). The coding unit 315 also codes RemCcbs setting information (for example, the reference value for the number of context-coded bins (ctxBinSampleRatioBase), the bit depth (bitDepth) of the image, the transform block size (Tb Width, TbHeight), etc.), which is information used for setting RemCcbs. The coding unit 315 further codes various other coding parameters (the header information Hinfo, the prediction mode information Pinfo, the transform information Tinfo, the filter information Finfo, etc.). The coding unit 315 multiplexes the obtained coded data with the coded data generated by the TS residual coding unit 352 or the Non-TS residual coding unit 353 to generate a bit stream, and stores the bit stream in the accumulation buffer 316. Coding (decoding) the reference value for the number of context-coded bins can be omitted if the coder and the decoder prearrange to do so. In addition, the unit for coding (decoding) the RemCcbs setting information (in particular, the reference value for the number of context-coded bins) can be set as any unit within a possible range, for example, per transform block, or a higher-order unit of processing (CU unit, CTU unit, slice unit, tile unit, picture unit, sequence unit).

In such a coding unit 315, Method 1-1 according to the present technology described above may be applied to the RemCcbs setting unit 361 and the RemCcbs setting unit 362. For example, the RemCcbs setting unit 361 and the RemCcbs setting unit 362 may have the same configuration as the RemCcbs setting device 100 illustrated in FIG. 3 to perform the same processing to set the initial value of RemCcbs.

In that case, the RemCcbs setting unit 361 and the RemCcbs setting unit 362 acquire bitDepth, which is a parameter indicating the bit depth of the image to be coded, supplied from the control unit 301. The RemCcbs setting unit 361 and the RemCcbs setting unit 362 then use bitDepth to set the number of context-coded bins depending on the bit depth (ctxBinSampleRatio(bitDepth)). The RemCcbs setting unit 361 and the RemCcbs setting unit 362 then use ctxBinSampleRatio(bitDepth) to set the initial value of RemCcbs.

The RemCcbs setting unit 361 and the RemCcbs setting unit 362 may set ctxBinSampleRatio(bitDepth) based on bitDepth and any other parameters. For example, the RemCcbs setting unit 361 and the RemCcbs setting unit 362 may acquire the reference value (ctxBinSampleRatioBase) for the number of context-coded bins supplied from the control unit 301, and use bitDepth described above and the corresponding ctxBinSampleRatioBase to set ctxBinSampleRatio(bitDepth).

The RemCcbs setting unit 361 and the RemCcbs setting unit 362 may set the initial value of RemCcbs based on ctxBinSampleRatio(bitDepth) and any other parameters. For example, the RemCcbs setting unit 361 and the RemCcbs setting unit 362 may acquire the block size (Tb Width and TbHeight) of the block to be processed, which is supplied from the control unit 301, and use ctxBinSampleRatio(bitDepth) described above and the corresponding Tb Width and TbHeight to set the initial value of RemCcbs corresponding to the block to be processed.

For example, the RemCcbs setting unit 361 and the RemCcbs setting unit 362 may apply any one of Methods 1-1-1 to 1-1-3 to set the initial value of RemCcbs. For example, the RemCcbs setting unit 361 and the RemCcbs setting unit 362 may apply any one of Equation (2) and Equations (3) to (5) to set the initial value of RemCcbs.

The coding unit 315 (the TS residual coding unit 352 and the Non-TS residual coding unit 353) uses the initial value (the maximum number of context-coded bins) of RemCcbs thus set by the RemCcbs setting unit 361 and the RemCcbs setting unit 362 to code the image (the quantization coefficient level) (in the TS residual coding mode or the Non-TS residual coding mode). Thus, the coding unit 315 uses the maximum number of context-coded bins set by the RemCcbs setting unit 361 and the RemCcbs setting unit 362, to which the present technology is applied, to context-code the image (the quantization coefficient level). Accordingly, the coding unit 315 can also be said to be an image coding unit.

By doing so, the same effects as those described in <2. Suppression of increase in context-coded bins> can be obtained. Thus, the RemCcbs setting unit 361 and the RemCcbs setting unit 362 can control the number of context-coded bins to be generated. Accordingly, the coding unit 315 can suppress an increase in the amount of coding processing. For example, the coding unit 315 can suppress an increase in the amount of CABAC processing in coding of an image with high bit depth and high bit rate.

In other words, the RemCcbs setting unit 361 and the RemCcbs setting unit 362 can suppress an increase in the number of context-coded bins to be generated, thereby suppressing an increase in the total of the numbers of context-coded bins and bypass-coded bins. Accordingly, the coding unit 315 can suppress an increase in the total amount of CABAC processing.

Thus, the image coding device 300 can suppress an increase in the amount of coding processing.

<Flow of Image Coding Processing>

Next, an example of a flow of image coding processing performed by the image coding device 300 having the above-described configuration will be described with reference to the flowchart of FIG. 14.

When the image coding processing is started, the rearrangement buffer 311 is controlled by the control unit 301 to rearrange the order of frames of input moving image data from display order to coding order in step S301.

In step S302, the control unit 301 sets a unit of processing (performs block division) for an input image held in the rearrangement buffer 311.

In step S303, the control unit 301 determines (sets) coding parameters with respect to the input image held in the rearrangement buffer 311.

In step S304, the prediction unit 322 performs prediction processing to generate a predicted image or the like in an optimum prediction mode. For example, in this prediction processing, the prediction unit 322 performs intra-prediction to generate a predicted image or the like in an optimum intra-prediction mode, performs inter-prediction to generate a predicted image or the like in an optimum inter-prediction mode, selects an optimum prediction mode therefrom based on a cost function value and the like.

In step S305, the calculation unit 312 calculates a difference between the input image and the predicted image in the optimum mode selected by the prediction processing in step S304. Thus, the calculation unit 312 generates a prediction residual D between the input image and the predicted image. The amount of data of the prediction residual D obtained in this manner is reduced as compared to the original image data. Therefore, the amount of data can be compressed as compared to a case where the image is coded as it is.

In step S306, the orthogonal transform unit 313 performs orthogonal transform processing on the prediction residual D generated by the processing of step S305 to derive a transform coefficient Coeff.

In step S307, the quantization unit 314 quantizes the transform coefficient Coeff obtained by the processing of step S306 by using a quantization parameter calculated by the control unit 301 or the like and derives a quantization coefficient level.

In step S308, the inverse quantization unit 317 inversely quantizes the quantization coefficient level generated by the processing of step S307 with characteristics corresponding to the characteristics of quantization of step S307 to derive a transform coefficient Coeff_IQ.

In step S309, the inverse orthogonal transform unit 318 performs inverse orthogonal transform on the transform coefficient Coeff_IQ obtained by the processing of step S308 by using a method corresponding to the orthogonal transform processing of step S306 to derive a prediction residual D'.

In step S310, the calculation unit 319 adds the predicted image obtained by the prediction processing of step S304 to the prediction residual D' derived by the processing of step S309 to generate a locally decoded image.

In step S311, the in-loop filter unit 320 performs in-loop filter processing on the locally decoded image derived by the processing of step S310.

In step S312, the frame memory 321 stores the locally decoded image derived by the processing of step S310 and the locally decoded image filtered in step S311.

In step S313, the coding unit 315 performs coding processing to code the quantization coefficient level and various coding parameters obtained by the processing of step S307 and thus to generate a bit stream of coded data.

In step S314, the accumulation buffer 316 accumulates the bit stream obtained in step S313 and outputs the bit stream to the outside of the image coding device 300. This bit stream is transmitted to the decoding side via, for example, a transmission line or a recording medium. In addition, the rate control unit 323 performs rate control as necessary.

When the processing of step S314 ends, the image coding processing ends.

<Flow of Coding Processing>

An example of a flow of coding processing performed in step S313 of FIG. 14 will be described with reference to the flowchart of FIG. 15.

Figure 15:
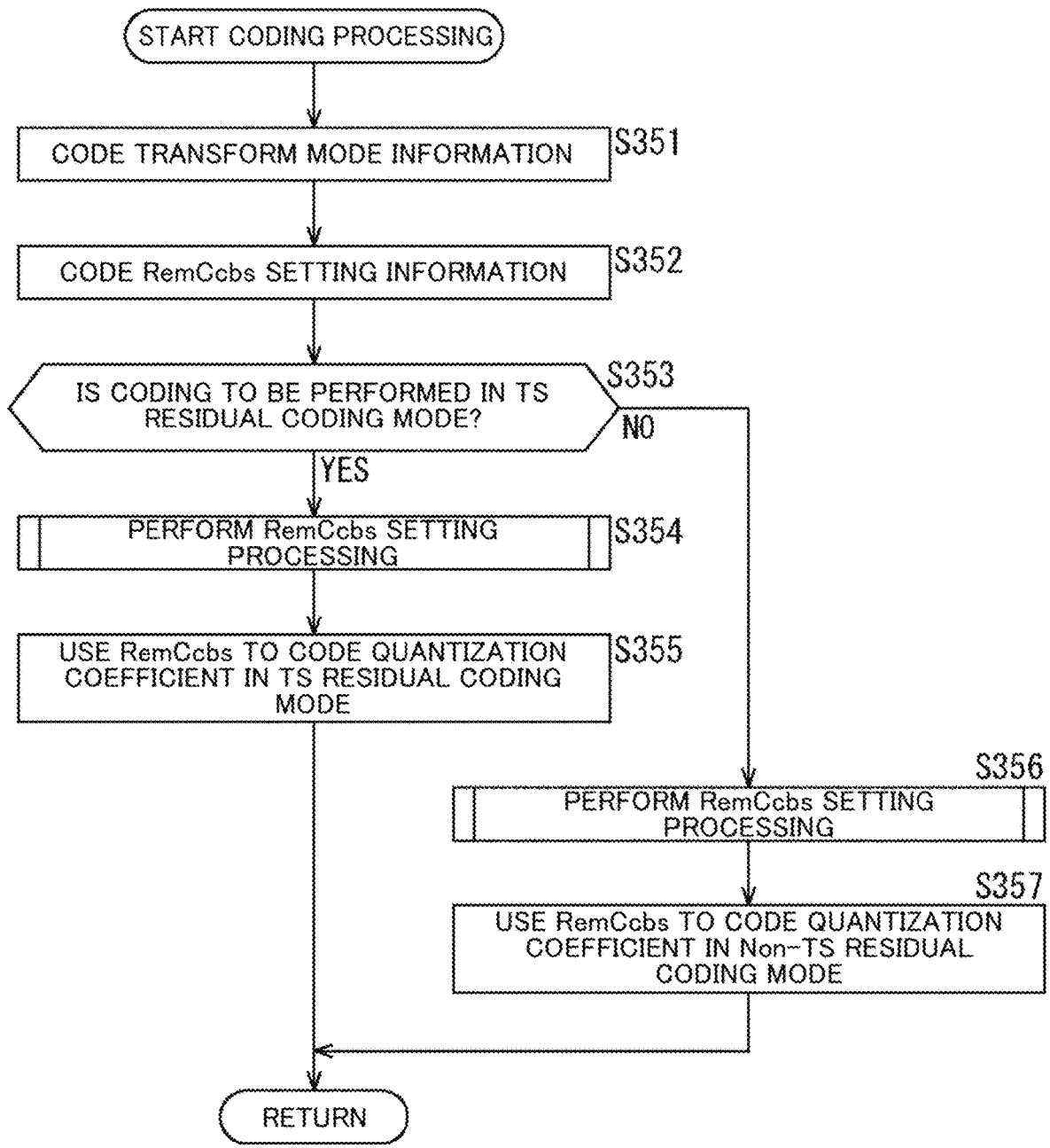
FIG. 15 is a flowchart illustrating an example of a flow of coding processing.

When the coding processing is started, the coding unit 315 codes the transform mode information (transform_skip_flag, mts_idx, etc.) in step S351 of FIG. 15. In step S352, the coding unit 315 codes the RemCcbs setting information (ctxBinSampleRatioBase, bitDepth, Tb Width, TbHeight, etc.). Furthermore, the coding unit 315 codes information other than the quantization coefficient level, such as various coding parameters.

In step S353, the selection unit 351 determines whether or not to code the quantization coefficient level (syntax for the quantization coefficient level) in the TS residual coding mode, based on the transform mode information and the like. If it is determined that the TS residual coding mode is to be applied, the processing proceeds to step S354.

In step S354, the RemCcbs setting unit 361 performs RemCcbs setting processing to set (the initial value of) RemCcbs.

In step S355, the TS residual coding unit 352 uses (the initial value of) RemCcbs obtained in step S354 to code the quantization coefficient level in the TS residual coding mode. When the processing of step S355 ends, the coding processing ends, and then the processing returns to FIG. 14.

If it is determined in step S353 of FIG. 15 that the TS residual coding mode is not to be applied (that is, the Non-TS residual coding mode is to be applied), the processing proceeds to step S356.

In step S356, the RemCcbs setting unit 362 performs RemCcbs setting processing to set (the initial value of) RemCcbs.

In step S357, the Non-TS residual coding unit 353 uses (the initial value of) RemCcbs obtained in step S356 to code the quantization coefficient level in the Non-TS residual coding mode. When the processing of step S357 ends, the coding processing ends, and then the processing returns to FIG. 14.

Method 1-1 according to the present technology described above may be applied to the RemCcbs setting processing performed in such coding processing of steps S354 and S356. For example, this RemCcbs setting processing may be performed according to the flow described with reference to the flowchart of FIG. 4. For example, the RemCcbs setting unit 361 and the RemCcbs setting unit 362 may apply any one of Methods 1-1-1 to 1-1-3 to set the initial value of RemCcbs. For example, the RemCcbs setting unit 361 and the RemCcbs setting unit 362 may apply any one of Equation (2) and Equations (3) to (5) to set the initial value of RemCcbs.

By doing so, the same effects as those described in <2. Suppression of increase in context-coded bins> can be obtained. Thus, the RemCcbs setting unit 361 and the RemCcbs setting unit 362 can control the number of context-coded bins to be generated. Accordingly, the coding unit 315 can suppress an increase in the amount of coding processing. For example, the coding unit 315 can suppress an increase in the amount of CABAC processing in coding of an image with high bit depth and high bit rate.

In other words, the RemCcbs setting unit 361 and the RemCcbs setting unit 362 can suppress an increase in the number of context-coded bins to be generated, thereby suppressing an increase in the total of the numbers of context-coded bins and bypass-coded bins. Accordingly, the coding unit 315 can suppress an increase in the total amount of CABAC processing.

Thus, by performing each processing as described above, the image coding device 300 can suppress an increase in the amount of coding processing.

<Image Decoding Device>

Figure 16:
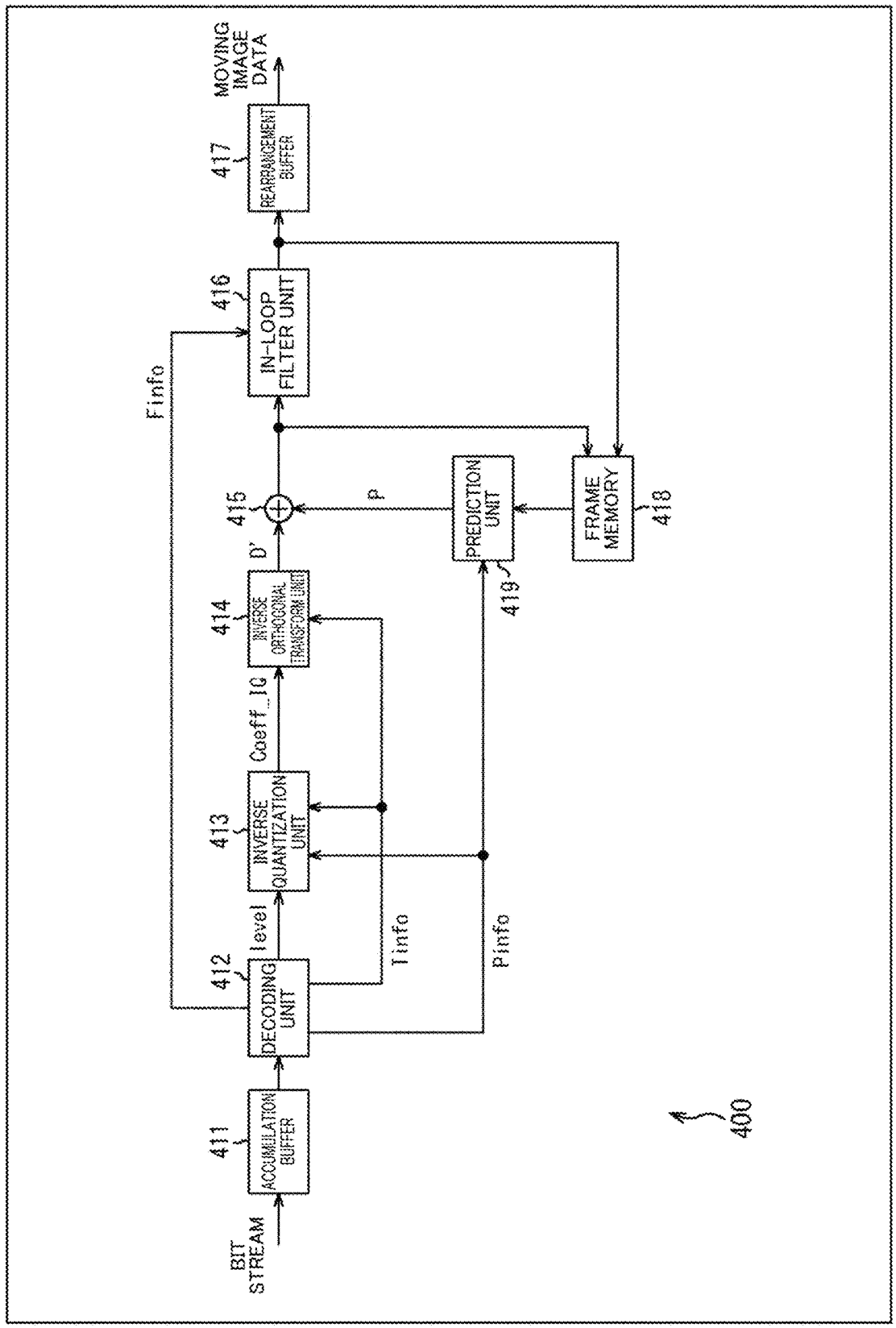
FIG. 16 is a block diagram illustrating a main configuration example of an image decoding device.

FIG. 16 is a block diagram illustrating an example of a configuration of an image decoding device that is one aspect of an image processing device to which the present technology is applied. The image decoding device 400 illustrated in FIG. 16 is a device that codes coded data of a moving image. For example, the image decoding device 400 can decode the coded data by using the decoding method described in any one of NPL described above. For example, the image decoding device 400 decodes the coded data (bit stream) generated by the above-described image coding device 300.

FIG. 16 illustrates major parts such as processing units (blocks) and data flows, but processing units and data flows are not limited to those illustrated in FIG. 16. In other words, the image decoding device 400 may include a processing unit(s) not illustrated as a block(s) in FIG. 9. The image decoding device 400 may have processing and data flow(s) not indicated by arrows or the like in FIG. 16. In FIG. 16, the image decoding device 400 includes an accumulation buffer 411, a decoding unit 412, an inverse quantization unit 413, an inverse orthogonal transform unit 414, a calculation unit 415, an in-loop filter unit 416, a rearrangement buffer 417, a frame memory 418, and a prediction unit 419. The prediction unit 419 includes an intra-prediction unit, an inter-prediction unit, and others (not illustrated). The image decoding device 400 is a device that generates moving image data by decoding coded data (bit stream).

<Accumulation Buffer>

The accumulation buffer 411 acquires a bit stream input to the image decoding device 400 and holds (stores) the bit stream. The accumulation buffer 411 supplies the stored bit stream to the decoding unit 412 at a predetermined timing or when a predetermined condition is satisfied.

<Decoding Unit>

The decoding unit 412 performs processing with respect to image decoding. For example, the decoding unit 412 receives the bit stream supplied from the accumulation buffer 411 as an input and performs variable-length decoding on a syntax value of each syntax element to derive parameters from the bit stream according to definition of a syntax table.

The parameters derived from the syntax element and the syntax value of the syntax element include, for example, information such as header information Hinfo, prediction mode information Pinfo, transform information Tinfo, and filter information Finfo. Thus, the decoding unit 412 parses (analyzes and acquires) these pieces of information from the bit stream. These pieces of information will be described below.

<Header information Hinfo>

The header information Hinfo includes header information such as a video parameter set (VPS), a sequence parameter set (SPS), a picture parameter set (PPS), and a slice header (SH). The header information Hinfo includes, for example, information for defining an image size (width PicWidth, height PicHeight), a bit depth (luminance bitDepthY, chrominance bitDepthC), a chrominance array type ChromaArrayType, a maximum value MaxCUSize/minimum value MinCUSize of a CU size, a maximum depth MaxQTDepth/minimum depth MinQTDepth of quad-tree division, a maximum depth MaxBTDepth/minimum depth MinBTDepth of binary tree division, a maximum value MaxTSSize of a transform skip block (also called a maximum transform skip block size), an on/off flag (also called an enabled flag) of each coding tool, and the like.

For example, the on/off flags of coding tools included in the header information Hinfo include the following on/off flags related to transform and quantization processing. The on/off flag of each coding tool can also be interpreted as a flag indicating whether or not the coded data includes syntax for the coding tool. If the value of the on/off flag is 1 (true), it indicates that the corresponding coding tool is available, and if the value of the on/off flag is 0 (false), it indicates that the coding tool is unavailable. The interpretation of the flag value may be reversed.

An inter-component prediction enabled flag (ccp_enabled_flag) is flag information that indicates whether or not inter-component prediction (cross-component prediction (CCP)), also called CC prediction) is available. For example, if this flag information is "1" (true), it indicates available, and if the flag information is "0" (false), it indicates unavailable.

This CCP is also called inter-component linear prediction (CCLM or CCLMP).

<Prediction Mode Information Pinfo>

The prediction mode information Pinfo includes, for example, information such as size information PBSize (prediction block size) of a processing target PB (prediction block), intra-prediction mode information IPinfo, and motion prediction information MVinfo.

The intra-prediction mode information IPinfo includes, for example, prev_intra_luma_pred_flag, mpm_idx, rem_intra_pred_mode in JCTVC-W1005, 7.3.8.5 coding unit syntax, and a luminance intra-prediction mode IntraPredModeY derived from the syntax thereof, and the like.

In addition, the intra-prediction mode information IPinfo includes, for example, an inter-component prediction flag (ccp_flag (cclmp_flag)), a multi-class linear prediction mode flag (mclm_flag), a chrominance sample location type identifier (chroma_sample_loc_type_idx), a chrominance MPM identifier (chroma_mpm_idx), a luminance intra-prediction mode (IntraPredModeC) derived from these syntaxes, and the like.

The inter-component prediction flag (ccp_flag (cclmp_flag)) is flag information that indicates whether or not inter-component linear prediction is to be applied. For example, for ccp_flag==1, it indicates that inter-component prediction is to be applied, and for ccp_flag==0, it indicates that inter-component prediction is not to be applied.

The multi-class linear prediction mode flag (mclm_flag) is information (linear prediction mode information) on the mode of linear prediction. More specifically, the multi-class linear prediction mode flag (mclm_flag) is flag information that indicates whether or not the multi-class linear prediction mode is to be set. For example, "0" indicates a 1-class mode (single-class mode) (for example, CCLMP), and "1" indicates a 2-class mode (multi-class mode) (for example, MCLMP). The chrominance sample location type identifier (chroma_sample_loc_type_idx) is an identifier for identifying a type of pixel location of a chrominance component (also referred to as a chrominance sample location type). For example, if the chrominance array type (ChromaArrayType), which is information on a color format, indicates the 420 format, the chrominance sample location type identifier is assigned according to the following expressions.

chroma_sample_loc_type_idx==0: Type2
chroma_sample_loc_type_idx==1: Type3
chroma_sample_loc_type_idx==2: Type0
chroma_sample_loc_type_idx==3: Type1

This chrominance sample location type identifier (chroma_sample_loc_type_idx) is transmitted as (stored in) information (chroma_sample_loc_info( )) on the pixel location of the chrominance component.

The chrominance MPM identifier (chroma_mpm_idx) is an identifier that indicates which prediction mode candidate in a chrominance intra-prediction mode candidate list (intraPredModeCandListC) is specified as a chrominance intra-prediction mode.

The motion prediction information MVinfo includes, for example, information such as merge_idx, merge_flag, inter_pred_idc, ref_idx_LX, mvp_lX_flag, X={0, 1}, mvd (refer to JCTVC-W1005, 7.3.8.6 prediction unit syntax, for example).

Of course, any information may be included in the prediction mode information Pinfo, and information other than the above-listed pieces of information may be included.
<Transformation Information Tinfo>

The transform information Tinfo includes, for example, the following information. Of course, any information may be included in the transform information Tinfo and information other than these pieces of information may be included.

Width size (TBWSize) and height size (TBHSize) of transform block to be processed Transform skip flag (transform_skip_flag (also referred to as ts_flag))
Scan identifier (scanIdx)
Quantization parameter (qp)
Quantization matrix (scaling_matrix (for example, JCTVC-W1005, 7.3.4 Scaling list data syntax))

The transform information Tinfo may include log 2TBWSize and log 2TBHSize instead of TBWSize and TBHSize. log 2TBWSize is the logarithm of TBWSize to a base of 2. log 2TBHSize is the logarithm of TBHSize to a base of 2. In the image decoding device 400, the transform skip flag is a flag that indicates whether or not the inverse coefficient transform (inverse primary transform and inverse secondary transform) is to be skipped.
<Filter Information Finfo>

The filter information Finfo includes, for example, control information on each filtering below.

Control information on a deblocking filter (DBF)
Control information on a pixel adaptive offset (SAO)
Control information on an adaptive loop filter (ALF)
Control information on other linear and non-linear filters More specifically, for example, the filter information includes information for specifying a picture to which each filter is applied and an area in the picture, filter On/Off control information for each CU, filter On/Off control information on boundaries of slices and tiles, and the like. Of course, any information may be included in the filter information Finfo and information other than these pieces of information may be included.

Return to description of the decoding unit 412. The decoding unit 412 refers to the syntax for the quantization coefficient level obtained by decoding the bit stream to derive the quantization coefficient level. The decoding unit 412 supplies the quantization coefficient level to the inverse quantization unit 413.

Further, the decoding unit 412 supplies to each block the coding parameters such as the parsed header information Hinfo, prediction mode information Pinfo, transform information Tinfo, and filter information Finfo. For example, the decoding unit 412 supplies the header information Hinfo to the inverse quantization unit 413, the inverse orthogonal transform unit 414, the prediction unit 419, and the in-loop filter unit 416. In addition, the decoding unit 412 supplies the prediction mode information Pinfo to the inverse quantization unit 413 and the prediction unit 419. Further, the decoding unit 412 supplies the transform information Tinfo to the inverse quantization unit 413 and the inverse orthogonal transform unit 414. Further, the decoding unit 412 supplies the filter information Finfo to the in-loop filter unit 416.

Of course, the above-described example is an example and is not limited to this example. For example, each coding parameter may be supplied to any processing unit. Further, other information may be supplied to any processing unit.
<Inverse Quantization Unit>

The inverse quantization unit 413 has at least a configuration necessary for performing processing related to inverse quantization. For example, the inverse quantization unit 413 receives as inputs the transform information Tinfo and the quantization transform coefficient level, which are supplied from the decoding unit 412, and scales the value of the quantization coefficient level based on the transform information Tinfo (inverse quantization) to derive the transform coefficient Coeff_IQ after inverse quantization. The inverse quantization unit 413 supplies the derived transform coefficient Coeff_IQ to the inverse orthogonal transform unit 414.

This inverse quantization is performed as the inverse processing of the quantization performed by the quantization unit 314 of the image coding device 300. This inverse quantization is also the same processing as the inverse quantization performed by the inverse quantization unit 317 of the image coding device 300. Thus, the inverse quantization unit 317 of the image coding device 300 performs the same processing (inverse quantization) as the inverse quantization unit 413.

<Inverse Orthogonal Transform Unit>

The inverse orthogonal transform unit 414 performs processing with respect to inverse orthogonal transform. For example, the inverse orthogonal transform unit 414 receives as inputs the transform coefficient Coeff_IQ supplied from the inverse quantization unit 413 and the transform information Tinfo supplied from the decoding unit 412, and performs inverse orthogonal transform processing on the transform coefficient Coeff_IQ based on the transform information Tinfo to derive the prediction residual D'. For example, the inverse orthogonal transform unit 414 performs inverse secondary transform on the transform coefficient Coeff_IQ based on the ST identifier to generate a primary transform coefficient, and performs primary transform on the primary transform coefficient to generate a prediction residual D'. The inverse orthogonal transform unit 414 supplies the derived prediction residual D' to the calculation unit 415.

This inverse orthogonal transform is performed as the inverse processing of the orthogonal transform performed by the orthogonal transform unit 313 of the image coding device 300. This inverse orthogonal transform is also the same processing as the inverse orthogonal transform performed by the inverse orthogonal transform unit 318 of the image coding device 300. Thus, the inverse orthogonal transform unit 318 of the image coding device 300 performs the same processing (inverse orthogonal transform) as the inverse orthogonal transform unit 414.

Accordingly, the inverse orthogonal transform unit 414 can perform any inverse coefficient transform, not limited to inverse orthogonal transform, as with the inverse orthogonal transform unit 318 of the image coding device 300. This inverse coefficient transform is the inverse processing of the coefficient transform performed by the orthogonal transform unit 313 of the image coding device 300. Thus, the prediction residual D' may be derived by performing any inverse coefficient transform on the transform coefficient Coeff_IQ. Accordingly, the inverse orthogonal transform unit 414 can also be said to be an inverse coefficient transform unit.

<Calculation Unit>

The calculation unit 415 performs processing related to addition of information on an image. For example, the calculation unit 415 receives as inputs the prediction residual D' supplied from the inverse orthogonal transform unit 414 and the prediction image P supplied from the prediction unit 419. The calculation unit 415 adds the prediction residual D' and the prediction image P (prediction signal) corresponding to the prediction residual D' to derive the locally decoded image Rlocal, as indicated in the following equation. The calculation unit 415 supplies the derived locally decoded image Rlocal to the in-loop filter unit 416 and the frame memory 418.

$R\text{local} = D' + P$

<In-Loop Filter Unit>

The in-loop filter unit 416 performs processing related to in-loop filter processing. For example, the in-loop filter unit 416 receives as inputs the locally decoded image Rlocal supplied from the calculation unit 415 and the filter information Finfo supplied from the decoding unit 412. Any information may be input to the in-loop filter unit 416 and information other than these pieces of information may be input.

The in-loop filter unit 416 appropriately filters the locally decoded image Rlocal based on the filter information Finfo.

For example, as described in NPL 11, the in-loop filter unit 416 applies four in-loop filter, a bilateral filter, a deblocking filter (DBF), an adaptive offset filter (Sample Adaptive Offset (SAO)), and an adaptive loop filter (ALF) in this order. Which filter is applied and in which order they are applied are arbitrary and can be appropriately selected.

The in-loop filter unit 416 performs filtering corresponding to filtering performed by the coding side (for example, the in-loop filter unit 320 of the image coding device 300). Of course, any filtering may be performed by the in-loop filter unit 416 and is not limited to the above example. For example, the in-loop filter unit 416 may apply a Wiener filter or the like.

The in-loop filter unit 416 supplies the filtered locally decoded image Rlocal to the rearrangement buffer 417 and the frame memory 418.

<Rearrangement Buffer>

The rearrangement buffer 417 receives as an input the locally decoded image Rlocal supplied from the in-loop filter unit 416 and holds (stores) the locally decoded image Rlocal. The rearrangement buffer 417 reconstructs a decoded image R on a per-picture basis by using the locally decoded image Rlocal and holds the decoded image R (stores the decoded image R in the buffer). The rearrangement buffer 417 rearranges the obtained decoded images R from decoding order to reproduction order. The rearrangement buffer 417 outputs a group of rearranged decoded images R as moving image data to the outside of the image decoding device 400.

<Frame Memory>

The frame memory 418 performs processing related to storage of data on images. For example, the frame memory 418 receives as an input the locally decoded image Rlocal supplied from the calculation unit 415, reconstructs a decoded image R on a per-picture basis, and stores the decoded image R in the buffer in the frame memory 418.

Further, the frame memory 418 receives as an input the in-loop filtered locally decoded image Rlocal supplied from the in-loop filter unit 416, reconstructs a decoded image R on a per-picture basis, and stores the decoded image R in the buffer in the frame memory 418. The frame memory 418 supplies the stored decoded image R (or part thereof) to the prediction unit 419 as a reference image as appropriate.

The frame memory 418 may store header information Hinfo, prediction mode information Pinfo, transform information Tinfo, filter information Finfo, and the like related to generation of a decoded image.

<Prediction Unit>

The prediction unit 419 performs processing related to generation of a predicted image. For example, the prediction unit 419 receives as an input the prediction mode information Pinfo supplied from the decoding unit 412, performs prediction by using the prediction method specified by the prediction mode information Pinfo, and derives the prediction image P. In that derivation, the prediction unit 419 uses the non-filtered or filtered decoded image R (or part thereof) stored in the frame memory 418, which is to be specified by the prediction mode information Pinfo, as a reference image. The prediction unit 419 supplies the derived predicted image P to the calculation unit 415.

These processing units (the accumulation buffer 411 to the prediction unit 419) each have any configuration. For example, each processing unit may be configured as a logic circuit that implements the aforementioned processing. Further, each processing unit may include, for example, a CPU, a ROM, and a RAM, which are used to execute a program to implement the above-described processing. Of course, each processing unit may have both the configurations such that part of the above processing is implemented by a logic circuit and the others are implemented by a program being executed. The processing units may have independent configurations, for example, some processing units may implement parts of the aforementioned processing according to a logic circuit, some other processing units may implement the aforementioned processing by executing a program, and some other processing units may implement the aforementioned processing according to both a logic circuit and execution of a program.

In the image decoding device 400 having the above configuration, the present technology described in <2. Suppression of increase in context-coded bins> may be applied to the decoding unit 412. For example, Method 1-1 according to the present technology may be applied to the image decoding device 400.

<Decoding Unit>

Figure 17:
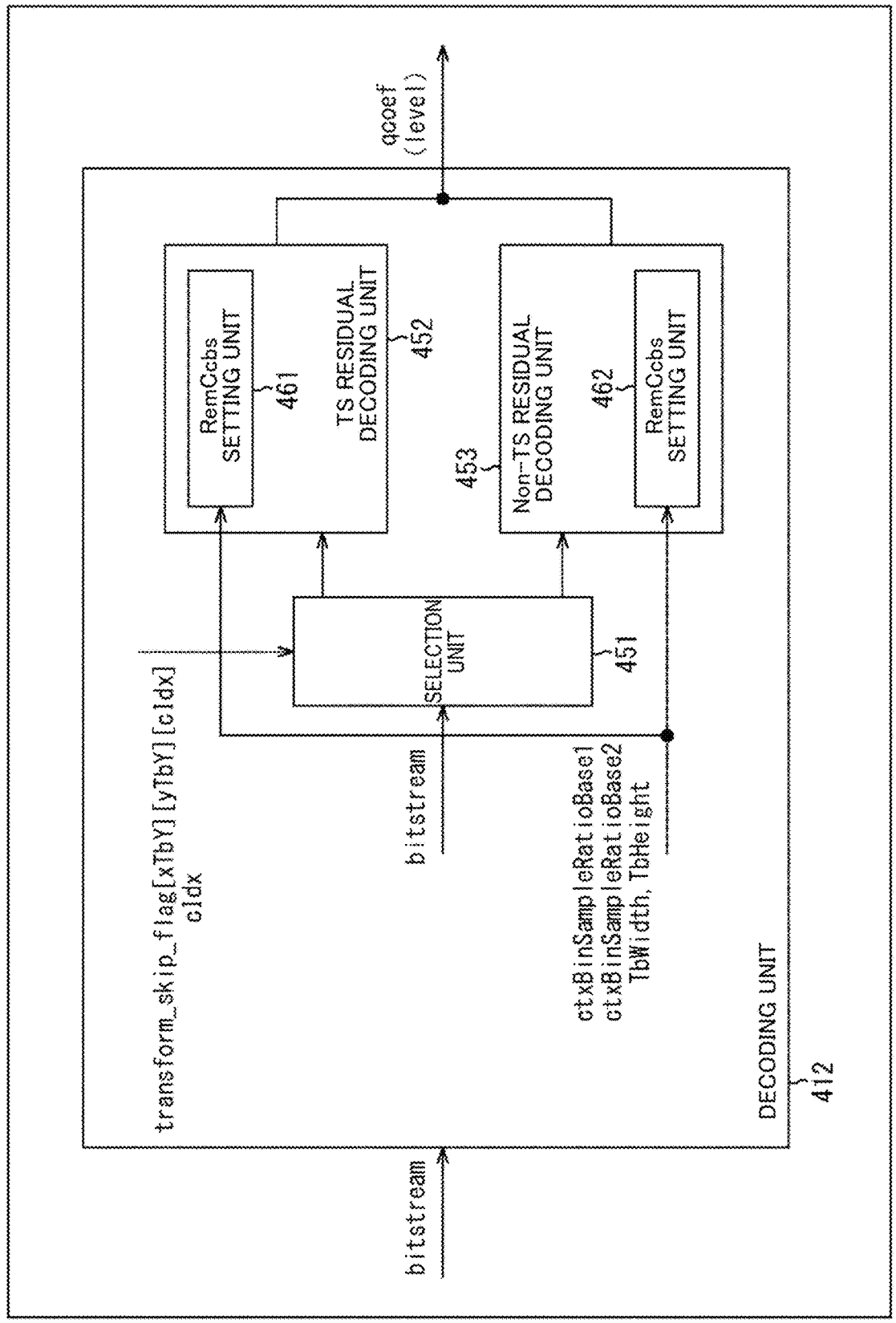
FIG. 17 is a block diagram illustrating a main configuration example of a decoding unit.

FIG. 17 is a block diagram illustrating a main configuration example of a decoding unit 412 in that case. As illustrated in FIG. 17, the decoding unit 412 in this case includes a selection unit 451, a TS residual decoding unit 452, and a Non-TS residual decoding unit 453.

The decoding unit 412 acquires the bit stream supplied from the accumulation buffer 411. The decoding unit 412 variable-length decodes the syntax value of each syntax element from the bit string of the bit stream in accordance with the definition of the syntax table to derive parameters other than the quantization coefficient level. For example, the decoding unit 412 decodes the bit stream to generate transform mode information (for example, the transform skip flag, the MTS identifier, etc.) and RemCcbs setting information (for example, the reference value for the number of context-coded bins (ctxBinSampleRatioBase), the bit depth (bitDepth) of the image, the transform block size (Tb Width, TbHeight), etc.). In addition, the decoding unit 412 decodes the bit stream to generate various other coding parameters (the header information Hinfo, the prediction mode information Pinfo, the transform information Tinfo, the filter information Finfo, etc.).

The selection unit 451 performs processing related to control of the operation mode of the decoding unit 412. For example, the selection unit 451 acquires the bit stream acquired by the decoding unit 412. Further, the selection unit 451 acquires the transform mode information (for example, the transform skip flag (transform_skip_flag[xTbY][LyTbY][cIdx])) and the component identifier (cIdx) obtained by the decoding unit 412 parsing the bit stream.

The selection unit 451 determines based on transform_skip_flag[xTbY][yTbY][cIdx] and cIdx whether or not transform skip has been performed in the coding, and selects based on the result of the determination to decode the coded data of the quantization coefficient level in a TS residual coding mode or a Non-TS residual coding mode. The TS residual coding mode is a mode for decoding the coded data of the quantization coefficient level generated when the coefficient transform is skipped. The Non-TS residual coding mode is a mode for decoding the coded data of the quantization coefficient level generated when the coefficient transform is performed.

If transform_skip_flag is true (for example, 1), the selection unit 451 determines that coefficient transform has been skipped in coding, and supplies the coded data of the quantization coefficient level to the TS residual decoding unit 452. If transform_skip_flag is false (for example, 0), the selection unit 451 determines that coefficient transform has been performed in coding, and supplies the coded data of the quantization coefficient level to the Non-TS residual decoding unit 453.

The selection unit 451 may use the MTS identifier (mts_idx[xTbY][yTbY][cIdx]) instead of transform_skip_flag to determine whether or not transform skip has been performed in coding. In addition, the selection unit 451 may determine whether or not transform skip has been performed in coding, based on the transform mode information and cIdx. This transform mode information includes transform_skip_flag and mts_idx.

The TS residual decoding unit 452 performs processing related to decoding in the TS residual coding mode. For example, the TS residual decoding unit 452 acquires the coded data of the quantization coefficient level supplied from the selection unit 451. The TS residual decoding unit 452 decodes the acquired coded data of the quantization coefficient level in the TS residual coding mode to generate the quantization coefficient level. The TS residual decoding unit 452 includes a RemCcbs setting unit 461. The RemCcbs setting unit 461 sets the initial value of RemCcbs. The TS residual decoding unit 452 decodes the acquired coded data of the quantization coefficient level by using RemCcbs to generate the quantization coefficient level.

As illustrated in FIG. 12, if RemCcbs is equal to or greater than the threshold value (>=4), the TS residual decoding unit 452 context-decodes the coded data of the syntax (sig_coeff_flag, coeff_sign_flag, abs_level_gtx_flag[j], par_level_flag, etc.) for the level value of transform coefficient (that is, the quantization coefficient level) (Pass1 and Pass2 in FIG. 12). If RemCcbs is less than the threshold value (<4), the TS residual decoding unit 452 bypass-decodes the coded data of the syntax (abs_remainder, coeff_sign_flag) for the level value of transform coefficient (that is, the quantization coefficient level) (Pass3 in FIG. 12).

The TS residual decoding unit 452 subtracts the number of context-coded bins generated by context-decoding the coded data of the quantization coefficient level from RemCcbs (the allowable number of residual context-coded bins). Then, when RemCcbs becomes less than the threshold (<4), the TS residual decoding unit 452 performs bypass decoding on the coded data of subsequent quantization coefficient levels as described above.

The Non-TS residual decoding unit 453 performs processing related to decoding in the Non-TS residual coding mode. For example, the Non-TS residual decoding unit 453 acquires the coded data of the quantization coefficient level supplied from the selection unit 451. The Non-TS residual decoding unit 453 decodes the acquired coded data of the quantization coefficient level in the Non-TS residual coding mode to generate the quantization coefficient level. The Non-TS residual decoding unit 453 includes a RemCcbs setting unit 462. The RemCcbs setting unit 462 sets the initial value of RemCcbs. The Non-TS residual decoding unit 453 decodes the acquired coded data of the quantization coefficient level by using RemCcbs to generate the quantization coefficient level.

As illustrated in FIG. 13, if RemCcbs is equal to or greater than the threshold value (>=4), the Non-TS residual decoding unit 453 context-decodes the coded data of the syntax (sig_coeff_flag, abs_level_gtx_flag[j], par_level_flag, etc.)

for the level value of transform coefficient (that is, the quantization coefficient level) (Pass1 in FIG. 13). If RemCcbs is less than the threshold value (<4), the Non-TS residual decoding unit 453 bypass-decodes the coded data of the syntax (abs_remainder, dec_abs_level, coeff_sign_flag) for the level value of transform coefficient (that is, the quantization coefficient level) (Pass2 and Pass3 in FIG. 13).

The Non-TS residual decoding unit 453 subtracts the number of context-coded bins generated by context-decoding the coded data of the quantization coefficient level from RemCcbs (the allowable number of residual context-coded bins). Then, when RemCcbs becomes less than the threshold (<4), the Non-TS residual decoding unit 453 performs bypass decoding on the coded data of subsequent quantization coefficient levels as described above.

The decoding unit 412 supplies the quantization coefficient level generated by the TS residual decoding unit 452 or the Non-TS residual decoding unit 453 to the inverse quantization unit 413. In addition, the decoding unit 412 supplies information other than the quantization coefficient level obtained by decoding the bit stream (for example, the header information Hinfo, the prediction mode information Pinfo, the transform information Tinfo, the filter information Finfo, etc.) to any block.

When the TS residual decoding unit 452 performs decoding in the TS residual coding mode, that is, if transform_skip_flag is true (for example, 1), the inverse coefficient transform to be performed on the transform coefficient Coeff_IQ by the inverse orthogonal transform unit 414 is skipped. On the other hand, when the Non-TS residual decoding unit 453 performs decoding in the Non-TS residual coding mode, that is, if transform_skip_flag is false (for example, 0), the inverse coefficient transform is performed on the transform coefficient Coeff_IQ by the inverse orthogonal transform unit 414 to generate the prediction residual D'.

In such a decoding unit 412, Method 1-1 according to the present technology described above may be applied to the RemCcbs setting unit 461 and the RemCcbs setting unit 462. For example, the RemCcbs setting unit 461 and the RemCcbs setting unit 462 may have the same configuration as the RemCcbs setting device 100 illustrated in FIG. 3 to perform the same processing to set the initial value of RemCcbs.

In that case, the RemCcbs setting unit 461 and the RemCcbs setting unit 462 acquire the bit depth (bitDepth) of the image to be coded, obtained by the decoding unit 412 decoding the bit stream. The RemCcbs setting unit 461 and the RemCcbs setting unit 462 then use bitDepth to set the number of context-coded bins depending on the bit depth (ctxBinSampleRatio(bitDepth)). The RemCcbs setting unit 461 and the RemCcbs setting unit 462 then use ctxBinSampleRatio(bitDepth) to set the initial value of RemCcbs.

The RemCcbs setting unit 461 and the RemCcbs setting unit 462 may set ctxBinSampleRatio(bitDepth) based on bitDepth and any other parameters. For example, the RemCcbs setting unit 461 and the RemCcbs setting unit 462 may acquire the reference value (ctxBinSampleRatioBase) for the number of context-coded bins, and use bitDepth described above and the corresponding ctxBinSampleRatioBase to set ctxBinSampleRatio(bitDepth). This ctxBinSampleRatioBase may be preset (with the same value as the coding side (image coding device 300)), or may be included in the bit stream transmitted from the coding side (image coding device 300).

The RemCcbs setting unit 461 and the RemCcbs setting unit 462 may set the initial value of RemCcbs based on ctxBinSampleRatio(bitDepth) and any other parameters, which are set in that way. For example, the RemCcbs setting unit 461 and the RemCcbs setting unit 462 may acquire the block size (Tb Width and TbHeight) of the block to be processed, which is obtained by the decoding unit 412 decoding the bit stream, and use ctxBinSampleRatio(bitDepth) described above and the corresponding Tb Width and TbHeight to set the initial value of RemCcbs corresponding to the block to be processed.

For example, the RemCcbs setting unit 461 and the RemCcbs setting unit 462 may apply any one of Methods 1-1-1 to 1-1-3 to set the initial value of RemCcbs. For example, the RemCcbs setting unit 461 and the RemCcbs setting unit 462 may apply any one of Equation (2) and Equations (3) to (5) to set the initial value of RemCcbs.

The decoding unit 412 (the TS residual decoding unit 452 and the Non-TS residual decoding unit 453) uses the initial value (the maximum number of context-coded bins) of RemCcbs thus set by the RemCcbs setting unit 461 and the RemCcbs setting unit 462 to decode the coded data of the image (the quantization coefficient level) (in the TS residual coding mode or the Non-TS residual coding mode). Thus, the decoding unit 412 uses the maximum number of context-coded bins set by the RemCcbs setting unit 461 and the RemCcbs setting unit 462, to which the present technology is applied, to decode the bit stream of the context-coded image to generate the image (the quantization coefficient level). Accordingly, the decoding unit 412 can also be said to be an image decoding unit.

By doing so, the same effects as those described in <2. Suppression of increase in context-coded bins> can be obtained. Thus, the RemCcbs setting unit 461 and the RemCcbs setting unit 462 can control the number of context-coded bins to be generated. Accordingly, the decoding unit 412 can suppress an increase in the amount of decoding processing. For example, the decoding unit 412 can suppress an increase in the amount of CABAC processing in decoding of an image with high bit depth and high bit rate.

In other words, the RemCcbs setting unit 461 and the RemCcbs setting unit 462 can suppress an increase in the number of context-coded bins to be generated, thereby suppressing an increase in the total of the numbers of context-coded bins and bypass-coded bins. Accordingly, the decoding unit 412 can suppress an increase in the total amount of CABAC processing.

Thus, the image decoding device 400 can suppress an increase in the amount of decoding processing.

<Flow of Image Decoding Processing>

Figure 18:
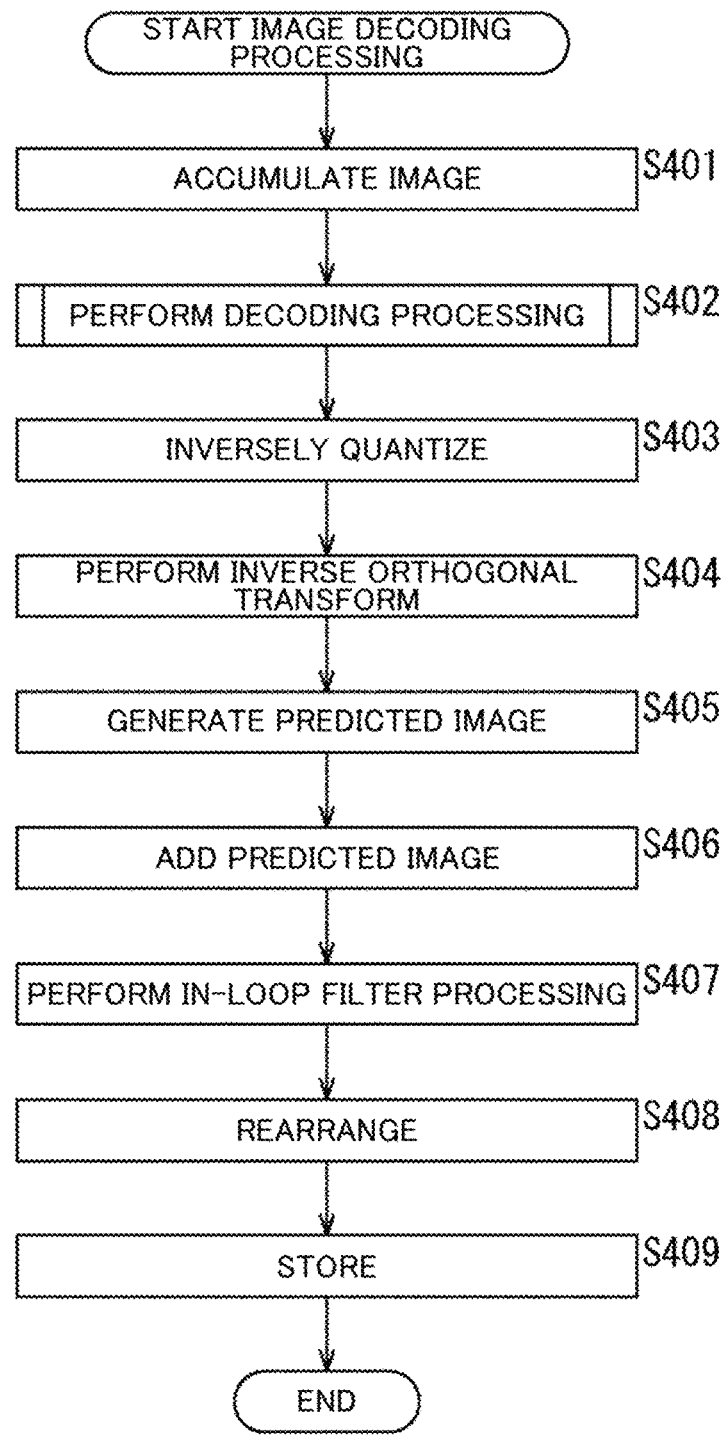
FIG. 18 is a flowchart illustrating an example of a flow of image decoding processing.

Next, an example of a flow of image decoding processing performed by the image decoding device 400 having the above-described configuration will be described with reference to the flowchart of FIG. 18.

When the image decoding processing is started, the accumulation buffer 411 acquires coded data (bit stream) supplied from the outside of the image decoding device 400 and holds (accumulates) the coded data in step S401.

In step S402, the decoding unit 412 performs decoding processing to decode the coded data (bit stream) to obtain the quantization coefficient level. The decoding unit 412 also parses (analyzes and acquires) various coding parameters from the coded data (bit stream) in this decoding.

In step S403, the inverse quantization unit 413 performs inverse quantization, which is the inverse processing of the quantization performed on the coding side, on the quantization coefficient level obtained by the processing of step S402 thus to obtain a transform coefficient Coeff_IQ.

In step S404, the inverse orthogonal transform unit 414 performs inverse orthogonal transform processing, which is the inverse processing of the orthogonal transform processing performed on the coding side, on the transform coefficient Coeff_IQ obtained in step S403 to obtain a prediction residual D'.

In step S405, the prediction unit 419 performs, based on the information parsed in step S402, prediction processing by using a prediction method specified by the coding side, to generate a predicted image P, for example, by referring to a reference image stored in the frame memory 418.

In step S406, the calculation unit 415 adds the prediction residual D' obtained in step S404 to the predicted image P obtained in step S405 to derive a locally decoded image Rlocal.

In step S407, the in-loop filter unit 416 performs in-loop filter processing on the locally decoded image Rlocal obtained by the processing of step S406.

In step S408, the rearrangement buffer 417 derive a decoded image R by using the filtered locally decoded image Rlocal obtained by the processing of step S407, and rearranges from decoding order to reproduction order the order of decoded images R thus obtained. The decoded images R rearranged in reproduction order are output as a moving image to the outside of the image decoding device 400.

In step S409, the frame memory 418 stores at least one of the locally decoded image Rlocal obtained by the processing of step S406 and the filtered locally decoded image Rlocal obtained by the processing of step S407.

When the processing of step S409 ends, the image decoding processing ends.

<Flow of Decoding>

An example of a flow of decoding processing performed in step S402 of FIG. 18 will be described with reference to the flowchart of FIG. 19.

Figure 19:
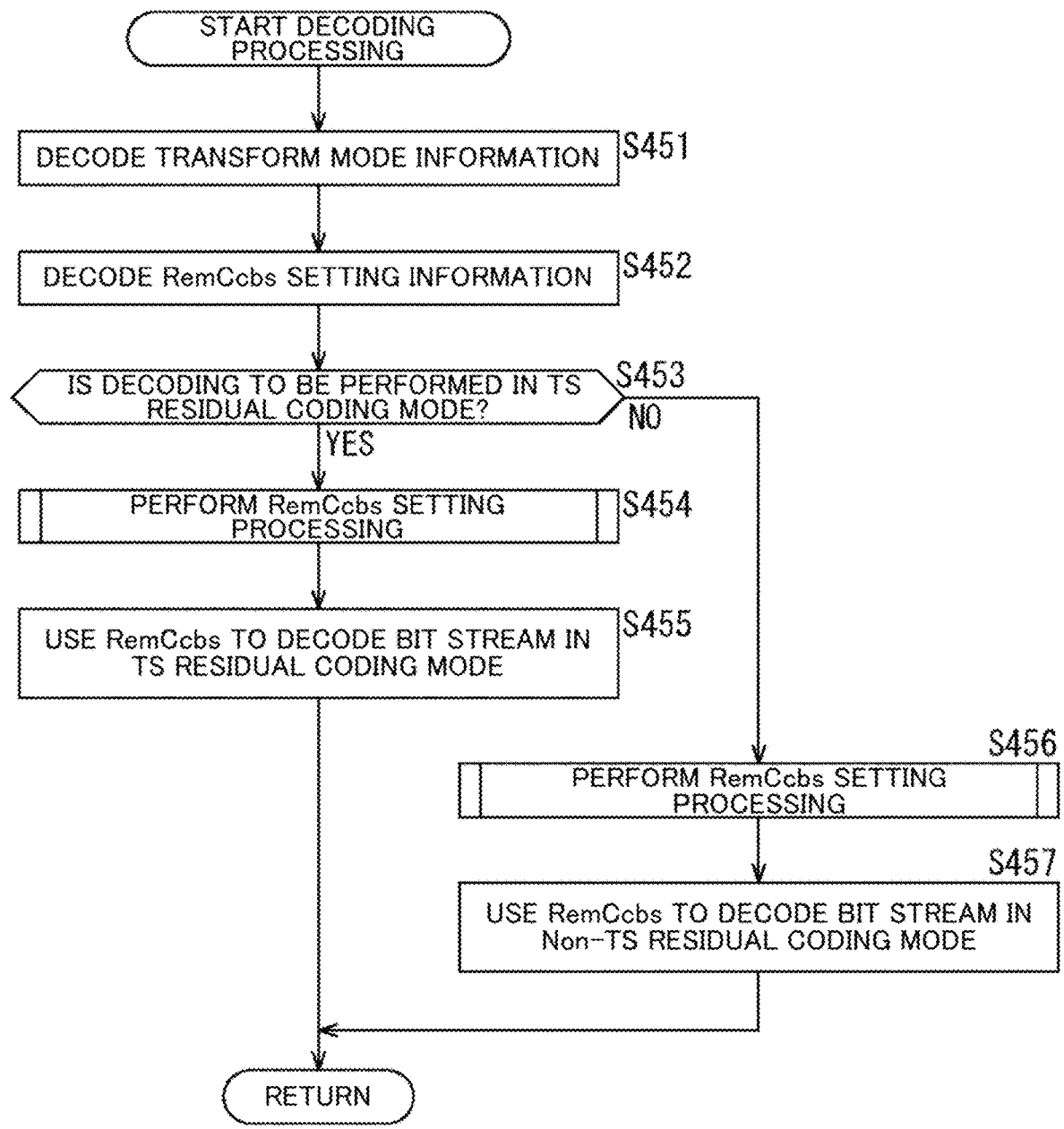
FIG. 19 is a flowchart illustrating an example of a flow of decoding processing.

When the decoding processing is started, the decoding unit 412 decodes the bit stream to generate the transform mode information (transform_skip_flag, mts_idx, etc.) in step S451 of FIG. 19.

In step S452, the decoding unit 412 decodes the bit stream to generate the RemCcbs setting information (ctxBinSampleRatioBase, bitDepth, Tb Width, TbHeight, etc.). Furthermore, the decoding unit 412 decodes the bit stream to generate the information other than the quantization coefficient level, such as various coding parameters.

In step S453, the selection unit 451 determines whether or not to decode the coded data of the quantization coefficient level (the syntax for the quantization coefficient level) in the TS residual coding mode, based on the transform mode information and others. For example, if the transform skip flag indicates skip of coefficient transform in coding (transform_skip_flag[cIdx]="IS_SKIP"), the selection unit 451 determines to decode the coded data in the TS residual coding mode. On the other hand, if the transform skip flag does not indicate skip of coefficient transform in coding processing, the selection unit 451 determines to decode the coded data in the Non-TS residual coding mode.

If the MTS identifier indicates skip of the primary transform in coding (mts_idx[cIdx]=="IS_SKIP"), the selection unit 451 may determine to decode the coded data in the TS residual coding mode. In that case, if the MTS identifier does not indicate skip of the primary transform in coding, the selection unit 451 determines to decode the coded data in the Non-TS residual coding mode.

If it is determined that the TS residual coding mode is to be applied, the processing proceeds to step S454.

In step S454, the RemCcbs setting unit 461 performs RemCcbs setting processing to set (the initial value of) RemCcbs.

In step S455, the TS residual decoding unit 452 uses (the initial value of) RemCcbs obtained in step S454 to decode the coded data of the quantization coefficient level in the TS residual coding mode. When the processing of step S455 ends, the decoding processing ends, and then the processing returns to FIG. 18.

If it is determined in step S453 of FIG. 19 that the TS residual coding mode is not to be applied (that is, the Non-TS residual coding mode is to be applied), the processing proceeds to step S456.

In step S456, the RemCcbs setting unit 462 performs RemCcbs setting processing to set (the initial value of) RemCcbs.

In step S457, the Non-TS residual decoding unit 453 uses (the initial value of) RemCcbs obtained in step S456 to decode the coded data of the quantization coefficient level in the Non-TS residual coding mode. When the processing of step S457 ends, the decoding processing ends, and then the processing returns to FIG. 18.

Method 1-1 according to the present technology described above may be applied to the RemCcbs setting processing performed in steps S454 and S456 of such decoding processing. For example, this RemCcbs setting processing may be performed according to the flow described with reference to the flowchart of FIG. 4. For example, the RemCcbs setting unit 461 and the RemCcbs setting unit 462 may apply any one of Methods 1-1-1 to 1-1-3 to set the initial value of RemCcbs. For example, the RemCcbs setting unit 461 and the RemCcbs setting unit 462 may apply any one of Equation (2) and Equations (3) to (5) to set the initial value of RemCcbs.

By doing so, the same effects as those described in <2. Suppression of increase in context-coded bins> can be obtained. Thus, the RemCcbs setting unit 461 and the RemCcbs setting unit 462 can control the number of context-coded bins to be generated. Accordingly, the decoding unit 412 can suppress an increase in the amount of decoding processing. For example, the decoding unit 412 can suppress an increase in the amount of CABAC processing in decoding of an image with high bit depth and high bit rate.

In other words, the RemCcbs setting unit 461 and the RemCcbs setting unit 462 can suppress an increase in the number of context-coded bins to be generated, thereby suppressing an increase in the total of the numbers of context-coded bins and bypass-coded bins. Accordingly, the decoding unit 412 can suppress an increase in the total amount of CABAC processing.

Thus, by performing each processing as described above, the image decoding device 400 can suppress an increase in the amount of decoding processing.

<Control Unit and Coding Unit>

Figure 20:
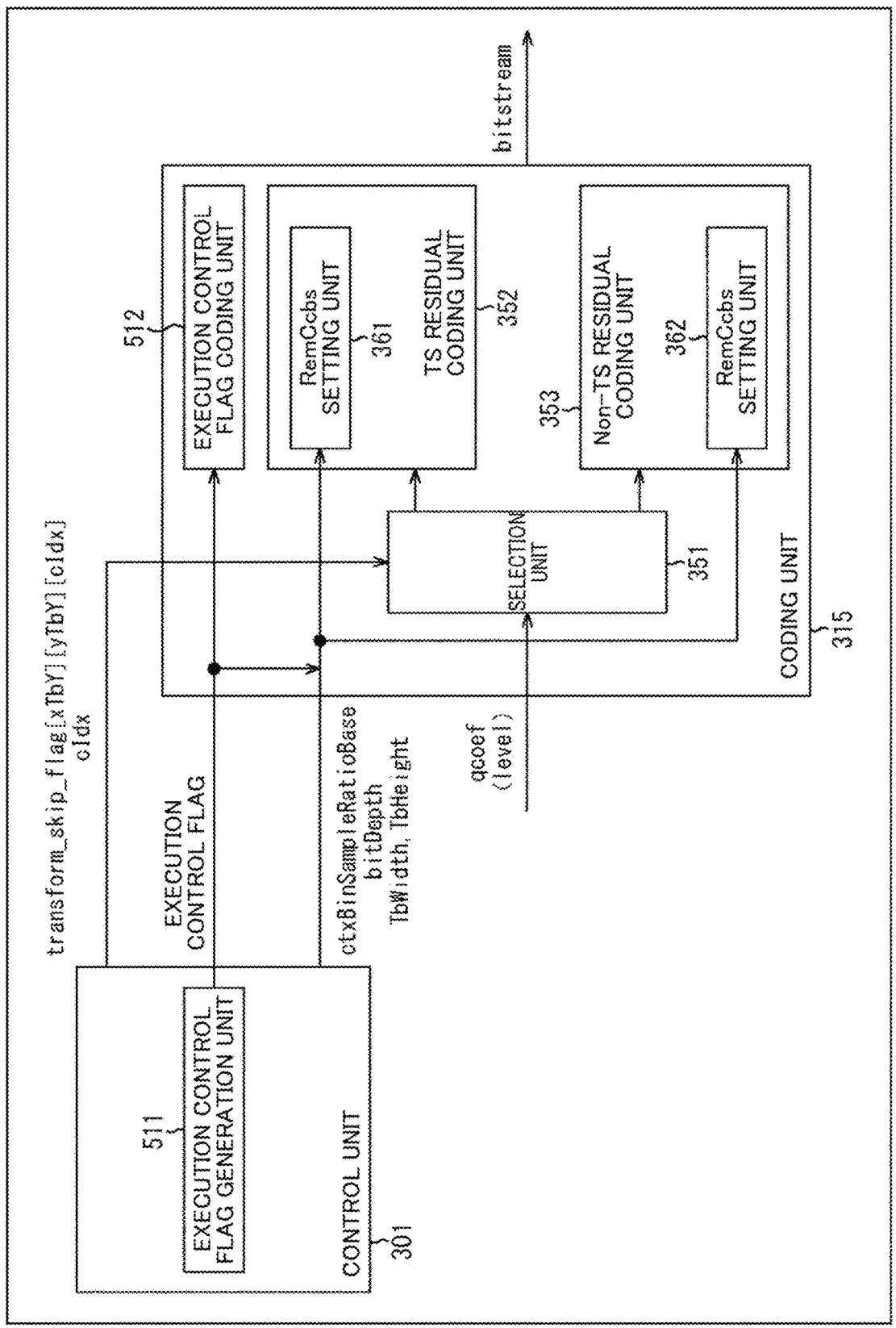
FIG. 20 is a block diagram illustrating a main configuration example of a coding unit.

Method 1-1-4 according to the present technology may be applied to the image coding device 300. FIG. 20 is a block diagram illustrating a main configuration example of a control unit 301 and a coding unit 315 in that case. As illustrated in FIG. 20, the control unit 301 in this case includes an execution control flag generation unit 511. The coding unit 315 includes the selection unit 351, the TS residual coding unit 352, the Non-TS residual coding unit 353, and an execution control flag coding unit 512.

The execution control flag generation unit 511 generates an execution control flag as described in, for example, <Execution control flag> in <2. Suppression of increase in context-coded bins>. The execution control flag generation unit 511 supplies the generated execution control flag to the coding unit 315. For example, the execution control flag generation unit 511 may supply the generated execution control flag to the execution control flag coding unit 512. The execution control flag generation unit 511 may also supply the generated execution control flag to the RemCcbs setting unit 361 and the RemCcbs setting unit 362.

This execution control flag is a flag that indicates whether or not the present technology is to be applied. For example, if this execution control flag is true, Method 1 (Method 1-1) according to the present technology is applied, and the maximum number of context-coded bins is set according to the number of context-coded bins depending on the bit depth. If this execution control flag is false, Method 1 (Method 1-1) according to the present technology is not applied, and the maximum number of context-coded bins is set according to the reference value for the number of context-coded bins.

The execution control flag generation unit 511 may generate this execution control flag based on any information. For example, the execution control flag generation unit 511 may generate the execution control flag based on the image to be coded or parameters for the image. Further, the execution control flag generation unit 511 may generate the execution control flag based on an instruction from the outside of the image coding device 300, such as a user or an application.

The execution control flag coding unit 512 performs processing related to coding of the execution control flag. For example, the execution control flag coding unit 512 acquires the execution control flag supplied from the execution control flag generation unit 511. Further, the execution control flag coding unit 512 codes the acquired execution control flag to generate coded data of the execution control flag. The coded data of the execution control flag is stored in the bit stream of coded data such as the quantization coefficient level by the coding unit 315. The selection unit 351, the TS residual coding unit 352, and the Non-TS residual coding unit 353 perform the same processing as those in FIG. 11. Specifically, the selection unit 351 selects based on transform_skip_flag[xTbY][yTbY][cIdx] and cIdx to code the quantization coefficient level in the TS residual coding mode or the Non-TS residual coding mode. The TS residual coding unit 352 codes the quantization coefficient level in the TS residual coding mode. The Non-TS residual coding unit 353 codes the quantization coefficient level in the Non-TS residual coding mode.

The TS residual coding unit 352 includes the RemCcbs setting unit 361. The RemCcbs setting unit 361 basically performs the same processing as in FIG. 11. Specifically, the RemCcbs setting unit 361 sets the initial value of RemCcbs, and the TS residual coding unit 352 codes the acquired quantization coefficient level by using RemCcbs. The Non-TS residual coding unit 353 includes the RemCcbs setting unit 362. The RemCcbs setting unit 362 basically performs the same processing as in FIG. 11. Specifically, the RemCcbs setting unit 362 sets the initial value of RemCcbs, and the Non-TS residual coding unit 353 codes the acquired quantization coefficient level by using RemCcbs.

Method 1-1-4 according to the present technology described above may be applied to these RemCcbs setting unit 361 and RemCcbs setting unit 362. Specifically, if the execution control flag is true, the RemCcbs setting unit 361 and the RemCcbs setting unit 362 may set, based on the bit depth of the image, the number of context-coded bins depending on the bit depth, and set, based on the number of context-coded bins depending on the bit depth, the maximum number of context-coded bins; if the execution control flag is false, the RemCcbs setting unit 361 and the RemCcbs setting unit 362 may set, based on the reference value for the number of context-coded bins, the maximum number of context-coded bins. For example, the RemCcbs setting unit 361 and the RemCcbs setting unit 362 may have the same configuration as the RemCcbs setting device 100 illustrated in FIG. 6 to perform the same processing to set the initial value of RemCcbs.

In that case, the RemCcbs setting unit 361 and the RemCcbs setting unit 362 acquire the execution control flag supplied from the execution control flag generation unit 511. The RemCcbs setting unit 361 and the RemCcbs setting unit 362 then determine a method of setting ctxBinSampleRatio based on the execution control flag.

For example, if the execution control flag is true (for example, 1), the RemCcbs setting unit 361 and the RemCcbs setting unit 362 set the number of context-coded bins depending on the bit depth (ctxBinSampleRatio(bitDepth)). Specifically, the RemCcbs setting unit 361 and the RemCcbs setting unit 362 acquire the bitDepth supplied from the control unit 301, and use bitDepth to set the number of context-coded bins (ctxBinSampleRatio(bitDepth)) that depends on the bit depth. The RemCcbs setting unit 361 and the RemCcbs setting unit 362 then use ctxBinSampleRatio (bitDepth) to set the initial value of RemCcbs. In this case, the RemCcbs setting unit 361 and the RemCcbs setting unit 362 may set ctxBinSampleRatio(bitDepth) based on bitDepth and any other parameters. For example, the RemCcbs setting unit 361 and the RemCcbs setting unit 362 may acquire the reference value (ctxBinSampleRatioBase) for the number of context-coded bins supplied from the control unit 301, and use bitDepth described above and the corresponding ctxBinSampleRatioBase to set ctxBinSampleRatio (bitDepth).

In this case, the RemCcbs setting unit 361 and the RemCcbs setting unit 362 may set the initial value of RemCcbs based on ctxBinSampleRatio(bitDepth) and any other parameters. For example, the RemCcbs setting unit 361 and the RemCcbs setting unit 362 may acquire the block size (Tb Width and TbHeight) of the block to be processed, which is supplied from the control unit 301, and use ctxBinSampleRatio(bitDepth) described above and the corresponding Tb Width and TbHeight to set the initial value of RemCcbs corresponding to the block to be processed.

In this case, the RemCcbs setting unit 361 and the RemCcbs setting unit 362 may apply any one of Methods 1-1-1 to 1-1-3 to set the initial value of RemCcbs. For example, the RemCcbs setting unit 361 and the RemCcbs setting unit 362 may apply any one of Equation (2) and Equations (3) to (5) to set the initial value of RemCcbs.

On the other hand, if the execution control flag is false (for example, 0), the RemCcbs setting unit 361 and the RemCcbs setting unit 362 set the number of context-coded bins not depending on bitDepth (ctxBinSampleRatio). Specifically, the RemCcbs setting unit 361 and the RemCcbs setting unit 362 acquire the reference value (ctxBinSampleRatioBase) for the number of context-coded bins supplied from the control unit 301, and set the acquired ctxBinSampleRatioBase as ctxBinSampleRatio. The RemCcbs setting unit 361 and the RemCcbs setting unit 362 then use the ctxBinSampleRatio (that is, ctxBinSampleRatioBase) to set the initial value of RemCcbs.

In this case, the RemCcbs setting unit 361 and the RemCcbs setting unit 362 may set the initial value of RemCcbs based on ctxBinSampleRatio and any other parameters. For example, the RemCcbs setting unit 361 and the RemCcbs setting unit 362 may acquire the block size (Tb Width and TbHeight) of the block to be processed, which is supplied from the control unit 301, and use ctxBinSampleRatio (that is, ctxBinSampleRatioBase) described above and the corresponding Tb Width and TbHeight to set the initial value of RemCcbs corresponding to the block to be processed.

The coding unit 315 (the TS residual coding unit 352 and the Non-TS residual coding unit 353) uses the initial value (the maximum number of context-coded bins) of RemCcbs thus set by the RemCcbs setting unit 361 and the RemCcbs setting unit 362 to code the image (the quantization coefficient level) (in the TS residual coding mode or the Non-TS residual coding mode). Thus, the coding unit 315 uses the maximum number of context-coded bins set by the RemCcbs setting unit 361 and the RemCcbs setting unit 362, to which the present technology is applied, to context-code the image (the quantization coefficient level). Accordingly, in this case as well, the coding unit 315 can also be said to be an image coding unit.

By doing so, the same effects as those described in <2. Suppression of increase in context-coded bins> can be obtained. Thus, in this case as well, the RemCcbs setting unit 361 and the RemCcbs setting unit 362 can control the number of context-coded bins to be generated. Accordingly, the coding unit 315 can suppress an increase in the amount of coding processing. For example, the coding unit 315 can suppress an increase in the amount of CABAC processing in coding of an image with high bit depth and high bit rate.

In other words, in this case as well, the RemCcbs setting unit 361 and the RemCcbs setting unit 362 can suppress an increase in the number of context-coded bins to be generated, thereby suppressing an increase in the total of the numbers of context-coded bins and bypass-coded bins. Accordingly, the coding unit 315 can suppress an increase in the total amount of CABAC processing.

Thus, the image coding device 300 can suppress an increase in the amount of coding processing.

<Flow of Image Coding Processing>

Next, an example of a flow of image coding processing performed by the image coding device 300 including the coding unit 315 configured as illustrated in FIG. 20 will be described with reference to the flowchart of FIG. 21.

Figure 14:
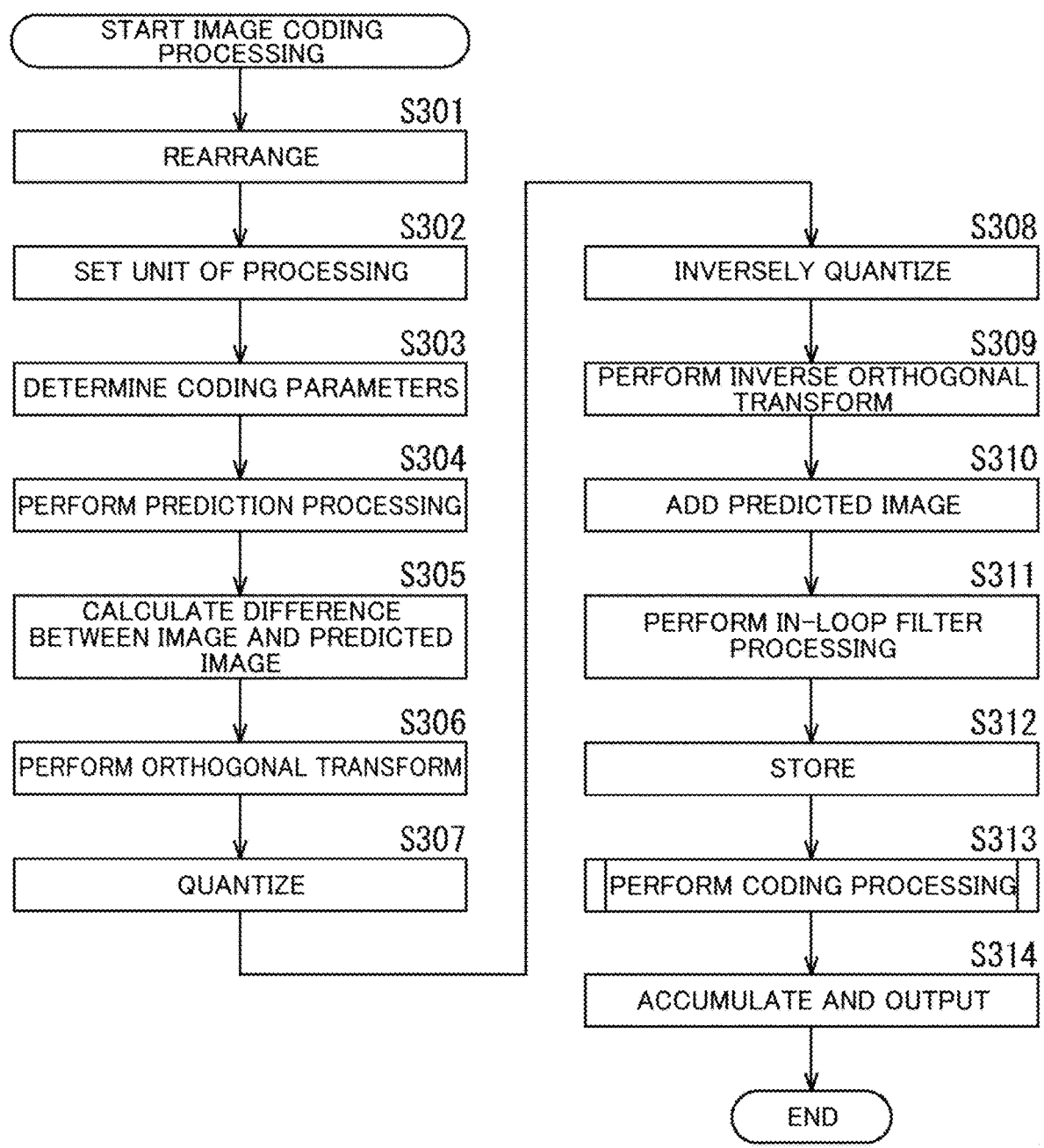
FIG. 14 is a flowchart illustrating an example of a flow of image coding processing.

When the image coding processing is started, the processing of steps S501 and S502 is performed in the same manner as the processing of steps S301 and S302 of FIG. 14.

In step S503, the execution control flag generation unit 511 generates an execution control flag.

The processing of steps S504 to S515 is performed in the same manner as the processing of steps S303 to S314 of FIG. 14.

When the processing of step S515 ends, the image coding processing ends.

<Flow of Coding Processing>

An example of a flow of coding processing performed in step S514 of FIG. 21 will be described with reference to the flowchart of FIG. 22.

Figure 22:
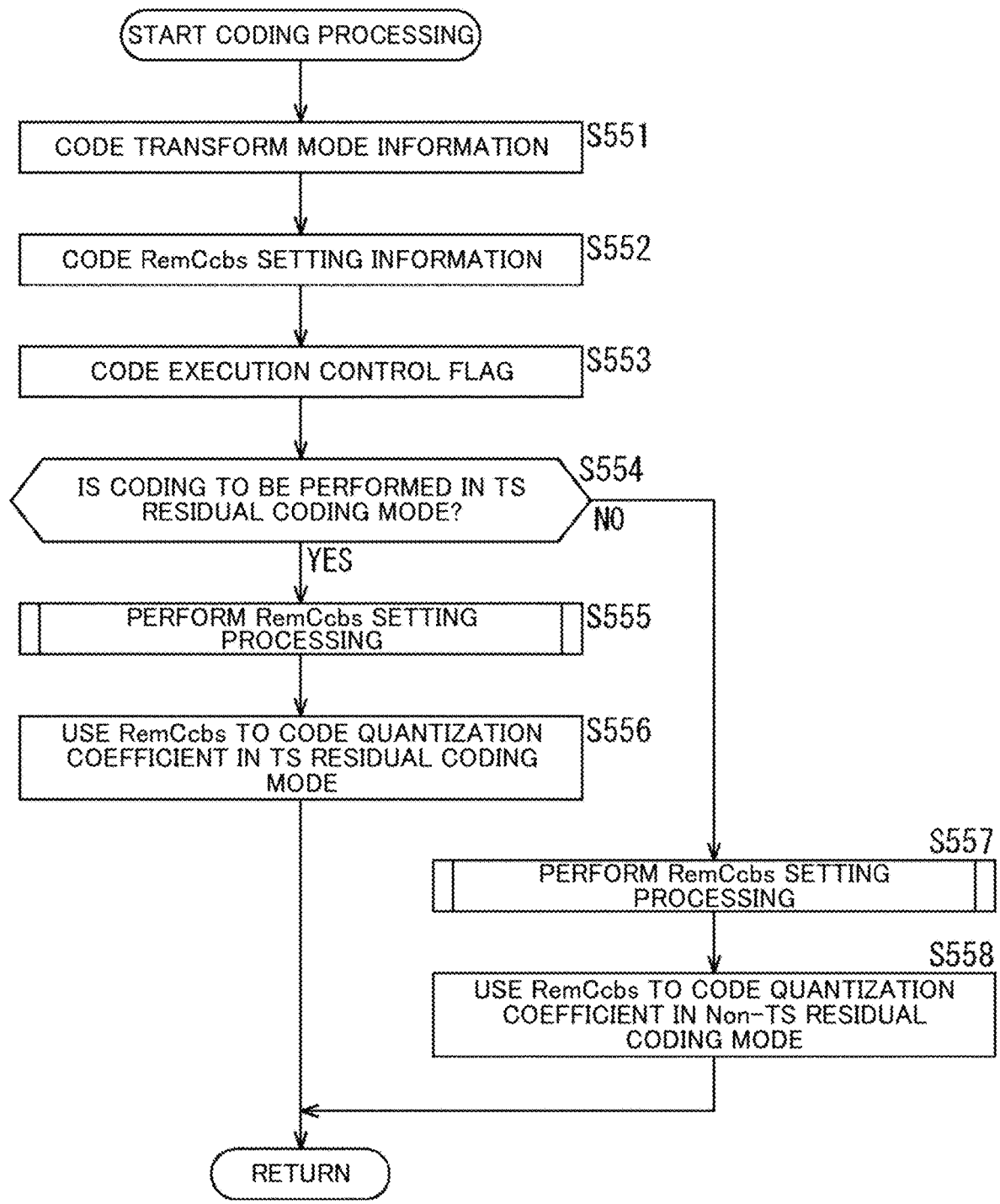
FIG. 22 is a flowchart illustrating an example of a flow of coding processing.

When the coding processing is started, the processing of steps S551 and S552 of FIG. 22 is performed in the same manner as the processing of steps S351 and S352 of FIG. 15.

Figure 21:
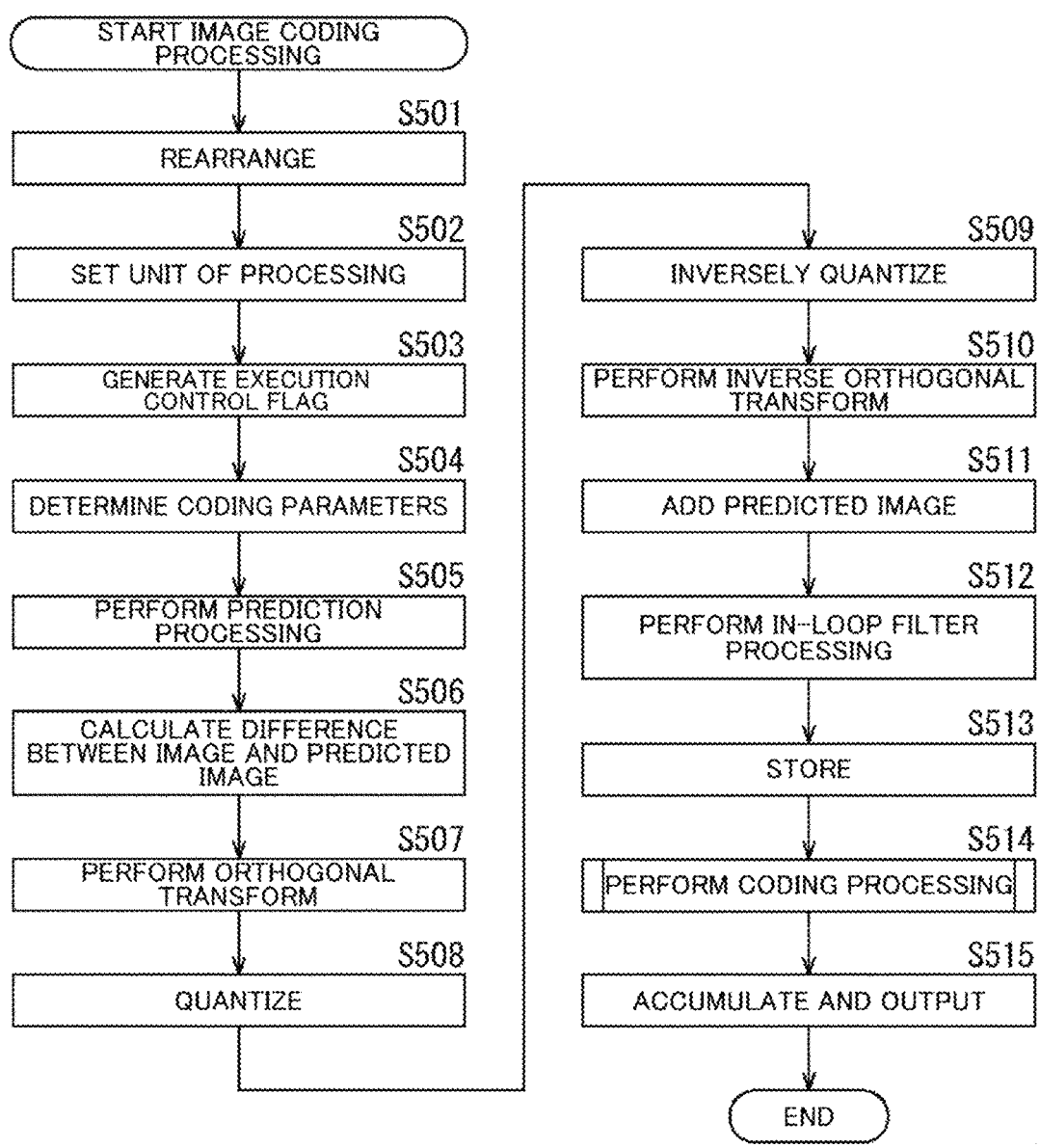
FIG. 21 is a flowchart illustrating an example of a flow of image coding processing.

In step S553, the execution control flag coding unit 512 codes the execution control flag generated in step S503 in FIG. 21.

Then, the processing of steps S554 to S558 is performed in the same manner as the processing of steps S353 to S357 in FIG. 15. When the processing of step S556 or step S558 ends, the coding processing ends, and then the processing returns to FIG. 21.

Method 1-1-4 according to the present technology described above may be applied to the RemCcbs setting processing performed in such coding processing of steps S555 and S557. For example, this RemCcbs setting processing may be performed according to the flow described with reference to the flowchart of FIG. 7. For example, the RemCcbs setting unit 361 and the RemCcbs setting unit 362 may apply any one of Methods 1-1-1 to 1-1-3 to set the initial value of RemCcbs. For example, the RemCcbs setting unit 361 and the RemCcbs setting unit 362 may apply any one of Equation (2) and Equations (3) to (5) to set the initial value of RemCcbs.

By doing so, the same effects as those described in <2. Suppression of increase in context-coded bins> can be obtained. Thus, in this case as well, the RemCcbs setting unit 361 and the RemCcbs setting unit 362 can control the number of context-coded bins to be generated. Accordingly, the coding unit 315 can suppress an increase in the amount of coding processing. For example, the coding unit 315 can suppress an increase in the amount of CABAC processing in coding of an image with high bit depth and high bit rate.

In other words, in this case as well, the RemCcbs setting unit 361 and the RemCcbs setting unit 362 can suppress an increase in the number of context-coded bins to be generated, thereby suppressing an increase in the total of the numbers of context-coded bins and bypass-coded bins. Accordingly, the coding unit 315 can suppress an increase in the total amount of CABAC processing.

Thus, by performing each processing as described above, the image coding device 300 can suppress an increase in the amount of coding processing.

<Decoding Unit>

Figure 23:
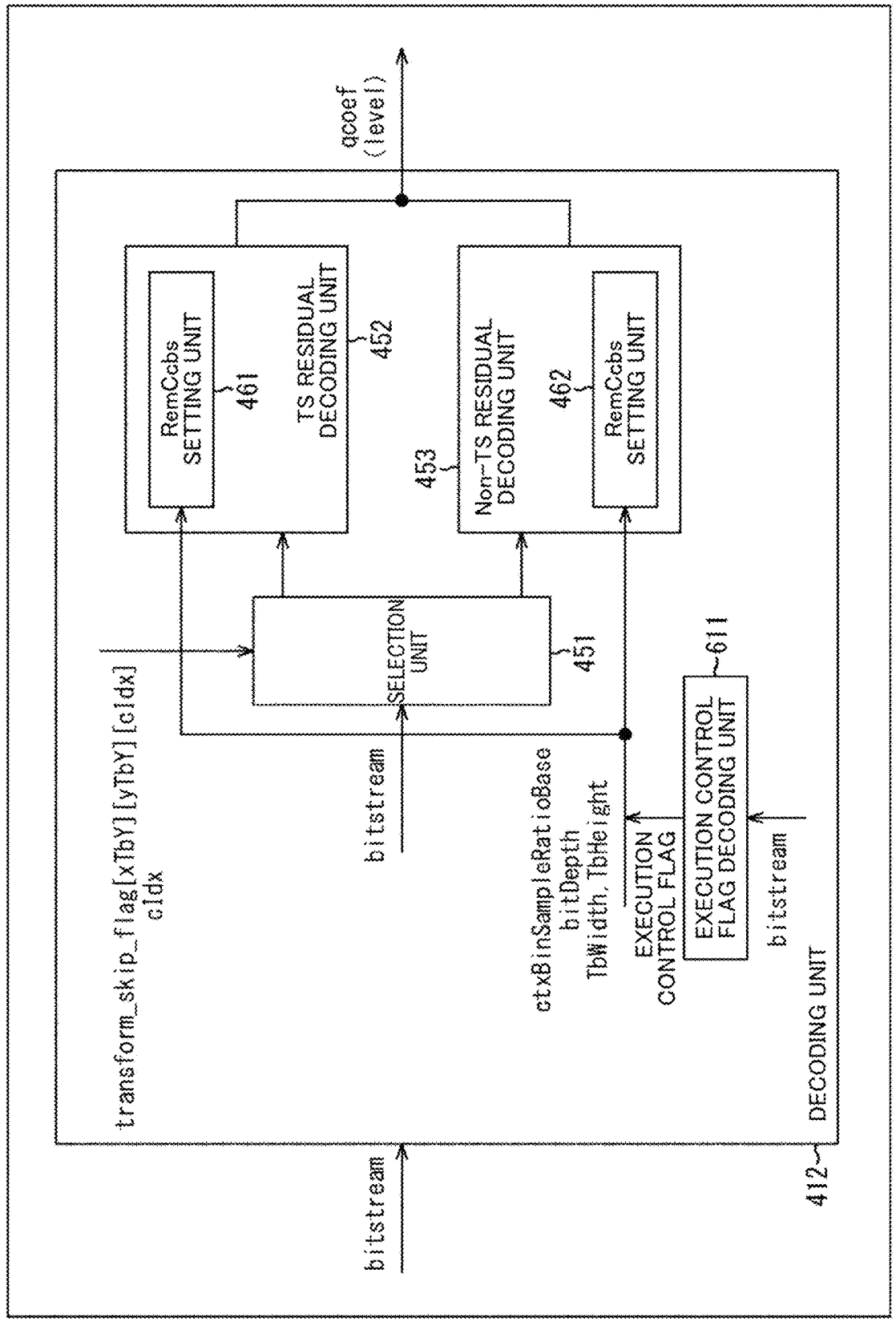
FIG. 23 is a block diagram illustrating a main configuration example of a decoding unit.

Method 1-1-4 according to the present technology may be applied to the image decoding device 400. FIG. 23 is a block diagram illustrating a main configuration example of a decoding unit 412 in that case. As illustrated in FIG. 23, the decoding unit 412 includes a selection unit 451, a TS residual decoding unit 452, a Non-TS residual decoding unit 453, and an execution control flag decoding unit 611.

The execution control flag decoding unit 611 decodes the bit stream to generate the execution control flag as described in, for example, <Execution control flag> in <2. Suppression of increase in context-coded bins>. The execution control flag decoding unit 611 supplies the generated execution control flag to a RemCcbs setting unit 461 and a RemCcbs setting unit 462.

The selection unit 451, the TS residual decoding unit 452, and the Non-TS residual decoding unit 453 perform the same processing as those in FIG. 17. Specifically, the selection unit 451 selects based on transform_skip_flag [xTbY][yTbY][cIdx] and cIdx to decode the coded data of the quantization coefficient level in the TS residual coding mode or the Non-TS residual coding mode. The TS residual decoding unit 452 decodes the coded data of the quantization coefficient level in the TS residual coding mode. The Non-TS residual decoding unit 453 decodes the coded data of the quantization coefficient level in the Non-TS residual coding mode.

The TS residual decoding unit 452 includes the RemCcbs setting unit 461. The RemCcbs setting unit 461 basically performs the same processing as in FIG. 17. Specifically, the RemCcbs setting unit 461 sets the initial value of RemCcbs, and the TS residual decoding unit 452 decodes the coded data of the acquired quantization coefficient level by using RemCcbs. The Non-TS residual decoding unit 453 includes the RemCcbs setting unit 462. The RemCcbs setting unit 462 basically performs the same processing as in FIG. 17. Specifically, the RemCcbs setting unit 462 sets the initial value of RemCcbs, and the Non-TS residual decoding unit 453 decodes the coded data of the acquired quantization coefficient level by using RemCcbs.

Method 1-1-4 according to the present technology described above may be applied to these RemCcbs setting unit 461 and RemCcbs setting unit 462. Specifically, if the execution control flag is true, the RemCcbs setting unit 461 and the RemCcbs setting unit 462 may set, based on the bit depth of the image, the number of context-coded bins depending on the bit depth, and set, based on the number of context-coded bins depending on the bit depth, the maximum number of context-coded bins; if the execution control flag is false, the RemCcbs setting unit 461 and the RemCcbs setting unit 462 may set, based on the reference value for the number of context-coded bins the maximum number of context-coded bins. For example, the RemCcbs setting unit 461 and the RemCcbs setting unit 462 may have the same configuration as the RemCcbs setting device 100 illustrated in FIG. 6 to perform the same processing to set the initial value of RemCcbs.

In that case, the RemCcbs setting unit 461 and the RemCcbs setting unit 462 acquire the execution control flag supplied from the execution control flag decoding unit 611. The RemCcbs setting unit 461 and the RemCcbs setting unit 462 then determine a method of setting ctxBinSampleRatio based on the execution control flag. That method is the same as in the case of the RemCcbs setting unit 361 and the RemCcbs setting unit 362 (FIG. 20). For example, if the execution control flag is true (for example, 1), the RemCcbs setting unit 461 and the RemCcbs setting unit 462 may apply any one of Methods 1-1-1 to 1-1-3 to set the initial value of RemCcbs. For example, the RemCcbs setting unit 461 and the RemCcbs setting unit 462 may apply any one of Equation (2) and Equations (3) to (5) to set the initial value of RemCcbs.

The decoding unit 412 (the TS residual decoding unit 452 and the Non-TS residual decoding unit 453) uses the initial value (the maximum number of context-coded bins) of RemCcbs thus set by the RemCcbs setting unit 461 and the RemCcbs setting unit 462 to decode the coded data of the image (the quantization coefficient level) (in the TS residual coding mode or the Non-TS residual coding mode). Thus, the decoding unit 412 uses the maximum number of context-coded bins set by the RemCcbs setting unit 461 and the RemCcbs setting unit 462, to which the present technology is applied, to context-decode the coded data of the image (the quantization coefficient level). Accordingly, in this case as well, the decoding unit 412 can also be said to be an image decoding unit.

By doing so, the same effects as those described in <2. Suppression of increase in context-coded bins> can be obtained. Thus, in this case as well, the RemCcbs setting unit 461 and the RemCcbs setting unit 462 can control the number of context-coded bins to be generated. Accordingly, the decoding unit 412 can suppress an increase in the amount of decoding processing. For example, the decoding unit 412 can suppress an increase in the amount of CABAC processing in decoding of an image with high bit depth and high bit rate.

In other words, in this case as well, the RemCcbs setting unit 461 and the RemCcbs setting unit 462 can suppress an increase in the number of context-coded bins to be generated, thereby suppressing an increase in the total of the numbers of context-coded bins and bypass-coded bins. Accordingly, the decoding unit 412 can suppress an increase in the total amount of CABAC processing.

Thus, the image decoding device 400 can suppress an increase in the amount of decoding processing.

<Flow of Coding Processing>

Figure 24:
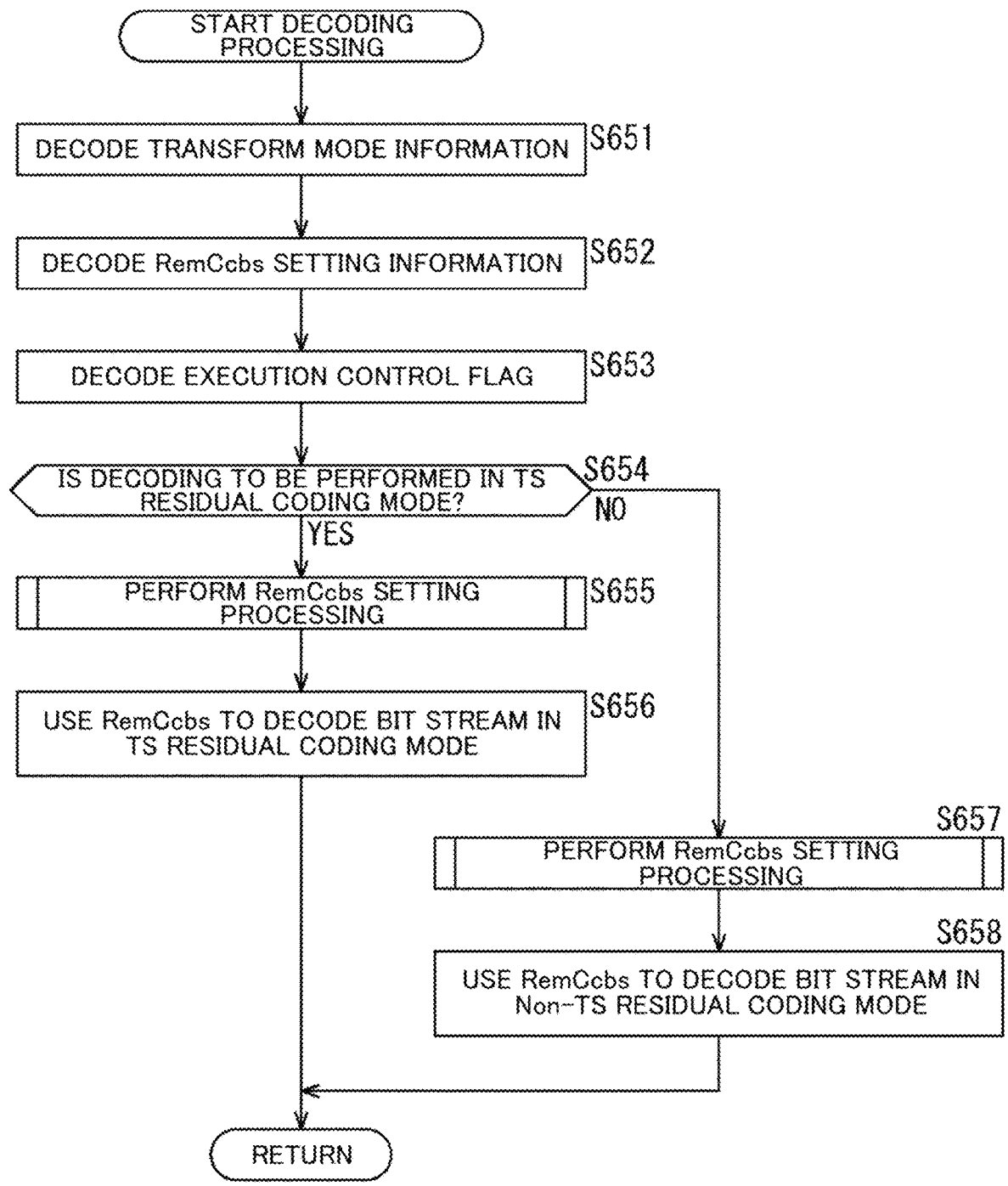
FIG. 24 is a flowchart illustrating an example of a flow of decoding processing.

The image coding processing performed by the image decoding device 400 including the decoding unit 412 configured as illustrated in FIG. 23 is performed in the same flow as described with reference to the flowchart of FIG. 18. An example of a flow of coding processing performed in step S402 of FIG. 18 in this case will be described with reference to the flowchart of FIG. 24. When the decoding processing is started, the processing of steps S651 and S652 of FIG. 24 is performed in the same manner as the processing of steps S451 and S452 of FIG. 19.

In step S653, the execution control flag decoding unit 611 decodes the bit stream to generate the execution control flag.

Then, the processing of steps S654 to S658 is performed in the same manner as the processing of steps S453 to S457 of FIG. 19. When the processing of step S656 or step S658 ends, the decoding processing ends, and then the processing returns to FIG. 18.

Method 1-1-4 according to the present technology described above may be applied to the RemCcbs setting processing performed in steps S655 and S657 of such decoding processing. For example, this RemCcbs setting processing may be performed according to the flow described with reference to the flowchart of FIG. 7. For example, the RemCcbs setting unit 461 and the RemCcbs setting unit 462 may apply any one of Methods 1-1-1 to 1-1-3 to set the initial value of RemCcbs. For example, the RemCcbs setting unit 461 and the RemCcbs setting unit 462 may apply any one of Equation (2) and Equations (3) to (5) to set the initial value of RemCcbs.

By doing so, the same effects as those described in <2. Suppression of increase in context-coded bins> can be obtained. Thus, in this case as well, the RemCcbs setting unit 461 and the RemCcbs setting unit 462 can control the number of context-coded bins to be generated. Accordingly, the decoding unit 412 can suppress an increase in the amount of decoding processing. For example, the decoding unit 412 can suppress an increase in the amount of CABAC processing in decoding of an image with high bit depth and high bit rate.

In other words, in this case as well, the RemCcbs setting unit 461 and the RemCcbs setting unit 462 can suppress an increase in the number of context-coded bins to be generated, thereby suppressing an increase in the total of the numbers of context-coded bins and bypass-coded bins. Accordingly, the decoding unit 412 can suppress an increase in the total amount of CABAC processing.

Thus, by performing each processing as described above, the image decoding device 400 can suppress an increase in the amount of decoding processing.

<Control Unit and Coding Unit>

Figure 25:
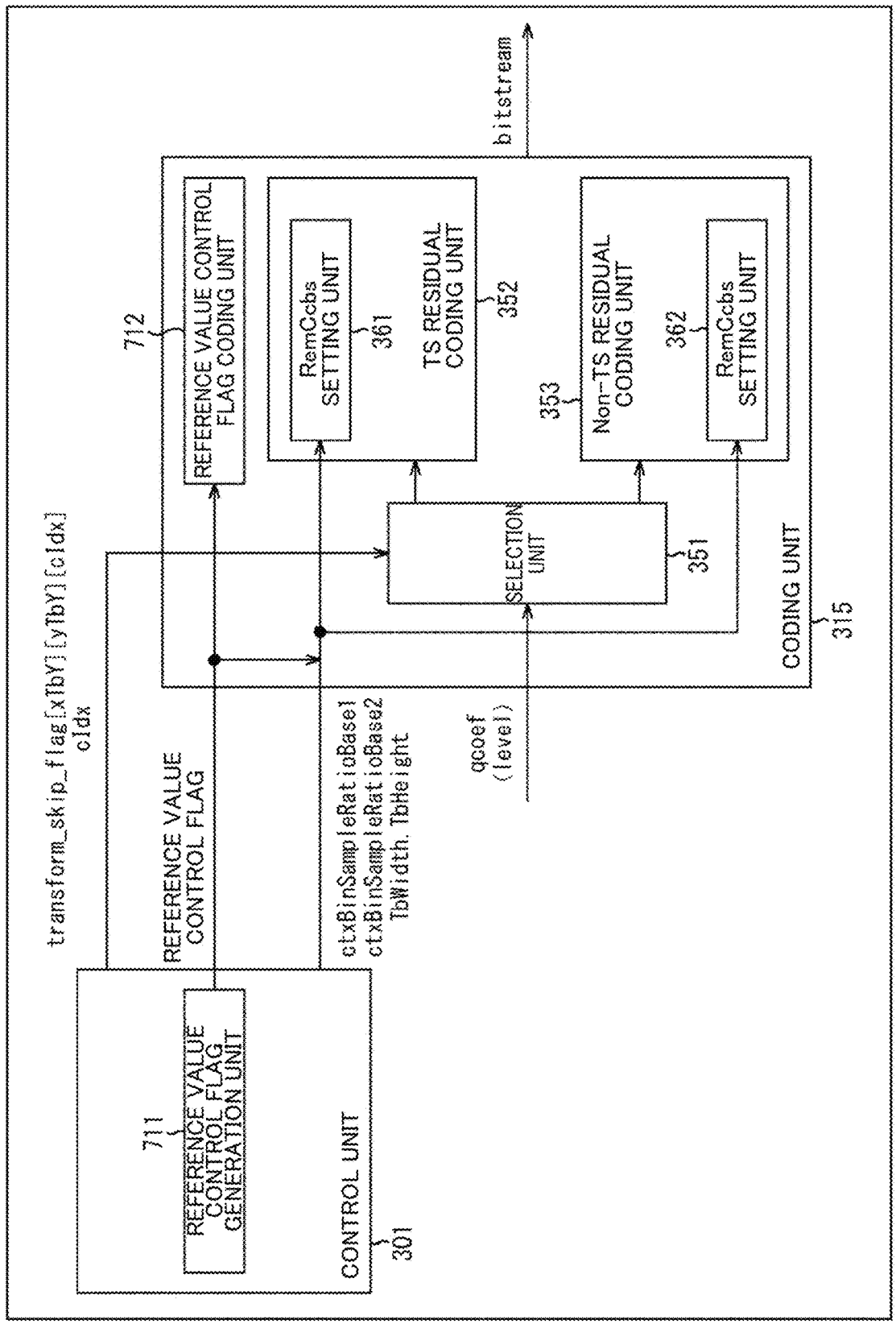
FIG. 25 is a block diagram illustrating a main configuration example of a coding unit.

Method 2 (or Method 2-1) according to the present technology may be applied to the image coding device 300. FIG. 25 is a block diagram illustrating a main configuration example of a control unit 301 and a coding unit 315 in that case. As illustrated in FIG. 25, the control unit 301 in this case includes a reference value control flag generation unit 711. The coding unit 315 includes the selection unit 351, the TS residual coding unit 352, the Non-TS residual coding unit 353, and a reference value control flag coding unit 712.

The reference value control flag generation unit 711 generates the execution control flag as described in, for example, <Reference value execution control flag> in <2. Suppression of increase in context-coded bins>. The reference value control flag generation unit 711 supplies the generated reference value control flag to the coding unit 315. For example, the reference value control flag generation unit 711 may supply the generated reference value control flag to the reference value control flag coding unit 712. The reference value control flag generation unit 711 may supply the generated reference value control flag to the RemCcbs setting unit 361 and the RemCcbs setting unit 362.

This reference value control flag is a flag that controls the value of the reference value for the number of context-coded bins at the CG level. For example, if this reference value control flag is true (for example, 1), ctxBinSampleRatioBase1 (the first reference value for the number of context-coded bins at the CG level) is used to set the initial value of RemCcbs (the maximum number of context-coded bins to be generated in coding of the image). If this reference value control flag is false (for example, 0), ctxBinSampleRatioBase2 (the second reference value for the number of context-coded bins at the CG level) is used to set the initial value of RemCcbs (the maximum number of context-coded bins to be generated in coding of the image). ctxBinSampleRatioBase1 has any value. For example, ctxBinSampleRatioBase1=28 may be given. ctxBinSampleRatioBase2 has any value within a range smaller than that of ctxBinSampleRatioBase1. For example, ctxBinSampleRatioBase2=0 may be given.

The reference value control flag generation unit 711 may generate this reference value control flag based on any information. For example, the reference value control flag generation unit 711 may generate the reference value control flag based on the image to be coded or parameters for the image. Further, the reference value control flag generation unit 711 may generate the reference value control flag based on an instruction from the outside of the image coding device 300, such as a user or an application.

The reference value control flag coding unit 712 performs processing related to coding of the reference value control flag. For example, the reference value control flag coding unit 712 acquires the reference value control flag supplied from the reference value control flag generation unit 711. Further, the reference value control flag coding unit 712 codes the acquired reference value control flag to generate coded data of the reference value control flag. The coded data of the reference value control flag is stored in the bit stream of coded data such as the quantization coefficient level by the coding unit 315.

The selection unit 351, the TS residual coding unit 352, and the Non-TS residual coding unit 353 perform the same processing as those in FIG. 11. Specifically, the selection unit 351 selects based on transform_skip_flag[xTbY][yTbY][cIdx] and cIdx to code the quantization coefficient level in the TS residual coding mode or the Non-TS residual coding mode. The TS residual coding unit 352 codes the quantization coefficient level in the TS residual coding mode. The Non-TS residual coding unit 353 codes the quantization coefficient level in the Non-TS residual coding mode.

The TS residual coding unit 352 includes the RemCcbs setting unit 361. The RemCcbs setting unit 361 basically performs the same processing as in FIG. 11. Specifically, the RemCcbs setting unit 361 sets the initial value of RemCcbs, and the TS residual coding unit 352 codes the acquired quantization coefficient level by using RemCcbs. The Non-TS residual coding unit 353 includes the RemCcbs setting unit 362. The RemCcbs setting unit 362 basically performs the same processing as in FIG. 11. Specifically, the RemCcbs setting unit 362 sets the initial value of RemCcbs, and the Non-TS residual coding unit 353 codes the acquired quantization coefficient level by using RemCcbs.

Method 2 (or Method 2-1) according to the present technology described above may be applied to these RemCcbs setting unit 361 and RemCcbs setting unit 362. Thus, the RemCcbs setting unit 361 and the RemCcbs setting unit 362 may set the maximum number of context-coded bins according to processing speed control. For example, the RemCcbs setting unit 361 and the RemCcbs setting unit 362 may set the maximum number of context-coded bins based on the reference value control flag.

In that case, the RemCcbs setting unit 361 and the RemCcbs setting unit 362 acquire the reference value control flag supplied from the reference value control flag generation unit 711. The RemCcbs setting unit 361 and the RemCcbs setting unit 362 then determine a method of setting the initial value of RemCcbs based on the reference value control flag.

For example, if the reference value control flag is false (for example, 0), the RemCcbs setting unit 361 and the RemCcbs setting unit 362 set the initial value of RemCcbs based on ctxBinSampleRatioBase1. If the reference value control flag is true (for example, 1), the RemCcbs setting unit 361 and the RemCcbs setting unit 362 set the initial value of RemCcbs based on ctxBinSampleRatioBase2. For example, the RemCcbs setting unit 361 and the RemCcbs setting unit 362 may have the same configuration as the RemCcbs setting device 100 illustrated in FIG. 8 to perform the same processing to set the initial value of RemCcbs.

In that setting, the RemCcbs setting unit 361 and the RemCcbs setting unit 362 may set, based on the reference value (ctxBinSampleRatioBase1 or ctxBinSampleRatioBase2) selected according to the reference value control flag the number of context-coded bins not depending on bitDepth (ctxBinSampleRatio). For example, the RemCcbs setting unit 361 and the RemCcbs setting unit 362 may set ctxBinSampleRatioBase1 or ctxBinSampleRatioBase2 as ctxBinSampleRatio. The RemCcbs setting unit 361 and the RemCcbs setting unit 362 may then use ctxBinSampleRatio (ctxBinSampleRatioBase1 or ctxBinSampleRatioBase2) to set the initial value of RemCcbs. For example, the RemCcbs setting unit 361 and the RemCcbs setting unit 362 may derive the initial value of RemCcbs by using Equation (1) above.

In this case, the RemCcbs setting unit 361 and the RemCcbs setting unit 362 may set the initial value of RemCcbs based on ctxBinSampleRatio and any other parameters. For example, the RemCcbs setting unit 361 and the RemCcbs setting unit 362 may acquire the block size (Tb Width and TbHeight) of the block to be processed, which is supplied from the control unit 301, and use ctxBinSampleRatio (ctxBinSampleRatioBase1 or ctxBinSampleRatioBase2) described above and the corresponding Tb Width and TbHeight to set the initial value of RemCcbs corresponding to the block to be processed.

The coding unit 315 (the TS residual coding unit 352 and the Non-TS residual coding unit 353) uses the initial value (the maximum number of context-coded bins) of RemCcbs thus set by the RemCcbs setting unit 361 and the RemCcbs setting unit 362 to code the image (the quantization coefficient level) (in the TS residual coding mode or the Non-TS residual coding mode). Thus, the coding unit 315 uses the maximum number of context-coded bins set by the RemCcbs setting unit 361 and the RemCcbs setting unit 362, to which the present technology is applied, to context-code the image (the quantization coefficient level). Accordingly, in this case as well, the coding unit 315 can also be said to be an image coding unit.

By doing so, the same effects as those described in <2. Suppression of increase in context-coded bins> can be obtained. Thus, the RemCcbs setting unit 361 and the RemCcbs setting unit 362 can use the reference value control flag to control the number of context-coded bins to be generated. Thus, the RemCcbs setting unit 361 and the RemCcbs setting unit 362 can control according to CABAC processing speed control the number of context-coded bins to be generated. Accordingly, the coding unit 315 can suppress an increase in the amount of coding processing. For example, the coding unit 315 can suppress an increase in the amount of CABAC processing in coding of an image with high bit depth and high bit rate.

In other words, the RemCcbs setting unit 361 and the RemCcbs setting unit 362 can suppress according to CABAC processing speed control an increase in the number of context-coded bins to be generated, thereby suppressing an increase in the total of the numbers of context-coded bins and bypass-coded bins. Accordingly, the coding unit 315 can suppress an increase in the total amount of CABAC processing.

Thus, the image coding device 300 can suppress an increase in the amount of coding processing.

<Flow of Image Coding Processing>

Next, an example of a flow of image coding processing performed by the image coding device 300 including the coding unit 315 configured as illustrated in FIG. 25 will be described with reference to the flowchart of FIG. 26.

When the image coding processing is started, the processing of steps S701 and S702 is performed in the same manner as the processing of steps S301 and S302 of FIG. 14.

In step S703, the reference value control flag generation unit 711 generates a reference value control flag.

The processing of steps S704 to S715 is performed in the same manner as the processing of steps S303 to S314 of FIG. 14.

When the processing of step S715 ends, the image coding processing ends.

<Flow of Coding Processing>

An example of a flow of coding processing performed in step S714 of FIG. 26 will be described with reference to the flowchart of FIG. 27.

Figure 27:
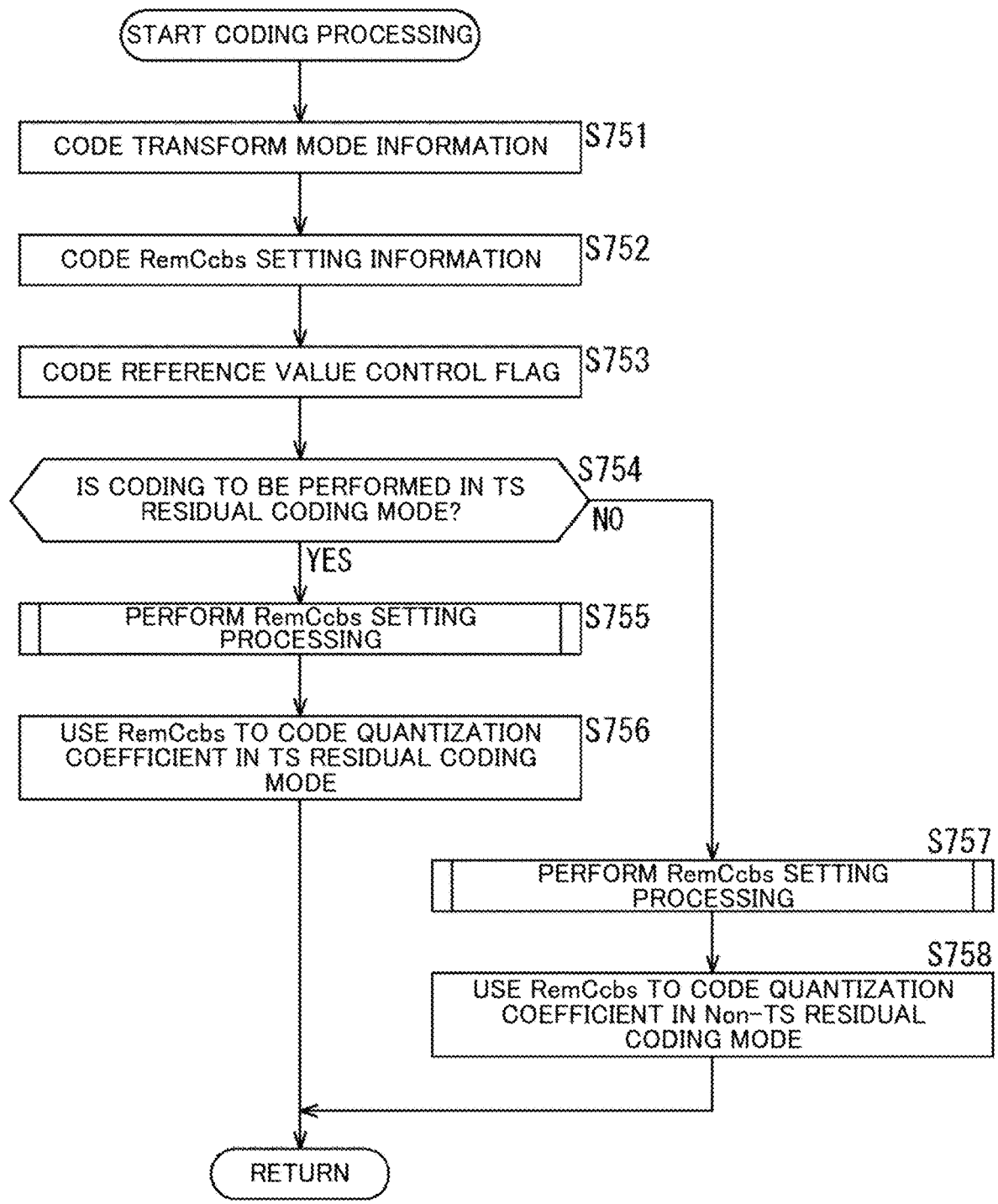
FIG. 27 is a flowchart illustrating an example of a flow of coding processing.

When the coding processing is started, the processing of steps S751 and S752 of FIG. 27 is performed in the same manner as the processing of steps S351 and S352 of FIG. 15.

Figure 26:
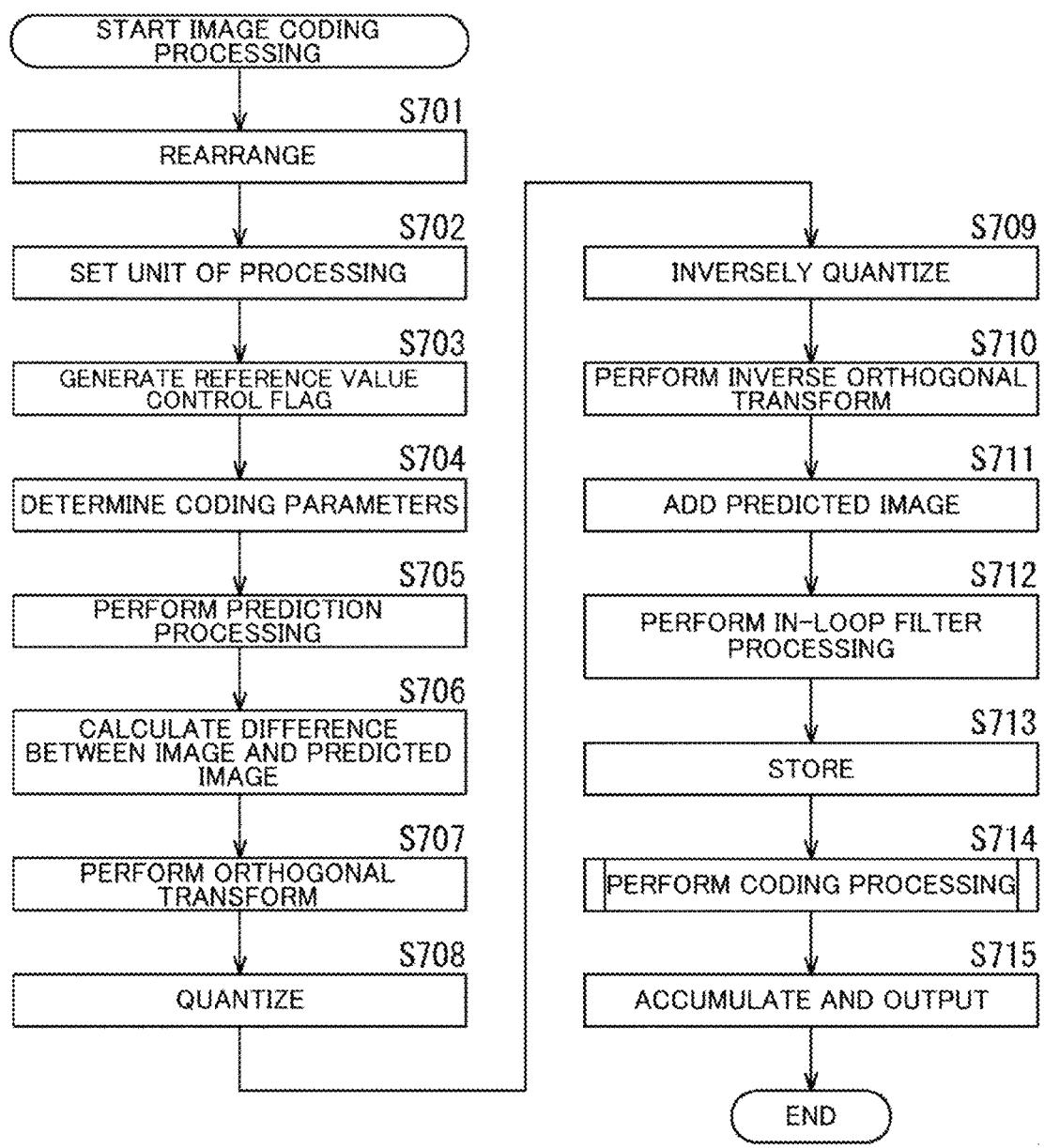
FIG. 26 is a flowchart illustrating an example of a flow of image coding processing.

In step S753, the reference value control flag coding unit 712 codes the reference value control flag generated in step S703 of FIG. 26.

Then, the processing of steps S754 to S758 is performed in the same manner as the processing of steps S353 to S357 of FIG. 15. When the processing of step S756 or step S758 ends, the coding processing ends, and then the processing returns to FIG. 26.

Method 2 (or Method 2-1) according to the present technology described above may be applied to the RemCcbs setting processing performed in such coding processing of steps S755 and S757. For example, this RemCcbs setting processing may be performed according to the flow described with reference to the flowchart of FIG. 9.

For example, the RemCcbs setting unit 361 and the RemCcbs setting unit 362 may select a reference value (ctxBinSampleRatioBase1 or ctxBinSampleRatioBase2) according to the reference value control flag and use the reference value to derive the initial value of RemCcbs. In that setting, the RemCcbs setting unit 361 and the RemCcbs setting unit 362 may derive the initial value of RemCcbs by using Equation (1) above.

By doing so, the same effects as those described in <2. Suppression of increase in context-coded bins> can be obtained. Thus, the RemCcbs setting unit 361 and the RemCcbs setting unit 362 can use the reference value control flag to control the number of context-coded bins to be generated. Thus, the RemCcbs setting unit 361 and the RemCcbs setting unit 362 can control according to CABAC processing speed control the number of context-coded bins to be generated. Accordingly, the coding unit 315 can suppress an increase in the amount of coding processing. For example, the coding unit 315 can suppress an increase in the amount of CABAC processing in coding of an image with high bit depth and high bit rate.

In other words, the RemCcbs setting unit 361 and the RemCcbs setting unit 362 can suppress according to CABAC processing speed control an increase in the number of context-coded bins to be generated, thereby suppressing an increase in the total of the numbers of context-coded bins and bypass-coded bins. Accordingly, the coding unit 315 can suppress an increase in the total amount of CABAC processing.

Thus, by performing each processing as described above, the image coding device 300 can suppress an increase in the amount of coding processing.

<Decoding Unit>

Figure 28:
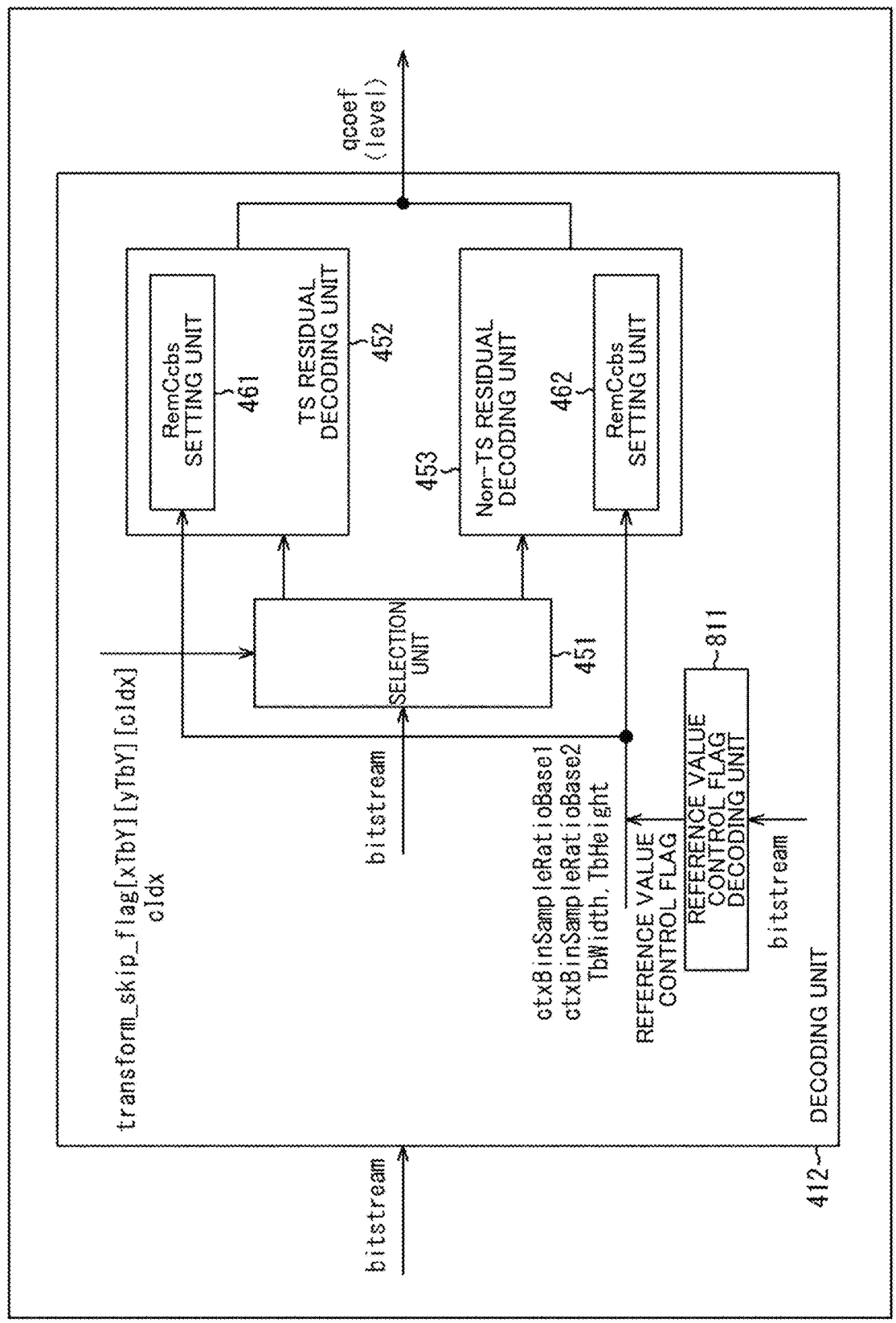
FIG. 28 is a block diagram illustrating a main configuration example of a decoding unit.

Method 2 (or Method 2-1) according to the present technology may be applied to the image decoding device 400. FIG. 28 is a block diagram illustrating a main configuration example of a decoding unit 412 in that case. As illustrated in FIG. 28, the decoding unit 412 includes the selection unit 451, the TS residual decoding unit 452, the Non-TS residual decoding unit 453, and a reference value control flag decoding unit 811.

The reference value control flag decoding unit 811 decodes the bit stream, and generates the execution control flag as described in, for example, <Reference value execution control flag> in <2. Suppression of increase in context-coded bins>. The reference value control flag decoding unit 811 supplies the generated reference value control flag to the RemCcbs setting unit 461 and the RemCcbs setting unit 462.

The selection unit 451, the TS residual decoding unit 452, and the Non-TS residual decoding unit 453 perform the same processing as those in FIG. 17.

Specifically, the selection unit 451 selects based on transform_skip_flag[xTbY][yTbY][cIdx] and cIdx to decode the coded data of the quantization coefficient level in the TS residual coding mode or the Non-TS residual coding mode. The TS residual decoding unit 452 decodes the coded data of the quantization coefficient level in the TS residual coding mode. The Non-TS residual decoding unit 453 decodes the coded data of the quantization coefficient level in the Non-TS residual coding mode.

The TS residual decoding unit 452 includes the RemCcbs setting unit 461. The RemCcbs setting unit 461 basically performs the same processing as in FIG. 17. Specifically, the RemCcbs setting unit 461 sets the initial value of RemCcbs, and the TS residual decoding unit 452 decodes the coded data of the acquired quantization coefficient level by using RemCcbs. The Non-TS residual decoding unit 453 includes the RemCcbs setting unit 462. The RemCcbs setting unit 462 basically performs the same processing as in FIG. 17. Specifically, the RemCcbs setting unit 462 sets the initial value of RemCcbs, and the Non-TS residual decoding unit 453 decodes the coded data of the acquired quantization coefficient level by using RemCcbs.

Method 2 (or Method 2-1) according to the present technology described above may be applied to these RemCcbs setting unit 461 and RemCcbs setting unit 462. Thus, the RemCcbs setting unit 461 and the RemCcbs setting unit 462 may set the maximum number of context-coded bins according to processing speed control. For example, the RemCcbs setting unit 461 and the RemCcbs setting unit 462 may set the maximum number of context-coded bins based on the reference value control flag.

In that case, the RemCcbs setting unit 461 and the RemCcbs setting unit 462 acquire the reference value control flag supplied from the reference value control flag decoding unit 811. The RemCcbs setting unit 461 and the RemCcbs setting unit 462 then determine a method of setting the initial value of RemCcbs based on the reference value control flag.

For example, if the reference value control flag is false (for example, 0), the RemCcbs setting unit 461 and the RemCcbs setting unit 462 set the initial value of RemCcbs based on ctxBinSampleRatioBase1. If the reference value control flag is true (for example, 1), the RemCcbs setting unit 461 and the RemCcbs setting unit 462 set the initial value of RemCcbs based on ctxBinSampleRatioBase2. For example, the RemCcbs setting unit 461 and the RemCcbs setting unit 462 may have the same configuration as the RemCcbs setting device 100 illustrated in FIG. 8 to perform the same processing to set the initial value of RemCcbs.

In that setting, the RemCcbs setting unit 461 and the RemCcbs setting unit 462 may set, based on the reference value (ctxBinSampleRatioBase1 or ctxBinSampleRatioBase2) selected according to the reference value control flag, the number of context-coded bins not depending on bitDepth (ctxBinSampleRatio). For example, the RemCcbs setting unit 461 and the RemCcbs setting unit 462 may set ctxBinSampleRatioBase1 or ctxBinSampleRatioBase2 as ctxBinSampleRatio. The RemCcbs setting unit 461 and the RemCcbs setting unit 462 may then use ctxBinSampleRatio (ctxBinSampleRatioBase1 or ctxBinSampleRatioBase2) to set the initial value of RemCcbs. For example, the RemCcbs setting unit 461 and the RemCcbs setting unit 462 may derive the initial value of RemCcbs by using Equation (1) above.

In this case, the RemCcbs setting unit 461 and the RemCcbs setting unit 462 may set the initial value of RemCcbs based on ctxBinSampleRatio and any other parameters. For example, the RemCcbs setting unit 461 and the RemCcbs setting unit 462 may acquire the block size (Tb Width and TbHeight) of the block to be processed, which is obtained by the decoding unit 412 decoding the bit stream, and use ctxBinSampleRatio (ctxBinSampleRatioBase1 or ctxBinSampleRatioBase2) described above and the corresponding Tb Width and TbHeight to set the initial value of RemCcbs corresponding to the block to be processed.

The decoding unit 412 (the TS residual decoding unit 452 and the Non-TS residual decoding unit 453) uses the initial value (the maximum number of context-coded bins) of RemCcbs thus set by the RemCcbs setting unit 461 and the RemCcbs setting unit 462 to decode the coded data of the image (the quantization coefficient level) (in the TS residual coding mode or the Non-TS residual coding mode). Thus, the decoding unit 412 uses the maximum number of context-coded bins set by the RemCcbs setting unit 461 and the RemCcbs setting unit 462, to which the present technology is applied, to context-decode the coded data of the image (the quantization coefficient level). Accordingly, in this case as well, the decoding unit 412 can also be said to be an image decoding unit.

By doing so, the same effects as those described in <2. Suppression of increase in context-coded bins> can be obtained. Thus, the RemCcbs setting unit 461 and the RemCcbs setting unit 462 can use the reference value control flag to control the number of context-coded bins to be generated. Thus, the RemCcbs setting unit 461 and the RemCcbs setting unit 462 can control according to CABAC processing speed control the number of context-coded bins to be generated. Accordingly, the decoding unit 412 can suppress an increase in the amount of decoding processing. For example, the decoding unit 412 can suppress an increase in the amount of CABAC processing in decoding of an image with high bit depth and high bit rate.

In other words, the RemCcbs setting unit 461 and the RemCcbs setting unit 462 can suppress according to CABAC processing speed control an increase in the number of context-coded bins to be generated, thereby suppressing an increase in the total of the numbers of context-coded bins and bypass-coded bins. Accordingly, the decoding unit 412 can suppress an increase in the total amount of CABAC processing.

Thus, the image decoding device 400 can suppress an increase in the amount of coding processing.

<Flow of Coding Processing>

The image coding processing performed by the image decoding device 400 including the decoding unit 412 configured as illustrated in FIG. 28 is performed in the same flow as described with reference to the flowchart of FIG. 18.

An example of a flow of coding processing performed in step S402 of FIG. 18 in this case will be described with reference to the flowchart of FIG. 29.

Figure 29:
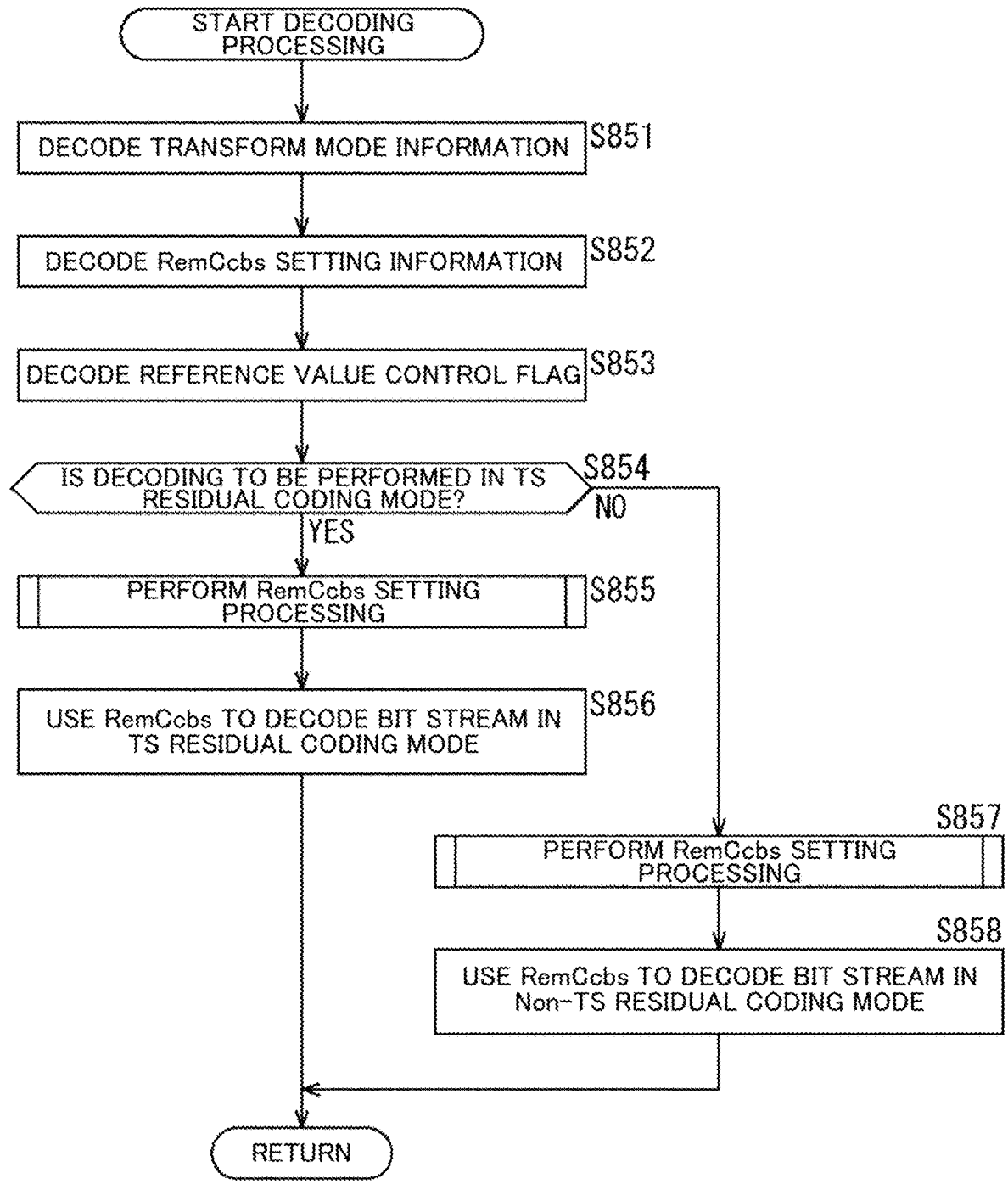
FIG. 29 is a flowchart illustrating an example of a flow of decoding processing.

When the decoding processing is started, the processing of steps S851 and S852 of FIG. 29 is performed in the same manner as the processing of steps S451 and S452 of FIG. 19.

In step S853, the reference value control flag decoding unit 811 decodes the bit stream to generate the reference value control flag.

Then, the processing of steps S854 to S858 is performed in the same manner as the processing of steps S453 to S457 of FIG. 19. When the processing of step S856 or step S858 ends, the decoding processing ends, and then the processing returns to FIG. 18.

Method 2 (or Method 2-1) according to the present technology described above may be applied to the RemCcbs setting processing performed in such decoding processing of steps S855 and S857. For example, this RemCcbs setting processing may be performed according to the flow described with reference to the flowchart of FIG. 9.

For example, the RemCcbs setting unit 461 and the RemCcbs setting unit 462 may select a reference value (ctxBinSampleRatioBase1 or ctxBinSampleRatioBase2) according to the reference value control flag and use the reference value to derive the initial value of RemCcbs. In that setting, the RemCcbs setting unit 461 and the RemCcbs setting unit 462 may derive the initial value of RemCcbs by using Equation (1) above.

By doing so, the same effects as those described in <2. Suppression of increase in context-coded bins> can be obtained. Thus, the RemCcbs setting unit 461 and the RemCcbs setting unit 462 can use the reference value control flag to control the number of context-coded bins to be generated. Thus, the RemCcbs setting unit 461 and the RemCcbs setting unit 462 can control according to CABAC processing speed control the number of context-coded bins to be generated. Accordingly, the decoding unit 412 can suppress an increase in the amount of decoding processing. For example, the decoding unit 412 can suppress an increase in the amount of CABAC processing in decoding of an image with high bit depth and high bit rate.

In other words, the RemCcbs setting unit 461 and the RemCcbs setting unit 462 can suppress according to CABAC processing speed control an increase in the number of context-coded bins to be generated, thereby suppressing an increase in the total of the numbers of context-coded bins and bypass-coded bins. Accordingly, the decoding unit 412 can suppress an increase in the total amount of CABAC processing.

Thus, by performing each processing as described above, the image decoding device 400 can suppress an increase in the amount of decoding processing.

4. Supplements

<Computer>

The above-described series of processing can be executed by hardware or software. When the series of processing is executed by software, a program that constitutes the software is installed in the computer. Here, the computer includes, for example, a computer built in dedicated hardware and a general-purpose personal computer on which various programs are installed to be able to execute various functions.

Figure 30:
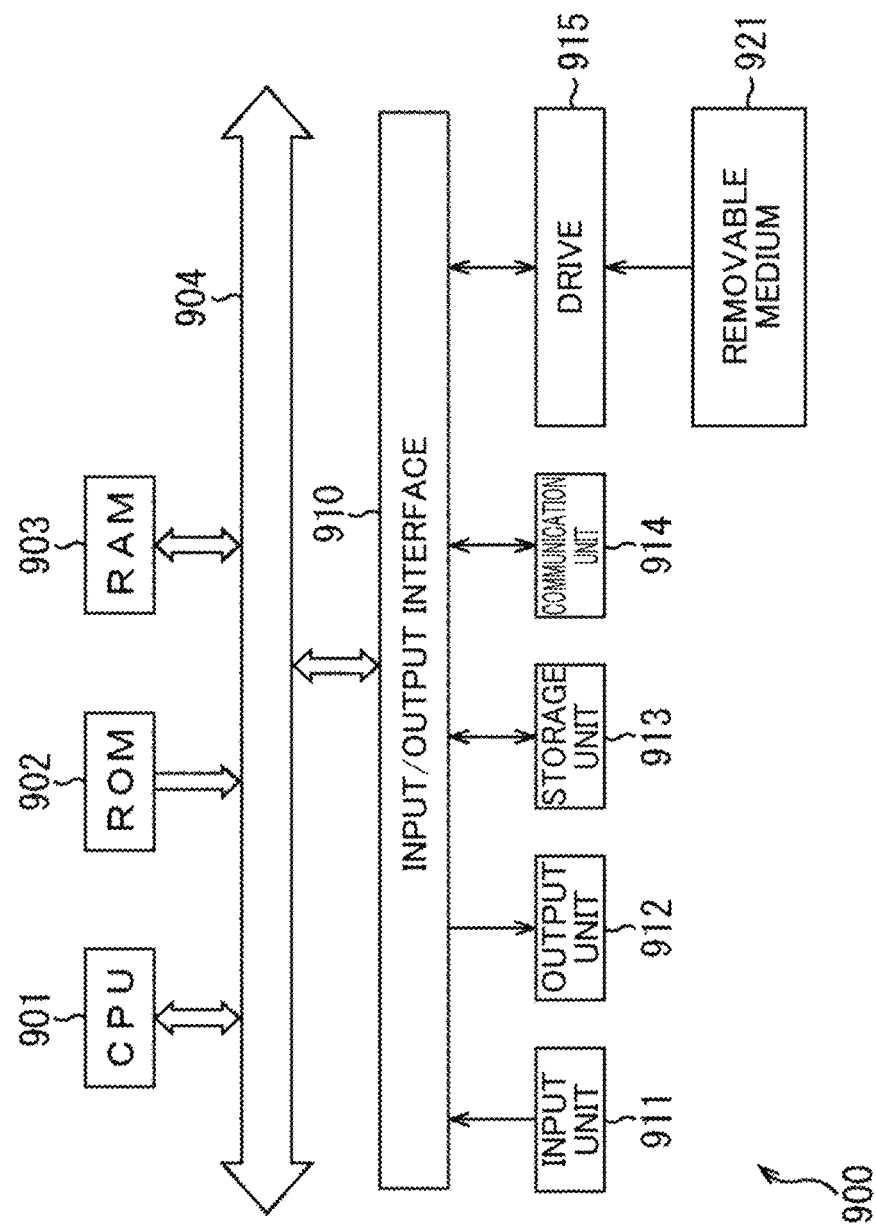
FIG. 30 is a block diagram illustrating a main configuration example of a computer.

FIG. 30 is a block diagram illustrating an example of a hardware configuration of a computer that executes the above-described series of processing according to a program.

In the computer 900 illustrated in FIG. 30, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, or an input terminal. The output unit 912 includes, for example, a display, a speaker, or an output terminal. The storage unit 913 includes, for example, a hard disk, a RAM disk, and non-volatile memory. The communication unit 914 includes, for example, a network interface. The drive 915 drives a removable medium 921 such as a magnetic disk, an optical disc, a magneto-optical disk, or a semiconductor memory.

In the computer configured as described above, the CPU 901 loads a program stored in the storage unit 913 into the RAM 903 via the input/output interface 910 and the bus 904 and executes the program, so that the above-described series of processing is performed. Further, data and the like necessary for the CPU 901 to execute various types of processing are stored in the RAM 903 as appropriate.

The program to be executed by the computer, for example, can be recorded on the removable medium 921 such as a package medium and applied. In this case, the program can be installed in the storage unit 913 via the input/output interface 910 by the removable medium 921 being mounted in the drive 915.

This program can also be provided via wired or wireless transfer medium such as a local area network, the Internet, and digital satellite broadcasting. In this case, the program can be received by the communication unit 914 and installed in the storage unit 913.

Alternatively, this program can be installed in the ROM 902 or the storage unit 913 in advance.

<Application Target of Present Technology>

The present technology can be applied to any image coding method or decoding method. Specifically, the various types of processing related to image coding/decoding have any specifications, such as transform (inverse transform), quantization (inverse quantization), coding (decoding), and prediction, and are not limited to the above-described examples as long as they do not contradict the above-described present technology. In addition, some of the various types of processing may be omitted as long as they do not contradict the above-described present technology.

Further, the present technology can be applied to a multi-view image coding processing system that codes a multi-view image including images at multiple viewpoints (views). Further, the present technology can be applied to a multi-view image decoding system that decodes coded data of multi-view images including images of multiple viewpoints (views). In this case, the present technology may be applied to coding and decoding for each viewpoint (view).

Furthermore, the present technology can be applied to a hierarchical image coding (scalable coding) system that codes a hierarchical image having a plurality of (hierarchical) layers so as to have a scalability function for a predetermined parameter. Furthermore, the present technology can be applied to a hierarchical image decoding (scalable coding) system that decodes coded data of a hierarchical image having a plurality of (hierarchical) layers so as to have a scalability function for a predetermined parameter. In this case, the present technology may be applied to coding/decoding of each layer.

The present technology can be applied to any configuration. For example, the present technology can be applied to various electronic devices such as a transmitter or a receiver (for example, a television receiver or a mobile phone) in satellite broadcasting, cable broadcasting such as a cable TV, distribution on the Internet, distribution to a terminal by cellular communication, or the like, or devices (for example, a hard disk recorder or a camera) that record images on a medium such as an optical disc, a magnetic disk, and a flash memory, and reproduce the images from the storage medium.

Further, for example, the present technology can be implemented as a part of the configuration of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit.

Further, for example, the present technology can also be applied to a network system configured of a plurality of devices. For example, the present technology may be implemented as cloud computing in which a plurality of devices share processing and jointly perform processing via a network. For example, the present technology may be implemented in a cloud service in which a service regarding images (moving images) is provided to any terminals such as computers, audio visual (AV) device, portable information processing terminals, and Internet of Things (IoT) devices.

The term "system" as used herein means a set of a plurality of components (devices, modules (parts), or the like) and it does not matter whether all the components are in the same housing. Therefore, a plurality of devices housed in separate housings and connected via a network, and a single device in which a plurality of modules are housed in one housing are both systems.

<Fields and Purposes to which Present Technology is Applicable>

A system, a device, a processing unit, and the like to which the present technology is applied can be used in any field such as traffic, medical treatment, security, agriculture, livestock industries, a mining industry, beauty, factories, home appliance, weather, and natural surveillance, for example. Any purpose can be set.

For example, the present technology can be applied to systems and devices available for providing content for viewing and the like. In addition, for example, the present technology can be applied to systems and devices available for traffic, such as traffic condition monitoring and autonomous driving control. Further, for example, the present technology can be applied to systems and devices available for security. In addition, for example, the present technology can be applied to systems and devices available for automatic control of machines and the like. Further, for example, the present technology can be applied to systems and devices available for agriculture and livestock industry. In addition, the present technology can also be applied, for example, to systems and devices for monitoring natural conditions such as volcanoes, forests, and oceans and wildlife. Further, for example, the present technology can be applied to systems and devices available for sports.

<Others>

The term "flag" as used herein is information for identifying a plurality of states, and includes not only information used when two states including true (1) or false (0) are identified, but also information that can identify three or more states. Therefore, values of this "flag" may be, for example, two values including 1/0, or may be three or more values. In other words, any number of bits may be used to constitute this "flag", and the number may be 1 bit or a plurality of bits. Further, since the identification information (including the flag) is assumed to have not only a form in which the identification information is included in a bit stream, but also a form in which difference information between the identification information and certain reference information is included in a bit stream, the "flag" or the "identification information" as used herein includes not only that information but also difference information with respect to the reference information.

Further, various types of information (metadata, or the like) regarding the coded data (bit stream) may be transmitted or recorded in any form as long as the information is associated with the coded data. Here, the term "associate" means, for example, making it possible to use (link) one piece of data when processing the other data. In other words, data associated with each other may be collected as one piece of data or may be individual pieces of data. For example, information associated with coded data (image) may be transmitted on a transmission path separate from that for the coded data (image). Further, for example, the information associated with the coded data (image) may be recorded on a recording medium (or a recording area of the same recording medium) separate from that for the coded data (image). This "association" may be a part of the data instead of the entire data. For example, an image and information corresponding to the image may be associated with each other in any units of a plurality of frames, one frame, a portion within a frame, or the like.

The terms "synthesize", "multiplex", "add", "integrate", "include", "store", "put in", "insert", and the like as used herein mean grouping a plurality of objects into one object, such as grouping encoded data and metadata into one data, and mean one method "associate" as described above.

In addition, embodiments of the present technology are not limited to the above-described embodiments, and various modifications can be made without departing from the scope and spirit of the present technology.

For example, a configuration described as one device (or processing unit) may be divided and configured as a plurality of devices (or processing units). On the other hand, the configuration described above as a plurality of devices (or processing units) may be collectively configured as one device (or processing unit). Further, of course, a configuration other than the above may be added to the configuration of each device (or each processing unit). Further, a part of a configuration of a device (or processing unit) may be included in a configuration of another device (or another processing unit) as long as a configuration or operation of the system as a whole is substantially the same.

Further, for example, the above-described program may be executed in any device. In this case, the device only needs to have necessary functions (functional blocks, and the like) and to be able to obtain necessary information.

Further, for example, each step of one flowchart may be executed by one device, or may be shared and executed by a plurality of devices. Furthermore, in a case where a plurality of kinds of processing are included in a single step, the plurality of kinds of processing may be executed by one device or by a plurality of devices in a shared manner. In other words, the plurality of kinds of processing included in the single step may be executed as processing for a plurality of steps. On the other hand, it is also possible to execute processing described as a plurality of steps collectively as one step.

Further, the program to be executed by a computer may have the following features. For example, the processing of steps described in the program may be executed in chronological order according to the order described in this specification. Further, the processing of some steps described in the program may be executed in parallel. Furthermore, the processing of steps described in the program may be individually executed at necessary timing such as when called. That is, the processing of the respective steps may be executed in an order different from the above-described order as long as there is no contradiction. Further, the processing of some steps described in this program may be executed in parallel with the processing of another program. Furthermore, the processing of steps described in this program may be executed in combination with the processing of another program.

Further, for example, a plurality of technologies related to the present technology can be independently implemented as a single body as long as there is no contradiction. Of course, it is also possible to perform any plurality of the present technologies in combination. For example, it is also possible to implement some or all of the present technologies described in any of the embodiments in combination with some or all of the technologies described in other embodiments. Further, it is also possible to implement some or all of any of the above-described technologies in combination with other technologies not described above.

The present technology can also be configured as follows.

(1) An image processing device including a maximum context-coded bin number setting unit that sets a value according to a bit depth of an image as a maximum number of context-coded bins to be generated in coding or decoding of the image.

(2) The image processing device according to (1), wherein the maximum context-coded bin number setting unit sets, based on the bit depth of the image, a number of context-coded bins depending on the bit depth, and sets, based on the number of context-coded bins depending on the bit depth, the maximum number of context-coded bins.

(3) The image processing device according to (2), wherein the maximum context-coded bin number setting unit sets, as the number of context-coded bins depending on the bit depth, a value obtained by dividing a reference value for the number of context-coded bins by the value according to the bit depth of the image.

(4) The image processing device according to (2), wherein the maximum context-coded bin number setting unit sets, as the number of context-coded bins depending on the bit depth, a value obtained by subtracting the value according to the bit depth of the image from a reference value for the number of context-coded bins.

(5) The image processing device according to (2), wherein the maximum context-coded bin number setting unit sets, as the number of context-coded bins depending on the bit depth, the value according to the bit depth of the image.

(6) The image processing device according to any one of (2) to (5), wherein the maximum context-coded bin number setting unit sets, based on a block size of a block to be processed and the number of context-coded bins depending on the bit depth, the maximum number of context-coded bins corresponding to the block to be processed.

(7) The image processing device according to any one of (1) to (6), further including an image coding unit that context-codes the image by using the maximum number of context-coded bins.

(8) The image processing device according to (7), further including:
a calculation unit that derives the image and a prediction residual by subtracting
a predicted image from the image;
a coefficient transform unit that performs coefficient transform on the prediction residual to derive a transform coefficient; and
a quantization unit that quantizes the transform coefficient to derive a quantization coefficient,
wherein
the image coding unit context-codes the quantization coefficient by using the maximum number of context-coded bins.

(9) The image processing device according to (8), wherein the image coding unit codes the quantization coefficient in a TS residual coding mode or a Non-TS residual coding mode.

(10) The image processing device according to any one of (1) to (6), further including an image decoding unit that context-decodes, by using the maximum number of context-coded bins, a bit stream in which the image is context-coded.

(11) The image processing device according to (10), wherein
the image decoding unit context-decodes the bit stream by using the maximum number of context-coded bins to derive a quantization coefficient, and
the image processing device further includes:
an inverse quantization unit that inversely quantizes the quantization coefficient to generate a transform coefficient;
an inverse coefficient transform unit that performs inverse coefficient transform on the transform coefficient to derive a prediction residual; and
a calculation unit that adds a predicted image of the image to the prediction residual to derive the image.

(12) The image processing device according to (11), wherein the image decoding unit decodes the bit stream in a TS residual coding mode or a Non-TS residual coding mode.

(13) The image processing device according to any one of (1) to (6), wherein if a control flag is true, the maximum context-coded bin number setting unit sets, based on the bit depth of the image, the number of context-coded bins depending on the bit depth, and sets, based on the number of context-coded bins depending on the bit depth, the maximum number of context-coded bins, and if the control flag is false, the maximum context-coded bin number setting unit sets, based on a reference value for the number of context-coded bins, the maximum number of context-coded bins.

(14) The image processing device according to (13), further including:
a control flag generation unit that generates the control flag;
a control flag coding unit that codes the control flag; and
an image coding unit that context-codes the image by using the maximum number of context-coded bins.

(15) The image processing device according to (13), further including:
a control flag decoding unit that decodes a bit stream to derive the control flag; and
an image decoding unit that context-decodes, by using the maximum number of context-coded bins, a bit stream in which the image is context-coded.

(16) An image processing method including setting a value according to a bit depth of an image as a maximum number of context-coded bins to be generated in coding or decoding of the image.

(17) An image processing device including a maximum context-coded bin number setting unit that sets, according to a control flag indicating a processing speed mode, a maximum number of context-coded bins to be generated in coding or decoding of an image.

(18) The image processing device according to (17), wherein if the control flag indicates a normal-speed mode, the maximum context-coded bin number setting unit sets the maximum number of context-coded bins based on a first reference value, and
if the control flag indicates a high-speed mode, the maximum context-coded bin number setting unit sets the maximum number of context-coded bins based on a second reference value that is smaller than the first reference value.

(19) The image processing device according to (17) and (18) wherein the maximum context-coded bin number setting unit sets, based on a block size of a block to be processed and the control flag, the maximum number of context-coded bins corresponding to the block to be processed.

(20) An image processing method including setting, according to a control flag indicating a processing speed mode, a maximum number of context-coded bins to be generated in coding or decoding of an image.

REFERENCE SIGNS LIST

100 RemCcbs setting device
101 ctxBinSampleRatio(bitDepth) setting unit

102 RemCcbs initial value setting unit
151 ctxBinSampleRatio unit
152 RemCcbs initial value setting unit
181 ctxBinSampleRatio unit
182 RemCcbs initial value setting unit
300 Image coding device
301 Control unit
315 Coding unit
351 Selection unit
352 TS residual coding unit
352 Non-TS residual coding unit
361 RemCcbs setting unit
362 RemCcbs setting unit
400 Image decoding device
412 Decoding unit
451 Selection unit
452 TS residual decoding unit
452 Non-TS residual decoding unit
461 RemCcbs setting unit
462 RemCcbs setting unit
511 Execution control flag generation unit
512 Execution control flag coding unit
611 Execution control flag decoding unit
711 Reference value control flag generation unit
712 Reference value control flag coding unit
811 Reference value control flag decoding unit
900 Computer

The invention claimed is:

1. An image processing device comprising a maximum context-coded bin number setting unit that sets a value according to a bit depth of an image as a maximum number of context-coded bins to be generated in coding or decoding of the image.

2. The image processing device according to claim 1, wherein the maximum context-coded bin number setting unit sets, based on the bit depth of the image, a number of context-coded bins depending on the bit depth, and sets, based on the number of context-coded bins depending on the bit depth, the maximum number of context-coded bins.

3. The image processing device according to claim 2, wherein the maximum context-coded bin number setting unit sets, as the number of context-coded bins depending on the bit depth, a value obtained by dividing a reference value for the number of context-coded bins by the value according to the bit depth of the image.

4. The image processing device according to claim 2, wherein the maximum context-coded bin number setting unit sets, as the number of context-coded bins depending on the bit depth, a value obtained by subtracting the value according to the bit depth of the image from a reference value for the number of context-coded bins.

5. The image processing device according to claim 2, wherein the maximum context-coded bin number setting unit sets, as the number of context-coded bins depending on the bit depth, the value according to the bit depth of the image.

6. The image processing device according to claim 2, wherein the maximum context-coded bin number setting unit sets, based on a block size of a block to be processed and the number of context-coded bins depending on the bit depth, the maximum number of context-coded bins corresponding to the block to be processed.

7. The image processing device according to claim 1, further comprising an image coding unit that context-codes the image by using the maximum number of context-coded bins.

8. The image processing device according to claim 7, further comprising:
    a calculation unit that derives the image and a prediction residual by subtracting a predicted image from the image;
    a coefficient transform unit that performs coefficient transform on the prediction residual to derive a transform coefficient; and
    a quantization unit that quantizes the transform coefficient to derive a quantization coefficient,
    wherein
    the image coding unit context-codes the quantization coefficient by using the maximum number of context-coded bins.

9. The image processing device according to claim 8, wherein the image coding unit codes the quantization coefficient in a TS residual coding mode or a Non-TS residual coding mode.

10. The image processing device according to claim 1, further comprising an image decoding unit that context-decodes, by using the maximum number of context-coded bins, a bit stream in which the image is context-coded.

11. The image processing device according to claim 10, wherein
    the image decoding unit context-decodes the bit stream by using the maximum number of context-coded bins to derive a quantization coefficient, and
    the image processing device further comprises:
    an inverse quantization unit that inversely quantizes the quantization coefficient to generate a transform coefficient;
    an inverse coefficient transform unit that performs inverse coefficient transform on the transform coefficient to derive a prediction residual; and
    a calculation unit that adds a predicted image of the image to the prediction residual to derive the image.

12. The image processing device according to claim 11, wherein the image decoding unit decodes the bit stream in a TS residual coding mode or a Non-TS residual coding mode.

13. The image processing device according to claim 1, wherein
    if a control flag is true, the maximum context-coded bin number setting unit sets, based on the bit depth of the image, the number of context-coded bins depending on the bit depth, and sets, based on the number of context-coded bins depending on the bit depth, the maximum number of context-coded bins, and
    if the control flag is false, the maximum context-coded bin number setting unit sets, based on a reference value for the number of context-coded bins, the maximum number of context-coded bins.

14. The image processing device according to claim 13, further comprising:
    a control flag generation unit that generates the control flag;
    a control flag coding unit that codes the control flag; and
    an image coding unit that context-codes the image by using the maximum number of context-coded bins.

15. The image processing device according to claim 13, further comprising:
    a control flag decoding unit that decodes a bit stream to derive the control flag; and
    an image decoding unit that context-decodes, by using the maximum number of context-coded bins, a bit stream in which the image is context-coded.

16. An image processing method comprising setting a value according to a bit depth of an image as a maximum number of context-coded bins to be generated in coding or decoding of the image.

* * * * *